US012747976B2

(12) United States Patent
Shanahan et al.

(10) Patent No.: US 12,747,976 B2
(45) Date of Patent: Sep. 29, 2026

(54) INTERFACE WITH IMPROVED ACCESSIBILITY

(71) Applicant: MICRO MOTION, INC., Boulder, CO (US)

(72) Inventors: Shaun E. Shanahan, Denver, CO (US); Craig B. McAnally, Thornton, CO (US); Brian T. Smith, Johnstown, CO (US); Hua Jiang, Nanjing (CN); Yan Wang, Nanjing City (CN); Suhas Sureshrao Kadu, Narhe (IN); Rajeev Choudhary, New Sangvi (IN); Liu Chengjun, Nanjing (CN); Fengchuan Gao, Nanjing (CN); Andrew S. Kravitz, Frederick, CO (US); Du Dechao, Pingyuan County (CN); Yingxue Xu, Nanjing (CN); Liu Ying, Nanjing (CN)

(73) Assignee: MICRO MOTION, INC., Boulder, CO (US)

( * ) Notice: Subject to any disclaimer, the term of this patent is extended or adjusted under 35 U.S.C. 154(b) by 450 days.

(21) Appl. No.: 18/271,215

(22) PCT Filed: Jan. 12, 2021

(86) PCT No.: PCT/CN2021/071185
§ 371 (c)(1),
(2) Date: Jul. 6, 2023

(87) PCT Pub. No.: WO2022/150943
PCT Pub. Date: Jul. 21, 2022

(65) Prior Publication Data
US 2024/0210229 A1 Jun. 27, 2024

(51) Int. Cl.
*G01F 15/14* (2006.01)
*G01F 1/84* (2006.01)
(Continued)

(52) U.S. Cl.
CPC ............ *G01F 15/14* (2013.01); *G01F 1/8431* (2013.01); *G01F 15/063* (2013.01); *G01F 15/18* (2013.01)

(58) Field of Classification Search
CPC ........ G01F 15/14; G01F 15/063; G01F 15/18; G01F 1/8431
(Continued)

(56) References Cited

U.S. PATENT DOCUMENTS 3,648,520 A 3/1972 Price
4,328,490 A 5/1982 Usuba et al.
(Continued)

FOREIGN PATENT DOCUMENTS

CN 101754625 A 6/2010
CN 202255476 U 5/2012
(Continued)

OTHER PUBLICATIONS

VLM20 In-line Vortex Flowmeter and VIM20 Vortex Insertion Flowmeter Installation and Maintenance Instructions, Spirax Sarco, IM-P339-06 MI Issue 2, Copyright 2016, pp. 1-140.

*Primary Examiner* — Nathaniel T Woodward
(74) *Attorney, Agent, or Firm* — The Ollila Law Group LLC

(57) ABSTRACT

An interface (402, 502, 602, 1202) with improved accessibility is provided. The interface (402 502, 602, 1202) includes a housing (430, 530, 630, 1230) and a meter electronics (520, 620, 1220) disposed inside the housing (430, 530, 630, 1230). The meter electronics (420, 520, 620, 1220) is configured to affix to a connector (450, 550, 650, 1250) extending into the housing (430, 530, 630, 1230). Other aspects are also provided.

35 Claims, 36 Drawing Sheets

(51) Int. Cl.
*G01F 15/063* (2022.01)
*G01F 15/18* (2006.01)

(58) Field of Classification Search
USPC ..................................................... 73/861.355
See application file for complete search history.

(56) References Cited

U.S. PATENT DOCUMENTS

| | | | |
|---|---|---|---|
| 6,062,095 | A | 5/2000 | Mulrooney et al. |
| 9,030,190 | B2 * | 5/2015 | Matt ...................... G01D 11/24 73/431 |
| 9,541,428 | B2 * | 1/2017 | Fink ..................... G01D 11/245 |
| 2002/0011115 | A1 * | 1/2002 | Frick ..................... G01L 9/0072 73/718 |
| 2003/0101824 | A1 | 6/2003 | Grudzien |
| 2004/0104889 | A1 | 6/2004 | Fehrenbach et al. |
| 2006/0055006 | A1 | 3/2006 | Orth et al. |
| 2006/0121301 | A1 | 6/2006 | Tanner |
| 2007/0138602 | A1 | 6/2007 | Orth et al. |
| 2007/0241916 | A1 | 10/2007 | Hedtke |
| 2007/0273542 | A1 | 11/2007 | Mellert et al. |
| 2011/0215944 | A1 * | 9/2011 | Hausler .................. G01D 11/24 340/870.02 |
| 2012/0006127 | A1 | 1/2012 | Nielsen |
| 2014/0213178 | A1 | 7/2014 | Wolff et al. |
| 2014/0238126 | A1 | 8/2014 | Vanderaa |
| 2015/0085449 | A1 | 3/2015 | Norman et al. |
| 2015/0094826 | A1 | 4/2015 | Jia et al. |
| 2015/0292930 | A1 | 10/2015 | Mansfield et al. |
| 2016/0093997 | A1 | 3/2016 | Eriksen et al. |
| 2017/0003149 | A1 | 1/2017 | Berk et al. |
| 2017/0199062 | A1 | 7/2017 | Steinich |
| 2018/0019953 | A1 | 1/2018 | Odisho et al. |
| 2018/0216978 | A1 | 8/2018 | Dames et al. |
| 2019/0014669 | A1 | 1/2019 | Ahn et al. |
| 2019/0059168 | A1 | 2/2019 | Gerardo et al. |
| 2019/0063648 | A1 | 2/2019 | Chen |
| 2019/0166669 | A1 | 5/2019 | Song et al. |
| 2019/0190110 | A1 | 6/2019 | Clark et al. |
| 2020/0209026 | A1 | 7/2020 | Hashimoto et al. |
| 2020/0209027 | A1 | 7/2020 | Yamazaki |

FOREIGN PATENT DOCUMENTS

| | | | |
|---|---|---|---|
| CN | 203323818 | U | 12/2013 |
| CN | 204064378 | U | 12/2014 |
| CN | 204855043 | U | 12/2015 |
| CN | 205429646 | U | 8/2016 |
| CN | 208383219 | U | 1/2019 |
| CN | 109542258 | A | 3/2019 |
| CN | 209247083 | U | 8/2019 |
| CN | 209927192 | U | 1/2020 |
| CN | 211477884 | U | 9/2020 |
| CN | 211855662 | U | 11/2020 |
| DE | 29511030 | U1 | 9/1995 |
| EP | 0829004 | B1 | 10/2001 |
| EP | 2063362 | B1 | 12/2013 |
| GB | 2134655 | B | 5/1986 |
| JP | H02134527 | A | 5/1990 |
| JP | H0674846 | A | 3/1994 |
| JP | H08193848 | A | 7/1996 |
| JP | 2000261164 | A | 9/2000 |
| JP | 2004205373 | A | 7/2004 |
| JP | 2013221934 | A | 10/2013 |
| JP | 2018006022 | A | 1/2018 |
| KR | 20030006642 | A | 1/2003 |
| KR | 200400856 | Y1 | 11/2005 |
| RU | 2554157 | C2 | 6/2015 |
| RU | 2623833 | C1 | 6/2017 |
| WO | 9306437 | A1 | 4/1993 |
| WO | 20030089881 | A1 | 10/2003 |
| WO | 2011109206 | A1 | 9/2011 |
| WO | 2017017463 | A1 | 2/2017 |
| WO | 2019106346 | A1 | 6/2019 |
| WO | 2020224734 | A1 | 11/2020 |

* cited by examiner

4200

INTERFACE WITH IMPROVED ACCESSIBILITY

TECHNICAL FIELD

The embodiments described below relate to meters with an interface and, more particularly, to an interface with improved accessibility.

BACKGROUND

Vibratory meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring characteristics of fluids. Generally, vibratory meters comprise a sensor assembly and a meter electronics. The material within the sensor assembly may be flowing or stationary. The vibratory meter may be used to measure a mass flow rate, density, or other properties of a material in the sensor assembly. The meter electronics typically performs calculations to determine values of the mass flow rate, density, and other properties of the material in the sensor assembly.

The meter electronics is usually disposed in an interface, sometimes referred to as a transmitter, that is communicatively and/or mechanically coupled to the sensor assembly. In addition to including the meter electronics, the interface may also include a display that can show various data, such as parameters of the vibratory meter, historical data, communication status, or the like. However, due to the installation of the vibratory meter in industrial environments, access to the interface may be limited, restricted, obscured, etc. For example, the interface may be located in a position where a pipe obscures the display. For similar reasons, servicing or performing adjustments on the interface may be difficult. Accordingly, there is a need for an interface with improved accessibility.

SUMMARY

An interface with improved accessibility is provided. According to an embodiment, the interface comprises a housing and a meter electronics disposed inside the housing. The meter electronics being configured to affix to a connector extending into the housing.

A method for assembling an interface with improved accessibility is provided. According to an embodiment, the method comprises providing a housing, providing and disposing a meter electronics inside the housing, providing and extending a connector into the housing, and affixing the meter electronics to the connector extending into the housing.

An interface with improved accessibility is provided. According to an embodiment, the interface comprises a housing and a meter electronics. The meter electronics comprises an upper meter electronics, a lower meter electronics, and a barrier board disposed between and coupled to the upper meter electronics and the lower meter electronics. The interface also comprises a gasket disposed between and in contact with the barrier board and the housing so as to form a water-tight seal that separates an upper meter electronics portion of the housing and a lower meter electronics portion of the housing.

A method of assembling an interface with improved accessibility is provided. According to an embodiment, the method comprises providing a housing and providing a meter electronics. Providing the meter electronics comprises providing an upper meter electronics, providing a lower meter electronics, providing and disposing a barrier board between the upper meter electronics and the lower meter electronics, and coupling the barrier board to the upper meter electronics and the lower meter electronics. The method also comprises disposing and contacting a gasket between and with the barrier board and the housing so as to form a water-tight seal that separates an upper meter electronics portion of the housing and a lower meter electronics portion of the housing.

An interface having improved accessibility is provided. According to an embodiment, the interface comprises a housing having a display opening and a fascia disposed internal to the housing proximate the display opening. The fascia comprises a board and a wireless transceiver, wherein the board comprises an anterior side facing the display opening and a posterior side facing an internal portion of the housing. The wireless transceiver is disposed on the posterior side of the board and is configured to communicatively couple to a wireless device via an opening in the board.

A method of forming an interface having improved accessibility is provided. According to an embodiment, the method comprises providing a housing having a display opening, providing and disposing a fascia internal to the housing proximate the display opening, wherein providing the fascia comprises providing a board, wherein the board comprises an anterior side facing the display opening and a posterior side facing an internal portion of the housing. The method further comprises providing and disposing a wireless transceiver on the posterior side of the board, and configuring the wireless transceiver to communicatively couple to a wireless device via an opening in the board.

A communications system for improved accessibility of an interface is provided. According to an embodiment, the communications system comprises a wireless device and a fascia disposed internal to a housing of the interface, the fascia having a board and a wireless transceiver, wherein the board comprises an anterior side facing a display opening of the housing and a posterior side. The wireless transceiver is disposed on the posterior side of the board and is configured to communicatively couple to the wireless device via an opening in the board.

A meter electronics for improving accessibility of an interface is provided. According to an embodiment, the meter electronics comprises a processor disposed on an electronics board and a component disposed on the electronics board, the component being coupled to a pin of the processor, the pin of the processor being configured to couple to a component of a display board coupled to the electronics board. The component of the display board is redundant to the component of the electronics board.

A method for improving an accessibility of an interface is provided. According to an embodiment, the method comprises providing and disposing a processor on an electronics board, providing and disposing a component on the electronics board, coupling the component to a pin of the processor, and configuring the pin of the processor to couple to a component of a display board coupled to the electronics board. The component of the display board is redundant to the component of the electronics board.

An interface having improved accessibility is provided. According to an embodiment, the interface comprises a housing, a fascia disposed internal to the housing and proximate an opening of the housing, and a translating rod pivotably coupled to the fascia, the translating rod being configured to displace the fascia through the opening of the housing.

A method for improving an accessibility of an interface is provided. According to an embodiment, the method comprises providing a housing, providing and disposing a fascia internal to the housing and proximate an opening of the housing, and providing and pivotably coupling a translating rod to the fascia, the translating rod being configured to displace the fascia through the opening of the housing.

A method for improving an accessibility of an interface is provided. According to an embodiment, the method comprises displacing a fascia through an opening in a housing along a translation axis, the fascia being configured to at least one of rotate about the translation axis and pivot about a pivot axis.

A method for improving an accessibility of an interface is provided. According to an embodiment, the method comprises determining an operating value and adjusting a driving voltage provided to a display based on the determined operating value and a driving voltage-to-actual contrast relationship. The operating value corresponds to a temperature of a meter electronics providing the driving voltage.

A meter electronics for improving an accessibility of an interface is provided. According to an embodiment, the meter electronics comprises a processor configured to determine an operating value and a display driving circuit configured to provide a driving voltage to a display and adjust the driving voltage based on the operating value and a driving voltage-to-actual contrast relationship. The operating value corresponds to a temperature of a meter electronics providing the driving voltage.

ASPECTS

According to an aspect, an interface (402, 502, 602, 1202) with improved accessibility comprises a housing (430, 530, 630, 1230) and a meter electronics (420, 520, 620, 1220) disposed inside the housing (430, 530, 630, 1230). The meter electronics (420, 520, 620, 1220) being configured to affix to a connector (450, 550, 650, 1250) extending into the housing (430, 530, 630, 1230).

Preferably, the housing (530, 1230) is rotatably coupled to the connector (550, 1250) extending into the housing (530, 1230).

Preferably, the meter electronics (1220) comprises an electronics board (1220*b*); and a shell (1220*s*) affixed to the electronics board (1220*b*), the shell (1220*s*) being configured to affix to the connector (1250) extending into the housing (1230).

Preferably, the connector (450, 550, 650, 1250) extending into the housing (430, 530, 630, 1230) is part of a feedthrough (415, 515, 615, 1215) extending from one of a sensor assembly and a junction box.

Preferably, the interface (602, 1202) further comprises a receiving disk (617, 1217) rotatably disposed about the connector (650, 1250), wherein at least a portion of the receiving disk (617, 1217) is disposed between a retention ring (618, 1218) of the connector (650, 1250) and a wall (632, 1232) of the housing (630, 1230).

Preferably, the meter electronics (1220) further comprises posts (1224*p*) configured to mate with grooves (1217*g*) in the receiving disk (1217) and bolts (1224*b*) configured to mate with threaded holes (1217*h*) of the receiving disk (1217).

Preferably, the receiving disk (617, 1217) includes lobes (617*l*, 1217*l*) that interfaces with one of a groove (618*g*) and lips (1218*b*) of the retention ring (618, 1218) to retain the meter electronics (620, 1220) to the connector (650, 1250) extending into the housing (630, 1230).

Preferably, the meter electronics (1220) comprises a lower meter electronics (1224) configured to affix to the connector (1250) extending into the housing (1230) and an upper meter electronics (1222) configured to affix to the housing (1230) and configured to communicatively couple to the lower meter electronics (1224).

According to an aspect, a method for assembling an interface with improved accessibility comprises providing a housing, providing and disposing a meter electronics inside the housing, providing and extending a connector into the housing, and affixing the meter electronics to the connector extending into the housing.

Preferably, the method further comprises rotatably coupling the housing to the connector extending into the housing.

Preferably, providing and disposing the meter electronics inside the housing comprises providing an electronics board and providing and affixing a shell to the electronics board, providing and extending a connector into the housing, and affixing the shell to the connector extending into the housing.

Preferably, providing and extending the connector into the housing comprises providing and extending a feedthrough from one of a sensor assembly and a junction box into the housing.

Preferably, the method further comprises providing and rotatably disposing a receiving disk about the connector, wherein at least a portion of the receiving disk is disposed between a retention ring of the connector and a wall of the housing.

Preferably, providing the meter electronics further comprises providing posts, wherein providing the receiving disk comprises providing grooves and threaded holes in the receiving disk, and the method further comprises providing bolts, wherein the posts are configured to mate with the grooves and the bolts are configured to mate with the threaded holes of the receiving disk.

Preferably, providing the receiving disk comprises providing lobes that interfaces with one of a groove and lips of the retention ring to retain the meter electronics to the connector extending into the housing.

Preferably, providing the meter electronics comprises providing a lower meter electronics configured to affix to the connector extending into the housing and providing an upper meter electronics configured to affix to the housing and configured to communicatively couple to the lower meter electronics.

According to an aspect, an interface (2202) with improved accessibility comprises a housing (2230) and a meter electronics (2220). The meter electronics (2220) comprises an upper meter electronics (2222), a lower meter electronics (2224), and a barrier board (2223) disposed between and coupled to the upper meter electronics (2222) and the lower meter electronics (2224). The interface (2202) also comprises a gasket (2230*o*) disposed between and in contact with the barrier board (2223) and the housing (2230) so as to form a water-tight seal that separates an upper meter electronics portion (2230*u*) of the housing (2230) and a lower meter electronics portion (22301) of the housing (2230).

Preferably, the barrier board (2223) is without holes that traverse the barrier board (2223) interior to the gasket (2230*o*).

Preferably, the gasket (2230*o*) comprises an o-ring compressed between the housing (2230) and the barrier board (2223).

Preferably, the gasket (22300) being disposed between and in contact with the barrier board (2223) and the housing (2230) comprises the gasket (22300) being disposed between and in contact with a boss (2230*s*) of the housing (2230) and the barrier board (2223).

Preferably, the interface (2202) further comprises a plurality of fasteners (2230*b*) disposed proximate the gasket (2230*o*) and configured to affix the barrier board (2223) to the boss (2230*s*) of the housing (2230).

Preferably, the plurality of fasteners (2230*b*) are disposed in at least one of the upper meter electronics portion (2230*u*) of the housing (2230) and the lower meter electronics portion (22301) of the housing (2230).

Preferably, the plurality of fasteners (2230*b*) are disposed through the barrier board (2223) into the boss (2230*s*) of the housing (2230).

According to an aspect, a method of assembling an interface with improved accessibility comprises providing a housing and providing a meter electronics.

Providing the meter electronics comprises providing an upper meter electronics, providing a lower meter electronics, providing and disposing a barrier board between the upper meter electronics and the lower meter electronics, and coupling the barrier board to the upper meter electronics and the lower meter electronics. The method also comprises disposing and contacting a gasket between and with the barrier board and the housing so as to form a water-tight seal that separates an upper meter electronics portion of the housing and a lower meter electronics portion of the housing.

Preferably, providing the barrier board comprises forming the barrier board without holes that traverse the barrier board interior to the gasket.

Preferably, providing the gasket comprises providing an o-ring and compressing the o-ring between the housing and the barrier board.

Preferably, disposing and contacting the gasket between and with the barrier board and the housing comprises disposing and contacting the gasket between and with the barrier board and a boss of the housing.

Preferably, the method further comprises disposing a plurality of fasteners proximate the gasket and affixing the barrier board to the boss of the housing using the plurality of fasteners.

Preferably, the method further comprises disposing the plurality of fasteners in at least one of the upper meter electronics portion of the housing and the lower meter electronics portion of the housing.

Preferably, the method further comprises disposing the plurality of fasteners through the barrier board into the boss of the housing.

According to an aspect, an interface (2502) having improved accessibility comprises a housing (2530) having a display opening (2532) and a fascia (2540) disposed internal to the housing (2530) proximate the display opening (2532). The fascia (2540) comprises a board (2540*b*) and a wireless transceiver (2548), wherein the board (2540*b*) comprises an anterior side (2540*ba*) facing the display opening (2532) and a posterior side (2540*bp*) facing an internal portion of the housing (2530). The wireless transceiver (2548) is disposed on the posterior side (2540*bp*) of the board (2540*b*) and is configured to communicatively couple to a wireless device (2501) via an opening (2540*bo*) in the board (2540*b*).

Preferably, the fascia (2540) further comprises a fascia chassis (2543) mechanically coupled to the board (2540*b*), the fascia chassis (2543) including a slot (2543*s*) proximate the wireless transceiver (2548).

Preferably, a display (2544) that is coupled to the anterior side (2540*ba*) of the board (2540*b*).

Preferably, the display (2544) is disposed proximate the opening (2540*bo*) of the board (2540*b*).

Preferably, the display (2544) is disposed opposite the wireless transceiver (2548) on the board (2540*b*).

Preferably, the wireless transceiver (2548) includes an antenna (2548*a*) that is disposed proximate the opening (2540*bo*) in the board (2540*b*) and the slot (2543*s*) in the fascia chassis (2543).

According to an aspect, a method of forming an interface having improved accessibility comprises providing a housing having a display opening, providing and disposing a fascia internal to the housing proximate the display opening, wherein providing the fascia comprises providing a board, wherein the board comprises an anterior side facing the display opening and a posterior side facing an internal portion of the housing. The method further comprises providing and disposing a wireless transceiver on the posterior side of the board, and configuring the wireless transceiver to communicatively couple to a wireless device via an opening in the board.

Preferably, providing the fascia further comprises providing a fascia chassis and mechanically coupling the fascia chassis to the board such that a slot in the fascia chassis is proximate the wireless transceiver.

Preferably, the method further comprises providing and coupling a display to the anterior side of the board.

Preferably, the method further comprises disposing the display proximate the opening of the board.

Preferably, the method further comprises disposing the display opposite the wireless transceiver on the board.

Preferably, providing the wireless transceiver includes providing an antenna and disposing the antenna to the opening in the board and the slot in the fascia chassis.

According to an aspect, a communications system (2500) for improved accessibility of an interface (2502) comprises a wireless device (2501) and a fascia (2540) disposed internal to a housing (2530) of the interface (2502), the fascia (2540) having a board (2540*b*) and a wireless transceiver (2548), wherein the board (2540*b*) comprises an anterior side (2540*ba*) facing a display opening (2532) of the housing (2530) and a posterior side (2540*bp*). The wireless transceiver (2548) is disposed on the posterior side (2540*bp*) of the board (2540*b*) and is configured to communicatively couple to the wireless device (2501) via an opening (2540*bo*) in the board (2540*b*).

Preferably, the fascia (2540) further comprises a fascia chassis (2543) mechanically coupled to the board (2540*b*), the fascia chassis (2543) including a slot (2543*s*) proximate the wireless transceiver (2548).

Preferably, the communications system (2500) further comprises a display (2544) that is coupled to the anterior side (2540*ba*) of the board (2540*b*).

Preferably, the display (2544) is disposed proximate the opening (2540*bo*) of the board (2540*b*).

Preferably, the display (2544) is disposed opposite the wireless transceiver (2548).

Preferably, the wireless transceiver (2548) includes an antenna (2548*a*) that is disposed proximate the opening (2540*bo*) in the board (2540*b*) and the slot (2543*s*) in the fascia chassis (2543).

According to an aspect, a meter electronics (3220) for improving accessibility of an interface (3202) comprises a processor (3228) disposed on an electronics board (3220*b*) and a component (3226) disposed on the electronics board (3220*b*), the component (3226) being coupled to a pin of the processor (3228), the pin of the processor (3228) being configured to couple to a component (3246) of a display board (3240*b*) coupled to the electronics board (3220*b*). The component (3246) of the display board (3240*b*) is redundant to the component (3226) of the electronics board (3220*b*).

Preferably, the pin of the processor (3228) is configured to couple to the component (3246) of the display board (3240*b*) via a connector (3247) coupling the display board (3240*b*) to the electronics board (3220*b*).

Preferably, the component (3226) of the electronics board (3220*b*) is one of a light emitting diode (32261) and a switch (3226*s*) of the electronics board (3220*b*) and the component (3246) of the display board (3240*b*) is one of a light emitting diode (32461) and a switch (3246*s*) of the display board (3240*b*).

Preferably, the pin of the processor (3228) is coupled to a first terminal of the component (3226) of the electronics board (3220*b*) and a second terminal of the component (3226) is coupled to a ground (3220*g*).

Preferably, the meter electronics (3220) further comprises the display board (3240*b*) wherein the pin of the processor (3228) is coupled to the component (3246) of the display board (3240*b*).

Preferably, the pin of the processor (3228) is coupled to a first terminal of the component (3246) of the display board (3240*b*) and a second terminal of the component (3246) of the display board (3240*b*) is coupled to a ground (3220*g*).

Preferably, the meter electronics (3220) further comprises an amplifier (3222*a*, 3222*b*) having an output coupled to the component (3226) disposed in the electronics board (3220), the amplifier (3222*a*, 3222*b*) being an inverter configured to invert a signal from the processor (3228) to the component (3226).

According to an aspect, a method for improving an accessibility of an interface comprises providing and disposing a processor on an electronics board, providing and disposing a component on the electronics board, coupling the component to a pin of the processor, and configuring the pin of the processor to couple to a component of a display board coupled to the electronics board. The component of the display board is redundant to the component of the electronics board.

Preferably, configuring the pin of the processor to couple to the component of the display board comprises configuring the pin to couple to the component of the display board via a connector coupling the display board to the electronics board.

Preferably, providing the component of the electronics board comprises providing one of a light emitting diode and a switch of the electronics board and providing the component of the display board comprises providing one of a light emitting diode and a switch of the display board.

Preferably, coupling the component to the pin of the processor comprises coupling the pin of the processor to a first terminal of the component of the electronics board and coupling a second terminal of the component to a ground.

Preferably, the method further comprises providing the display board and coupling the pin of the processor to the component of the display board.

Preferably, coupling the pin of the processor to the component of the display board comprises coupling the pin of the processor to a first terminal of the component of the display board and coupling a second terminal of the component of the display board to a ground.

Preferably, the method further comprises providing an amplifier having an output and coupling the output to the component disposed in the electronics board, being an inverter configured to invert a signal from the processor to the component.

According to an aspect, an interface (3402) having improved accessibility comprises a housing (3430), a fascia (3440) disposed internal to the housing (3430) and proximate an opening (3430*o*) of the housing (3430), and a translating rod (3440*t*) pivotably coupled to the fascia (3440), the translating rod (3440*t*) being configured to displace the fascia (3440) through the opening (3430*o*) of the housing (3430).

Preferably, the translating rod (3440*t*) being pivotably coupled to the fascia (3440) comprises the fascia (3440) being configured to rotate about a translating axis (3440*at*) that is collinear to a longitudinal axis of the translating rod (3440*t*).

Preferably, the translating rod (3440*t*) being pivotably coupled to the fascia (3440) comprises the fascia (3440) being configured to rotate about a pivoting axis (3440*ap*) that is orthogonal to a longitudinal axis of the translating rod (3440*t*).

Preferably, the translating rod (3440*t*) being configured to displace the fascia (3440) through the opening (3430*o*) of the housing (3430) comprises the translating rod (3440*t*) being configured to displace the fascia (3440) in a direction collinear with a longitudinal axis of the translating rod (3440*t*).

Preferably, the translating rod (3440*t*) is pivotably coupled to the fascia (3440) at a pivot point (3440*p*).

Preferably, the pivot point (3440*p*) is located where a pivot axis (3440*ap*) and a translation axis (3440*at*) are coincident, where the fascia (3440) pivots about the pivot axis (3440*ap*) and rotates about the translation axis (3440*at*).

According to an aspect, a method for improving an accessibility of an interface comprises providing a housing, providing and disposing a fascia internal to the housing and proximate an opening of the housing, and providing and pivotably coupling a translating rod to the fascia, the translating rod being configured to displace the fascia through the opening of the housing.

Preferably, pivotably coupling the translating rod to the fascia comprises configuring the fascia to rotate about a translating axis that is collinear to a longitudinal axis of the translating rod.

Preferably, pivotably coupling the translating rod to the fascia comprises configuring the fascia to rotate about a pivoting axis that is orthogonal to a longitudinal axis of the translating rod.

Preferably, configuring the translating rod to displace the fascia through the opening of the housing comprises configuring the translating rod to displace the fascia in a direction collinear with a longitudinal axis of the translating rod.

Preferably, pivotably coupling the translating rod to the fascia comprises pivotably coupling the translating rod to the fascia at a pivot point.

Preferably, the pivot point is located where a pivot axis and a translation axis are coincident, wherein the fascia pivots about the pivot axis and rotates about the translation axis.

According to an aspect, a method for improving an accessibility of an interface comprises displacing a fascia through an opening in a housing along a translation axis, the fascia being configured to at least one of rotate about the translation axis and pivot about a pivot axis.

Preferably, the method further comprises at least one of rotating the fascia about the translation axis and pivoting the fascia about the pivot axis.

Preferably, the translation axis and the pivot axis are collocal at a pivot point, and the fascia is configured to rotate and pivot about the pivot point.

According to an aspect, a method for improving an accessibility of an interface comprises determining an operating value and adjusting a driving voltage provided to a display based on the determined operating value and a driving voltage-to-actual contrast relationship. The operating value corresponds to a temperature of a meter electronics providing the driving voltage.

Preferably, the method further comprises determining a contrast value based on the determined operating value and the driving voltage-to-actual contrast relationship and adjusting the driving voltage based on the contrast value.

Preferably, the method further comprises setting a register value in a display driving circuit based on the determined contrast value.

Preferably, the operating value is the driving voltage provided to the display.

Preferably, the method further comprises determining the contrast value from a relationship between the driving voltage and the contrast value.

Preferably, the operating value is a temperature of the meter electronics providing the driving voltage to the display.

Preferably, the method further comprises determining the contrast value based on a relationship between the temperature of the meter electronics and the contrast value.

According to an aspect, a meter electronics (4420) for improving an accessibility of an interface comprises a processor (4420*p*) configured to determine an operating value and a display driving circuit (4420*d*) configured to provide a driving voltage to a display (4440) and adjust the driving voltage based on the operating value and a driving voltage-to-actual contrast relationship. The operating value corresponds to a temperature of a meter electronics providing the driving voltage.

Preferably, the processor (4420*p*) is further configured to determine a contrast value based on the determined operating value and the driving voltage-to-actual contrast relationship and adjusting the driving voltage based on the contrast value.

Preferably, the meter electronics (4420) is further configured to set a register value in the display driving circuit (4420*d*) based on the determined contrast value.

Preferably, the operating value is the driving voltage provided to the display (4440).

Preferably, the processor (4420*p*) is further configured to determine the contrast value from a relationship between the driving voltage and the contrast value.

Preferably, the operating value is a temperature of the meter electronics (4420) providing the driving voltage to the display (4440).

Preferably, the processor (4420*p*) is further configured to determine the contrast value based on a relationship between the temperature of the meter electronics (4420) and the contrast value.

BRIEF DESCRIPTION OF THE DRAWINGS

The same reference number represents the same element on all drawings. It should be understood that the drawings are not necessarily to scale.

DETAILED DESCRIPTION

FIGS. 1-47 and the following description depict specific examples to teach those skilled in the art how to make and use the best mode of embodiments of an interface with improved accessibility. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of using the interface with improved accessibility. As a result, the embodiments described below are not limited to the specific examples described below, but only by the claims and their equivalents.

Figure 1:
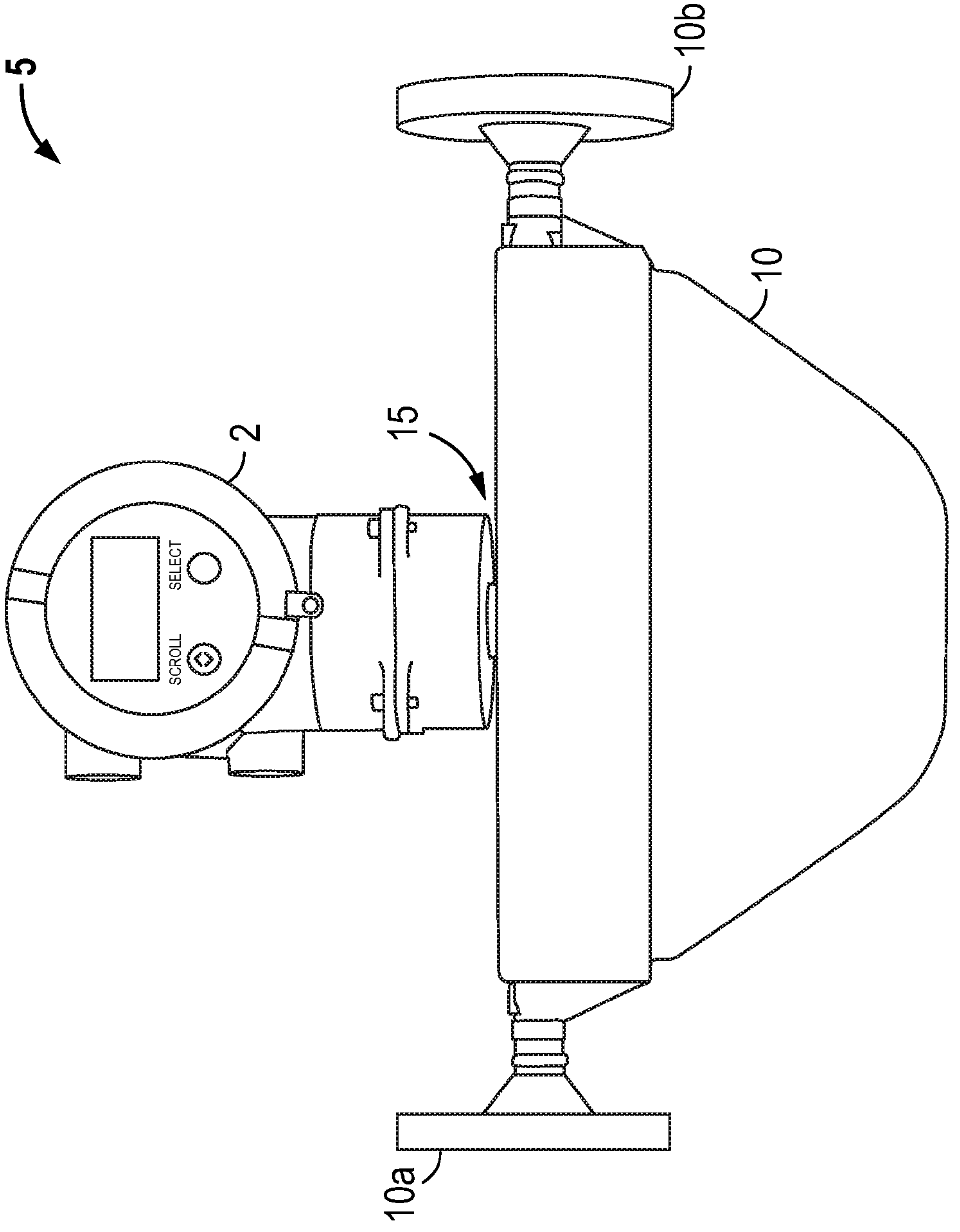
FIG. 1 shows a vibratory meter 5 having an interface 2 with improved accessibility.

FIG. 1 shows a vibratory meter 5 having an interface 2 with improved accessibility. As shown in FIG. 1, the vibratory meter 5 includes a sensor assembly 10 that is mechanically and communicatively coupled to the interface 2 via a feedthrough 15. The sensor assembly 10 may be inserted into a pipeline at flanges 10*a*, 10*b* to receive and measure, and return, a material to the pipeline. The interface 2 has improved accessibility.

For example, the interface 2 may rotate relative to the sensor assembly 10 allowing for easier viewing of a display of the interface 2. The interface 2 may also be configured to be more easily serviced by, for example, allowing for the display to be removed and pivoted without being detached from the interface 2. The improvements to accessibility also include improvements to how the interface 2 operates. For example, a contrast of the display in the interface 2 may be automatically adjusted to be visible in different environmental conditions. The display may also be automatically detected by the meter electronics in the interface 2, thereby simplifying configuration. These and other aspects are described in more detail in the following.

Figure 2:
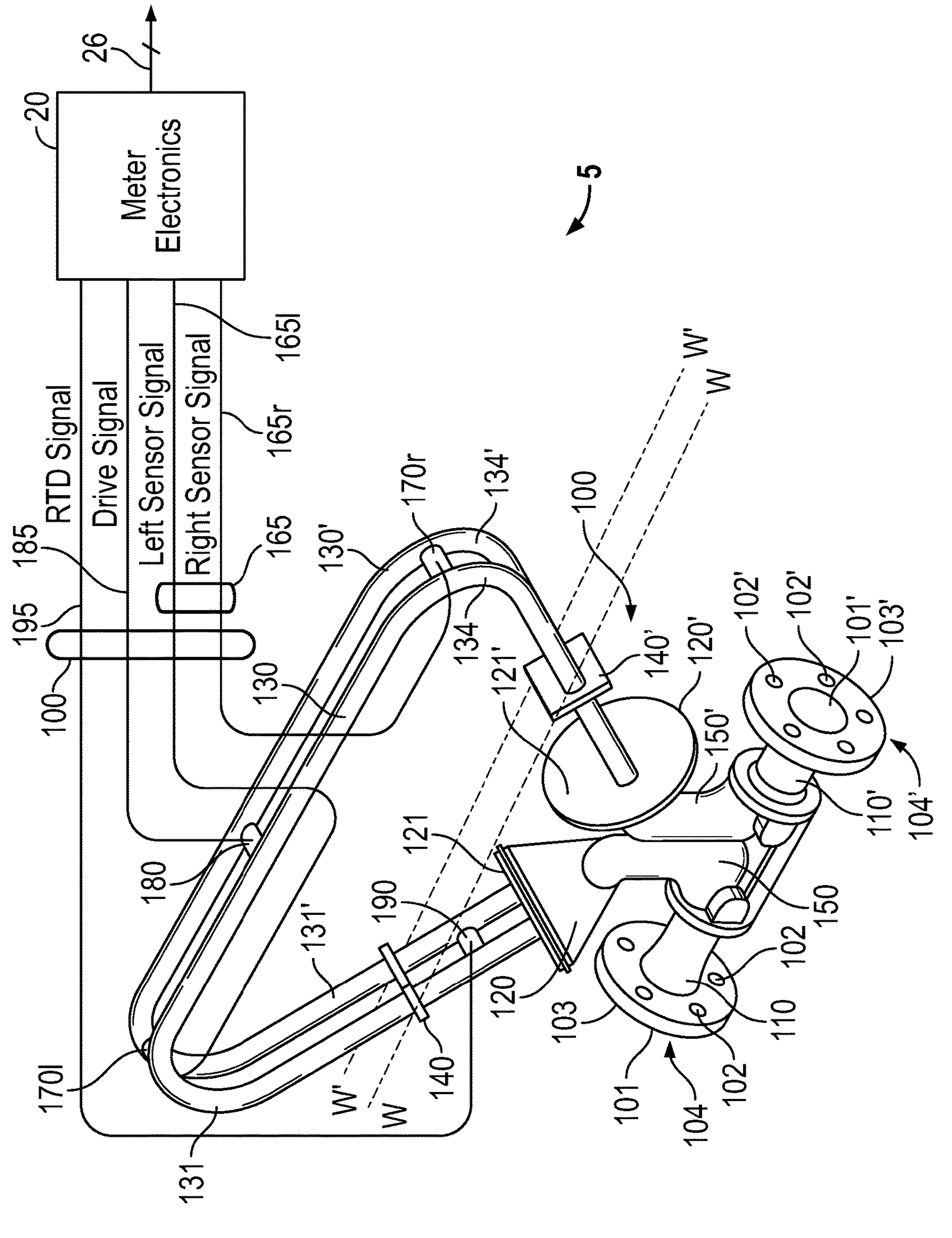
FIG. 2 shows the vibratory meter 5 including the interface 2 with improved accessibility, where housings for the interface 2 and the sensor assembly 10 are not shown for clarity.

FIG. 2 shows the vibratory meter 5 including the interface 2 with improved accessibility, where housings for the interface 2 and the sensor assembly 10 are not shown for clarity. As shown in FIG. 1, the vibratory meter 5 comprises a sensor assembly 10 and meter electronics 20, where the meter electronics 20 is disposed in the rotatable interface 2 shown in FIG. 1. The sensor assembly 10 responds to mass flow rate and density of a process material. The meter electronics 20 is connected to the sensor assembly 10 via leads 100 to provide density, mass flow rate, and temperature information over port 26, as well as other information.

The sensor assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 1701 and 170*r*. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by the lead carrying the RTD signal 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal 185 is applied by the meter electronics 20, via a lead, to the driver 180.

The meter electronics 20 receives the RTD signal 195 on a lead, and sensor signals 165 appearing on leads 100 carrying left and right sensor signals 1651, 165*r*, respectively. The meter electronics 20 produces the drive signal 185 appearing on the lead to driver 180 and vibrate conduits 130, 130'. The meter electronics 20 processes the left and right sensor signals 1651, 165*r* and the RTD signal 195 to compute the mass flow rate and the density of the material passing through sensor assembly 10. This information, along with other information, is applied by meter electronics 20 over path 26 as a signal. A more detailed discussion of the vibratory meter 5 and meter electronics 20 follows.

Figure 3:
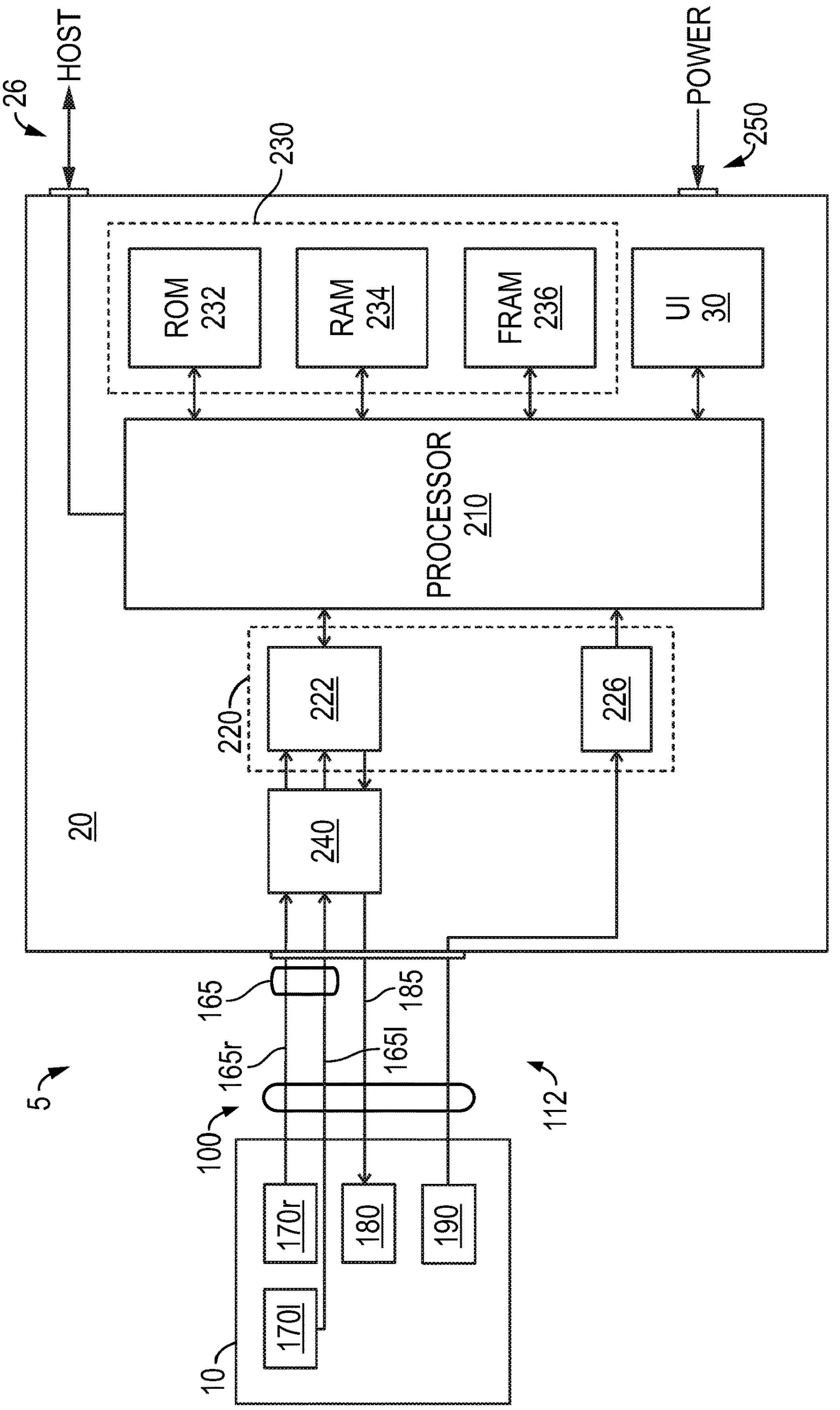
FIG. 3 shows a block diagram of the vibratory meter 5, including a block diagram representation of the meter electronics 20.

FIG. 3 shows a block diagram of the vibratory meter 5, including a block diagram representation of the meter electronics 20. As shown in FIG. 2, the meter electronics 20 is communicatively coupled to the sensor assembly 10. As described in the foregoing with reference to FIG. 2, the sensor assembly 10 includes the left and right pick-off sensors 1701, 170*r*, driver 180, and RTD 190, which are communicatively coupled to the meter electronics 20 via the set of leads 100 through a communications channel 112.

The meter electronics 20 provides a drive signal 185 via the leads 100. More specifically, the meter electronics 20 provides a drive signal 185 to the driver 180 in the sensor assembly 10. In addition, sensor signals 165 comprising the left sensor signal 1651 and the right sensor signal 165*r* are provided by the sensor assembly 10. More specifically, in the embodiment shown, the sensor signals 165 are provided by the left and right pick-off sensor 1701, 170*r* in the sensor assembly 10. As can be appreciated, the sensor signals 165 are respectively provided to the meter electronics 20 through the communications channel 112.

The meter electronics 20 includes a processor 210 communicatively coupled to one or more signal processors 220 and one or more memories 230. The processor 210 is also communicatively coupled to a user interface 30. The processor 210 is communicatively coupled with the host via a communication port over the port 26 and receives electrical power via an electrical power port 250. The processor 210 may be a microprocessor although any suitable processor may be employed. For example, the processor 210 may be comprised of sub-processors, such as a multi-core processor, serial communication ports, peripheral interfaces (e.g., serial peripheral interface), on-chip memory, I/O ports, and/or the like. In these and other embodiments, the processor 210 is configured to perform operations on received and processed signals, such as digitized signals.

The processor 210 may receive digitized sensor signals from the one or more signal processors 220. The processor 210 may also receive signals from transducers, such as a viscometer, densimeter, and/or the like, via, for example, the port. That is, a transducer may be communicatively coupled to the processor 210 via the port 26. The transducers may be fluidly coupled to the sensor assembly 10. The transducer or transducers may be upstream and/or downstream from the sensor assembly 10. Accordingly, the processor 210 may be configured to determine fluid properties such as mass flow rate, density, viscosity, or the like, using the digitized sensor signals and/or signal provided by the transducers.

The processor 210 is also configured to provide information, such as a time delay, a property of a fluid in the sensor assembly 10, or the like. The processor 210 may provide the information to the host through the port 26. The processor 210 may also be configured to communicate with the one or more memories 230 to receive and/or store information in the one or more memories 230. For example, the processor 210 may receive calibration factors and/or sensor assembly zeros (e.g., time difference when there is zero flow) from the one or more memories 230. Each of the calibration factors and/or sensor assembly zeros may respectively be associated with the vibratory meter 5 and/or the sensor assembly 10. The processor 210 may use the calibration factors to process digitized sensor signals received from the one or more signal processors 220.

The one or more signal processors 220 is shown as being comprised of an encoder/decoder (CODEC) 222 and an analog-to-digital converter (ADC) 226. The one or more signal processors 220 may condition analog signals, digitize the conditioned analog signals, and/or provide the digitized signals. The CODEC 222 is configured to receive the sensor signals 165 from the left and right pick-off sensors 1701, **170*r*. The CODEC 222 is also configured to provide the drive signal 185 to the driver 180**. In alternative embodiments, more or fewer signal processors may be employed.

As shown, the sensor signals 165 are provided to the CODEC 222 via a signal conditioner 240. The drive signal 185 is provided to the driver 180 via the signal conditioner 240. Although the signal conditioner 240 is shown as a single block, the signal conditioner 240 may be comprised of signal conditioning components, such as two or more op-amps, filters, such as low pass filters, voltage-to-current amplifiers, or the like. For example, the sensor signals 165 may be amplified by a first amplifier and the drive signal 185 may be amplified by the voltage-to-current amplifier. The amplification can ensure that the magnitude of the sensor signals 165 is approximate the full-scale range of the CODEC 222.

In the embodiment shown, the one or more memories 230 is comprised of a read-only memory (ROM) 232, random access memory (RAM) 234, and a ferroelectric random-access memory (FRAM) 236. However, in alternative embodiments, the one or more memories 230 may be comprised of more or fewer memories. Additionally, or alternatively, the one or more memories 230 may be comprised of different types of memory (e.g., volatile, non-volatile, etc.). For example, a different type of non-volatile memory, such as, for example, erasable programmable read only memory (EPROM), or the like, may be employed instead of the FRAM 236. The one or more memories 230 may be a storage configured to store process data, such as drive or sensor signals, mass flow rate or density measurements, etc.

A mass flow rate measurement ($\dot{m}$) can be generated according to the equation:

$$\dot{m} = FCF[\Delta t - \Delta t_0]. \quad \text{Equation [1]}$$

The $\Delta t$ term comprises an operationally-derived (i.e., measured) time delay value comprising the time delay existing between the pickoff sensor signals, such as where the time delay is due to Coriolis effects related to mass flow rate through the vibratory meter 5. The measured $\Delta t$ term ultimately determines the mass flow rate of the flow material as it flows through the vibratory meter 5. The $\Delta t_0$ term comprises a time delay at zero flow calibration constant. The $\Delta t_0$ term is typically determined at the factory and programmed into the vibratory meter 5. The time delay at zero flow $\Delta t_0$ term may not change, even where flow conditions are changing. A mass flow rate of flow material flowing through the flow meter is determined by multiplying a measured time delay by the flow calibration factor FCF. The flow calibration factor FCF is proportional to a physical stiffness of the flow meter.

As to density, a resonance frequency at which each conduit 130, 130' will vibrate may be a function of the square root of a spring constant of the conduit 130, 130' divided by the total mass of the conduit 130, 130' having a material. The total mass of the conduit 130, 130' having the material may be a mass of the conduit 130, 130' plus a mass of a material inside the conduit 130, 130'. The mass of the material in the conduit 130, 130' is directly proportional to the density of the material. Therefore, the density of this material may be proportional to the square of a period at which the conduit 130, 130' containing the material oscillates multiplied by the spring constant of the conduit 130, 130'. Hence, by determining the period at which the conduit 130, 130' oscillates and by appropriately scaling the result, an accurate measure of the density of the material contained by the conduit 130, 130' can be obtained. The meter electronics 20 can determine the period or resonance frequency using the sensor signals 165 and/or the drive signal 185.

As discussed above, the meter electronics 20 may be in the interface 2 with improved accessibility. Also as mentioned above, the accessibility of the interface 2 may be improved in various ways, which are discussed in the following, beginning with a meter electronics being affixed to a connector of a feedthrough so as to simplify assembly and/or allowing an interface to rotate relative to a sensor assembly.

Meter Electronics Mounted on a Connector

A meter electronics may be connected to a connector extending into a housing using a cable. However, using the cable may have associated issues. For example, the cable must be long enough to allow for sufficient space between the housing and the meter electronics to access the cable. That is, a user installing the cable onto the connector must be able to access the cable. The cable may cause electromagnetic compatibility issues. For example, the cable may not have sufficient grounding to a ground or external body of the connector and the housing to prevent electromagnetic noise from interfering with, for example, some electronic components in the meter electronics or electronics outside the housing.

Figure 4:
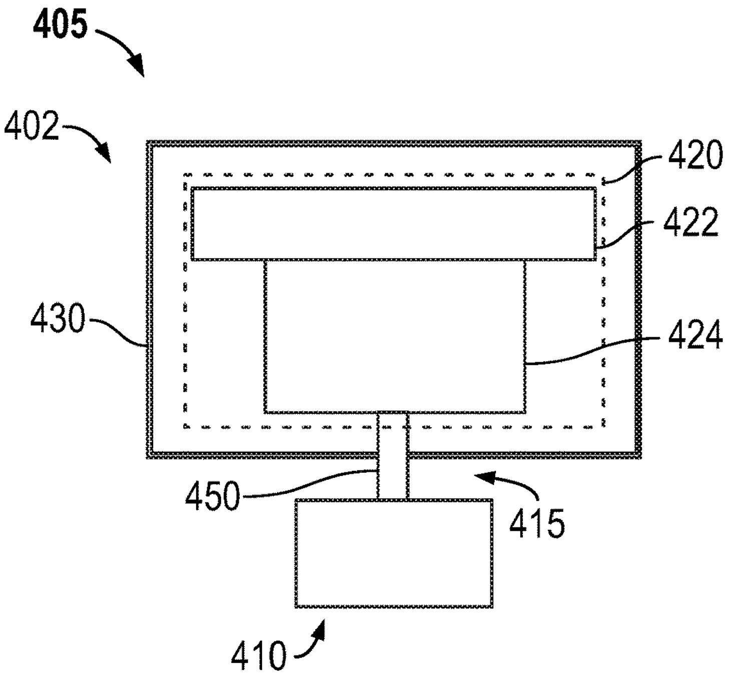
FIGS. 4 and 5 show block diagrams of a vibratory meter 405, 505 including an interface 402, 502 with improved accessibility.
Figure 5:
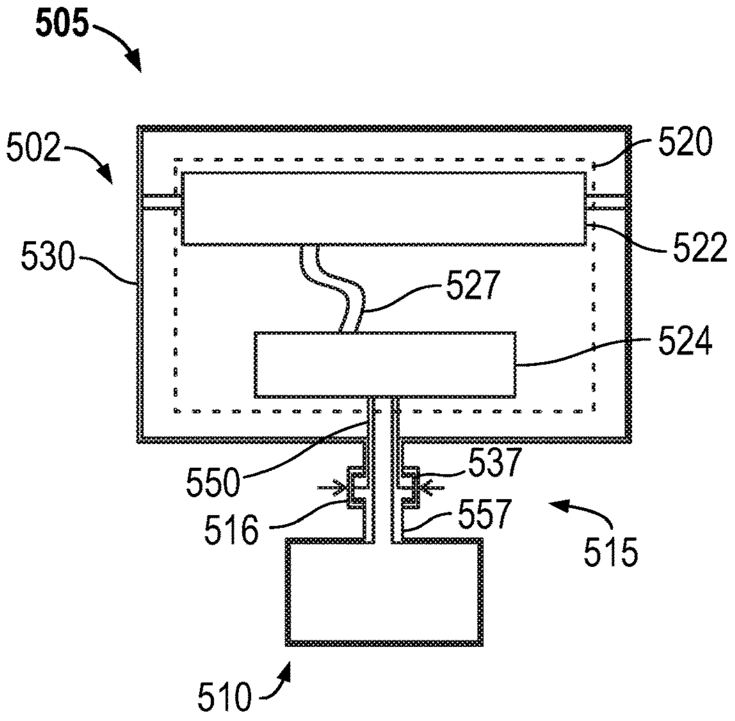

FIGS. 4 and 5 show block diagrams of a vibratory meter 405, 505 including an interface 402, 502 with improved accessibility. The block diagrams may represent the vibratory meter 5 described above, although the block diagram may be representative of any suitable vibratory meter. As shown in FIGS. 4 and 5, the interface 402, 502 is mechanically and/or communicatively coupled to a vibratory meter 410, 510 via a feedthrough 415, 515. Meter electronics 420, 520 are disposed in a housing 430, 530 and are affixed to a connector 450, 550 extending into the housing 430, 530. The meter electronics 420, 520 is comprised of an upper meter electronics 422, 522 and a lower meter electronics 424, 524. The lower meter electronics 424, 524 is affixed to the connector 450, 550.

As shown in FIG. 4, the upper meter electronics 422 is not affixed to the housing 430 but the lower and upper meter electronics 422, 424 are affixed to each other. In addition, the housing 430 is rigidly coupled to the connector 450. An exemplary embodiment of the interface 402 shown in FIG. 4 is described with reference to FIGS. 6 and 7.

As shown in FIG. 5, the upper and lower meter electronics 522, 524 are not affixed to each other, but are communicatively coupled to each other via a cable 527. The upper meter electronics 522 also shown in FIG. 5 is affixed to the housing 530. The connector 550 shown in FIG. 5 as extending into the housing 530 includes a connector flange 557. The connector flange 557 is shown as abutting a housing flange 537. The connector flange 557 and the housing flange 537 are compressed together in a direction axial to a longitudinal length of the connector 550. The connector flange 557 and housing flange 537 are pressed together by the coupler 516. More specifically, the coupler 516 clamps about the connector flange 557 and the housing flange 537 so as to press the housing flange 537 and the connector flange 557 together. The coupler 516 may also prevent lateral and/or bend displacements of the housing flange 537 and the connector flange 557. An exemplary embodiment of the interface 502 is described with reference to FIGS. 12-20 after an embodiment similar to the interface 402 shown in FIG. 4 is discussed in the following.

Non-Rotatable Housing

Figure 7:
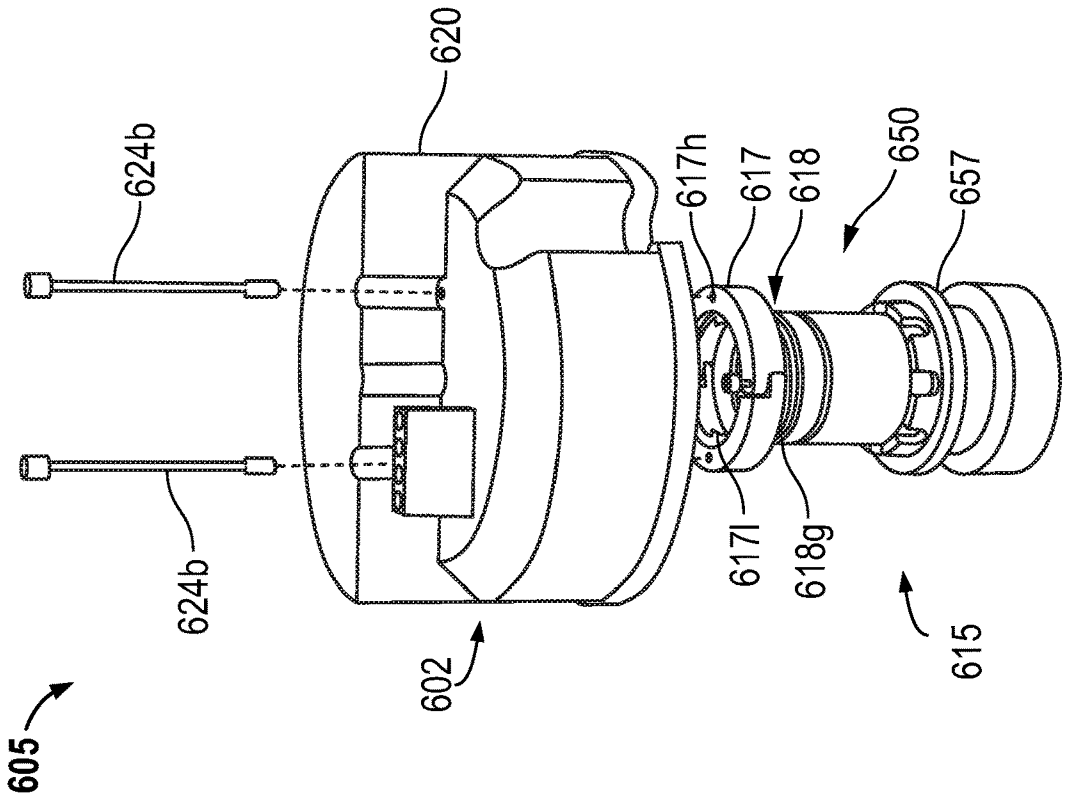
FIGS. 6 and 7 show partial perspective views of a vibratory meter 605 that includes an interface 602 with improved accessibility.
Figure 6:
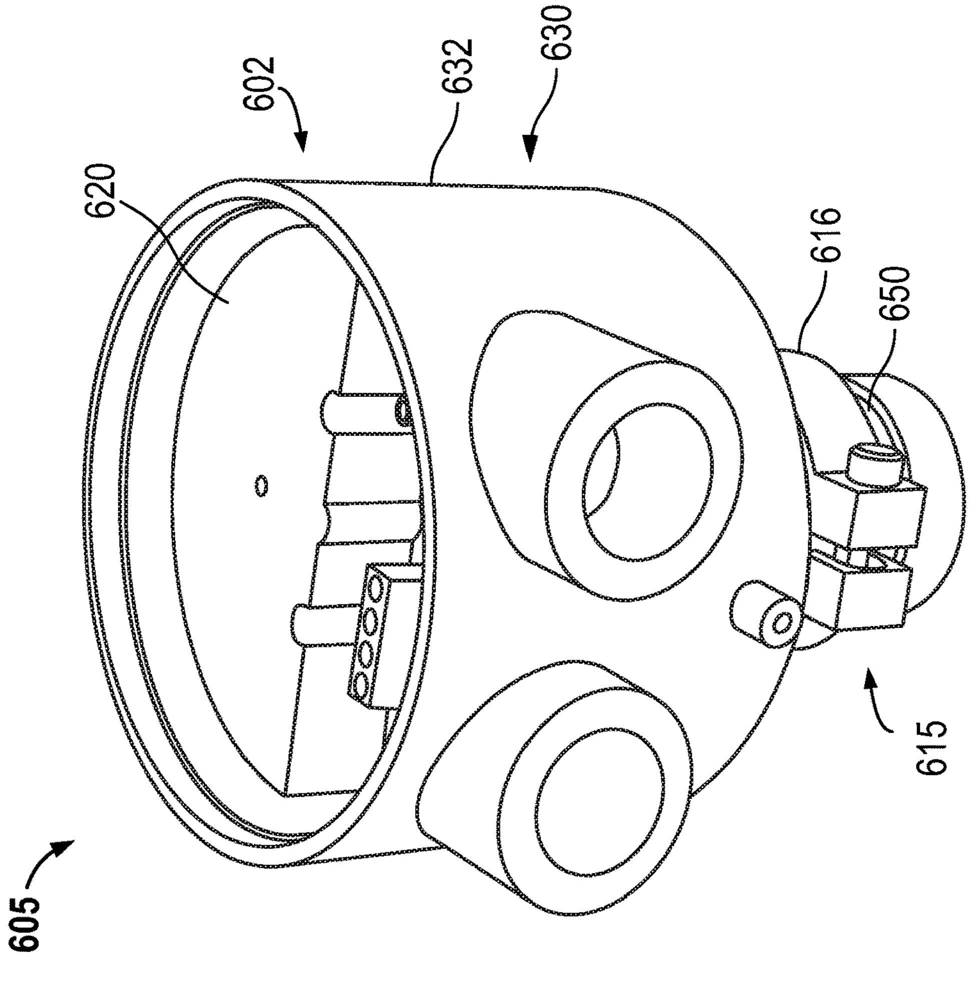

FIGS. 6 and 7 show partial perspective views of a vibratory meter 605 that includes an interface 602 with improved accessibility. As shown in FIGS. 6 and 7, the interface 602 is mechanically and/or communicatively coupled to a sensor assembly (not shown for clarity) via a feedthrough 615. The feedthrough 615 includes a connector 650 that extends into a housing 630 of the interface 602. In FIG. 7, the housing 630 is not shown to illustrate how a meter electronics 620 may be affixed to the connector 650. The interface 602 and feedthrough 615 may respectively be similar to the interface 402 and feedthrough 415 of FIG. 4 in that the meter electronics 620 is affixed to the connector 650 without necessarily affixing the meter electronics 620 to the housing 630.

As shown in FIG. 6, the housing 630 includes a wall 632 that contains the meter electronics 620. The housing 630 is coupled to the connector 650 with a coupler 616. The coupler 616 is shown as a clamp with a screw, although any suitable coupler may be employed. The coupler 616 may surround, encompass, and engage or interface with a housing flange (not shown) of the housing 630 and a connector flange 657 (shown in FIG. 7) of the connector 650 to retain the housing 630 to the connector 650. Accordingly, the coupler 616 may rigidly affix the housing 630 to the connector 650.

With reference to FIG. 7, the meter electronics 620 is affixed to the connector 650 using a receiving disk 617. The meter electronics 620 is coupled to the receiving disk 617 with two bolts **624*b* that extend through the meter electronics 620 into threaded holds 617*h* of the receiving disk 617. The bolts 624*b* may rigidly affix the meter electronics 620 to the receiving disk 617. The receiving disk 617 surrounds, encompasses, and couples to the meter electronics 620 and the connector 650. In the example shown in FIG. 7, the receiving disk 617 is a clamp that engages with the connector 650, although any suitable receiving disk may be employed. The receiving disk 617 may be configured to immovably clamp to the connector 650, thereby retaining or rigidly affixing the meter electronics 620 to the connector 650**.

In particular, the receiving disk 617 may engage with a retention ring 618 of the connector 650. As shown in FIG. 7, the receiving disk 617 includes lobes **617*l* extended radially inward or internal to the receiving disk 617, although any suitable engagement feature may be employed. The receiving disk 617 is rotatably disposed about the connector 650. A portion of the receiving disk 617 is disposed between the retention ring 618 and the wall 632 of the housing 630. The retention ring 618 includes a groove 618*g* extending circumferentially about the connector 650, although any suitable retention feature may be employed. The lobes 617*l* extend into and interface with the groove 618*g*. By affixing the meter electronics 620 to the connector 650, an internal portion of the housing 630 may be more accessible to, for example, users and/or a device servicing the interface 602**.

More specifically, if a meter electronics were not configured to be affixed to a connector extending into a housing of an interface, then a cable may be required to communicatively couple the meter electronics to the connector. Due to the meter electronics being disposed in the housing, the cable coupling the meter electronics to the connector must necessarily have sufficient length to connect the cable to the connector while the meter electronics is at least partially outside the housing. That is, a space between the meter electronics and an internal portion of the housing must be sufficient to allow a hand or device to reach in and connect the cable to the meter electronics.

As shown in FIGS. 6 and 7 and described above the meter electronics 620 is affixed to the connector 650 by using the two bolts **624*b* that affix the meter electronics 620 to the receiving disk 617. The receiving disk 617 may be clamped to and/or about the connector 650. The receiving disk 617 is disposed internal to the housing 630 about the connector 650. The receiving disk 617 may also be disposed about the connector flange 637 of the connector 650 so as to affix the meter electronics 620 to the connector 650 extending into the housing 630. The housing 630 may also be affixed to the connector 650 by using the coupler 616. As mentioned above, the coupler 616 may be any suitable coupler, such as the examples discussed below with reference to FIGS. 8-11**.

Alternative Couplers

Figure 8:
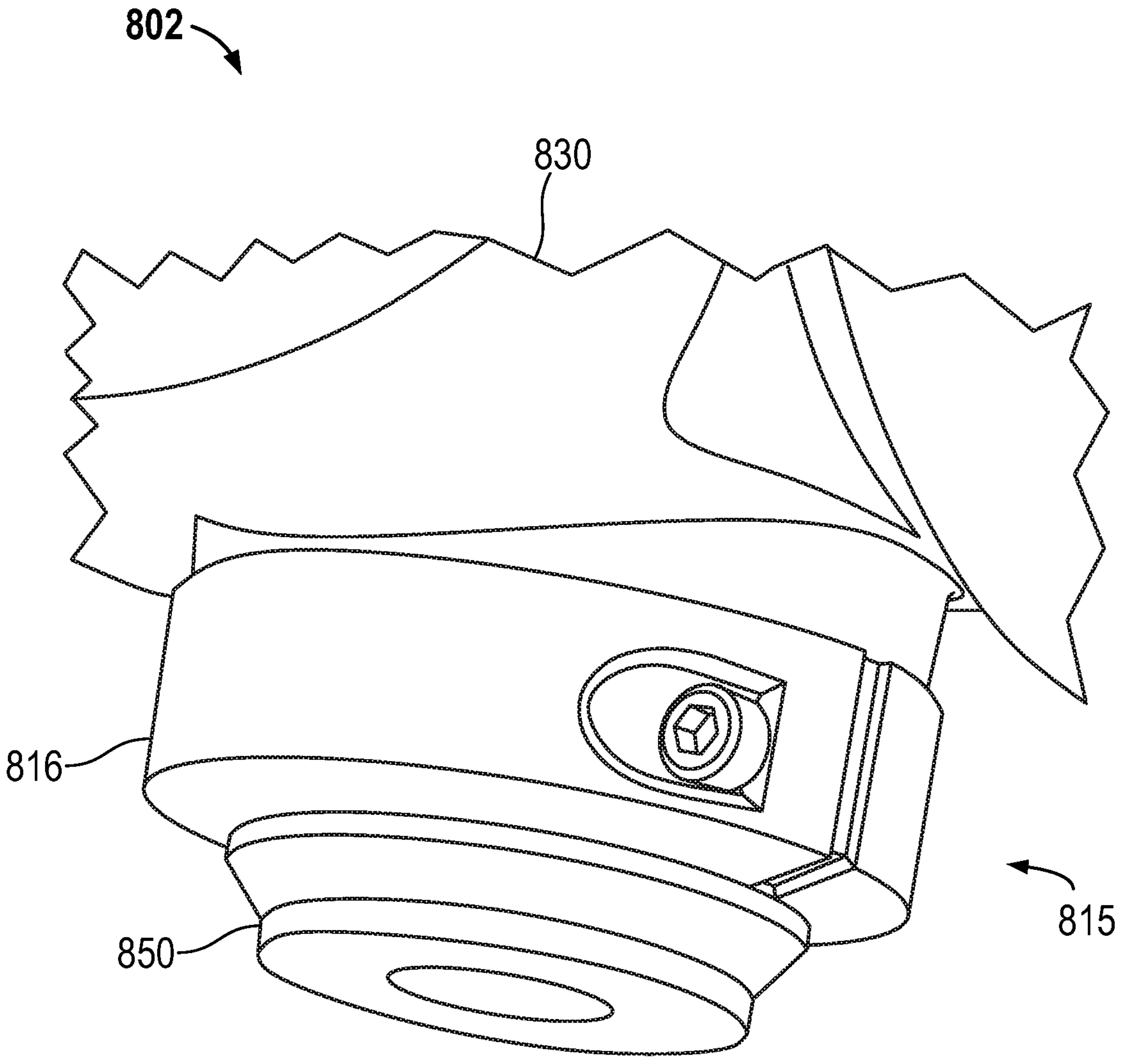
FIGS. 8 and 9 show an interface 802 with improved accessibility.
Figure 9:
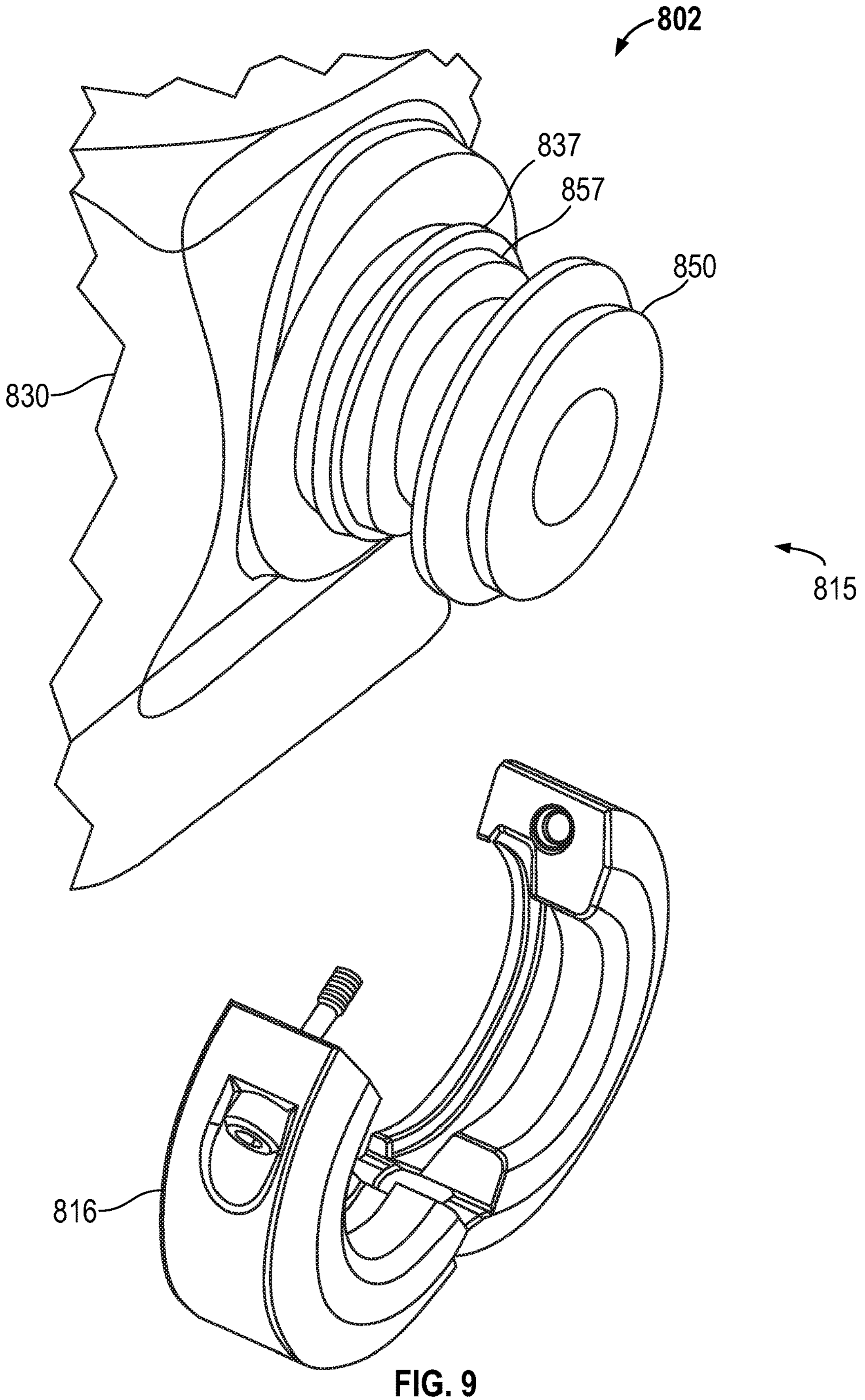

FIGS. 8 and 9 show an interface 802 with improved accessibility. As shown in FIGS. 8 and 9, the interface 802 is mechanically and/or communicatively coupled to a sensor assembly (not shown for clarity) via a feedthrough 815. The interface 802 is mechanically coupled to the sensor assembly by using a coupler 816. As shown in FIG. 8, the coupler 816 is clamped about a connector 850 extending into a housing 830 of the interface 802. The coupler 816 is also clamped about a portion of the housing 830. As shown in FIG. 8, details of the portion of the housing and the connector 850 that are clamped are not shown. As shown in FIG. 9, the coupler 816 is removed from the connector 850 and the housing 830.

The connector 850 shown in FIG. 9 as extending into the housing 830 includes a connector flange 857. The connector flange 857 is shown as abutting a housing flange 837. The connector flange 857 and the housing flange 837 are compressed together in a direction axial to a longitudinal length of the connector 850. The connector flange 857 and housing flange 837 are pressed together by the coupler 816. More specifically, the coupler 816 clamps about the connector flange 857 and the housing flange 837 so as to press the connector flange 857 and the housing flange 837 together. The coupler 816 may also prevent lateral and bend displacements of the housing flange 837 and the connector flange 857.

Figure 10:
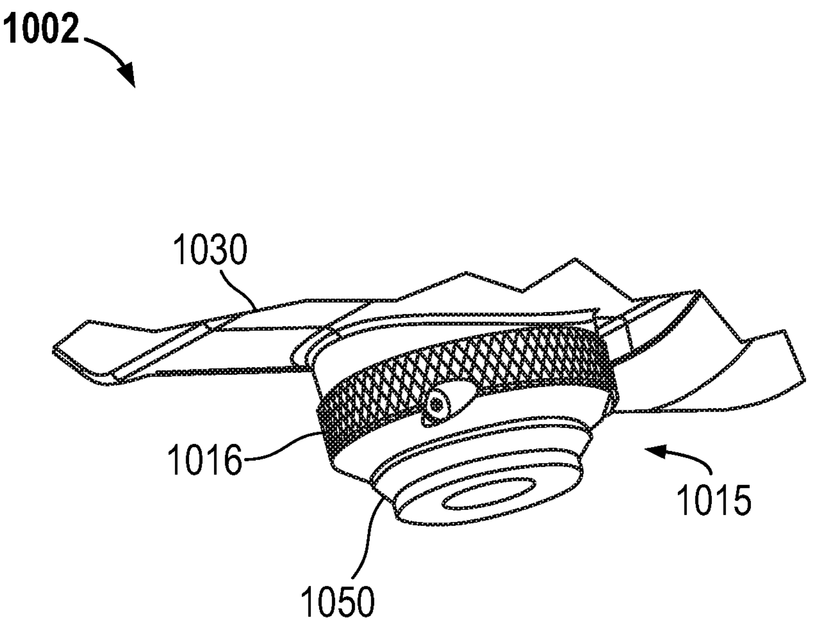
FIGS. 10 and 11 show an interface 1002 with improved accessibility.
Figure 11:
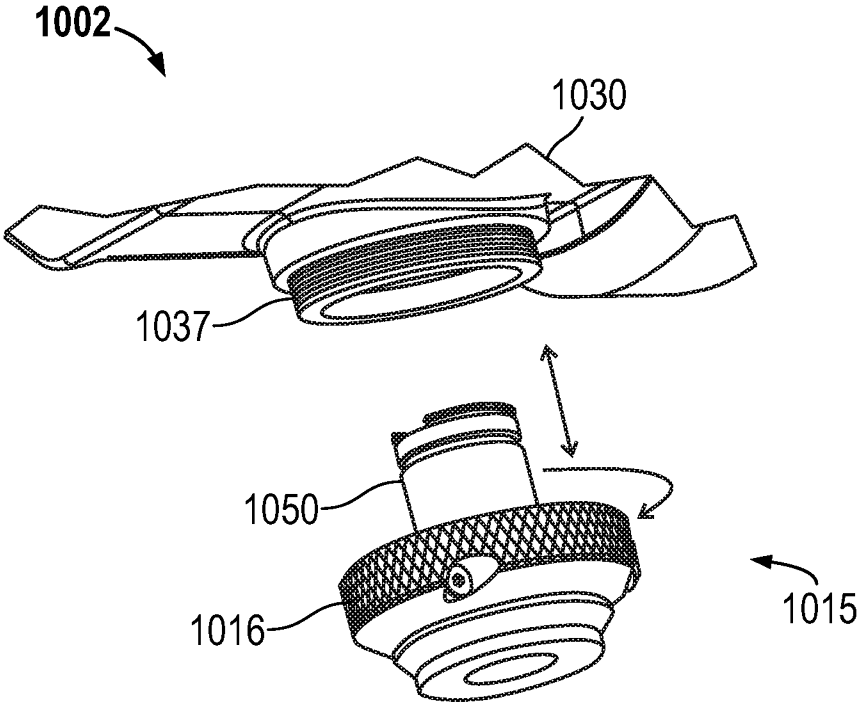

FIGS. 10 and 11 show an interface 1002 with improved accessibility. As shown in FIGS. 10 and 11, the interface 1002 is mechanically and/or communicatively coupled to a sensor assembly (not shown for clarity) via a feedthrough 1015. The feedthrough 1015 includes a threaded coupler 1016 that is disposed onto a connector 1050. The threaded coupler 1016 may be configured to rotate about the connector 1050. The threaded coupler 1016 has a threaded portion (not shown) that is configured to thread onto a threaded portion 1037 of a housing 1030 of the interface 1002.

The connector 1050 may be mechanically coupled to the housing 1030 by inserting the connector 1050 until the threaded coupler 1016 is in contact with the threaded portion 1037. The connector 1050 may be inserted by, for example, lowering the housing 1030 onto the feedthrough 1015. The connector 1050 may remain stationary while the threaded coupler 1016 is rotated until snugged with the housing 1030. The connector 1050 may be held stationary such that a torque or bending moment does not cause the connector 1050 to displace.

Rotatable Housing

Figure 12:
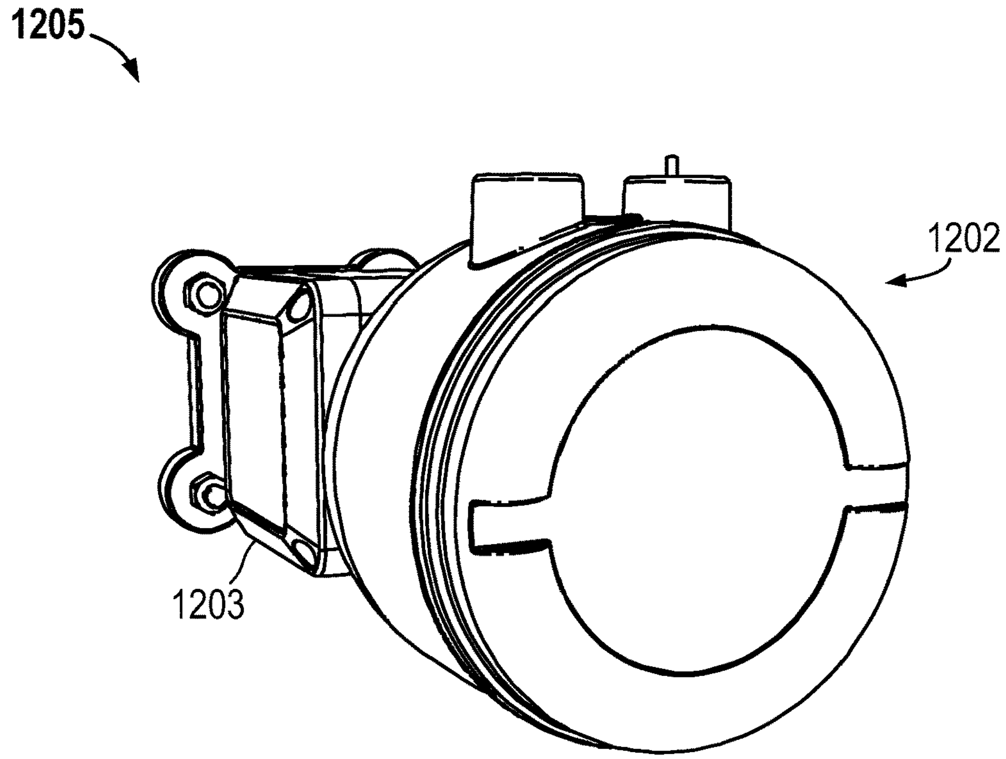
FIGS. 12-15 show a vibratory meter 1205 including an interface 1202 with improved accessibility.
Figure 13:
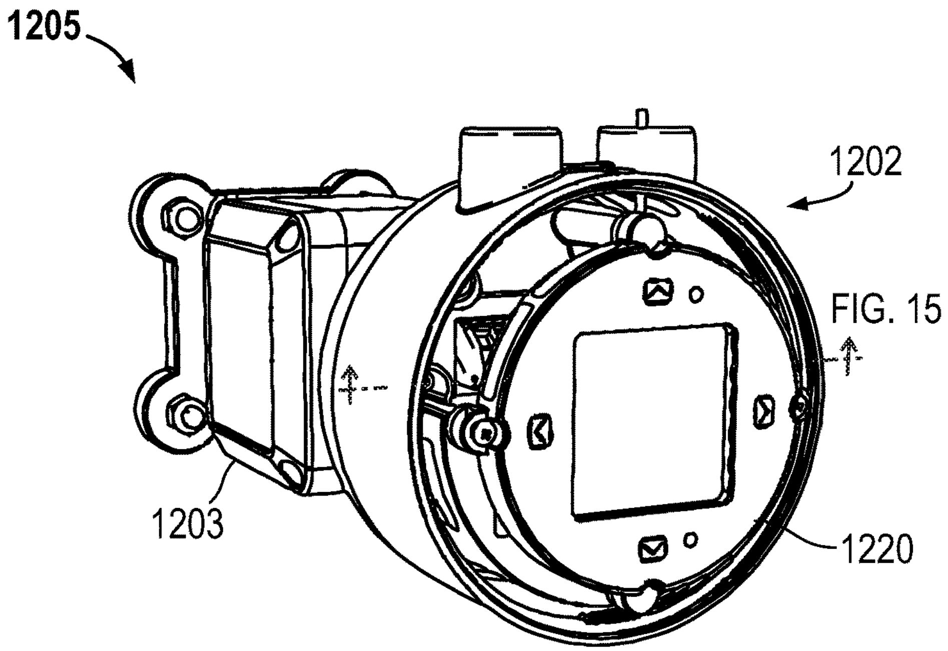
Figure 14:
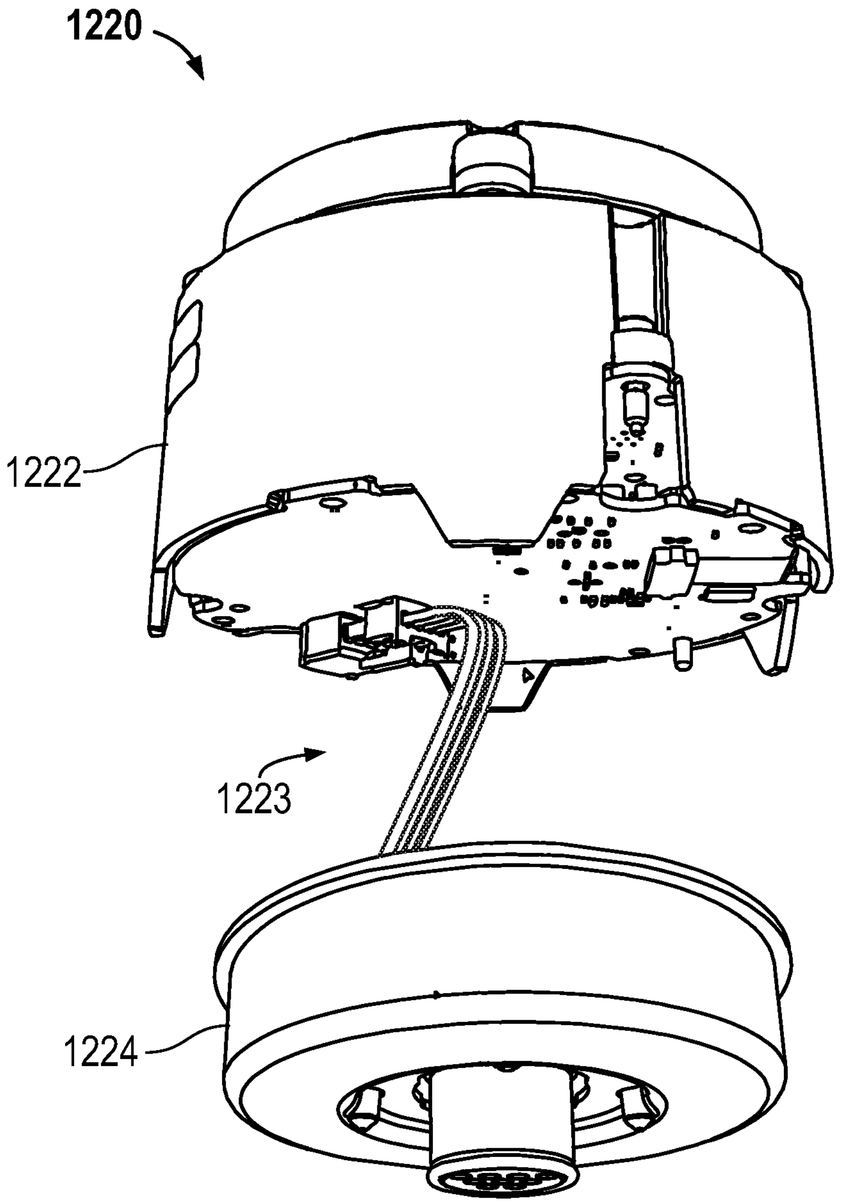
Figure 15:
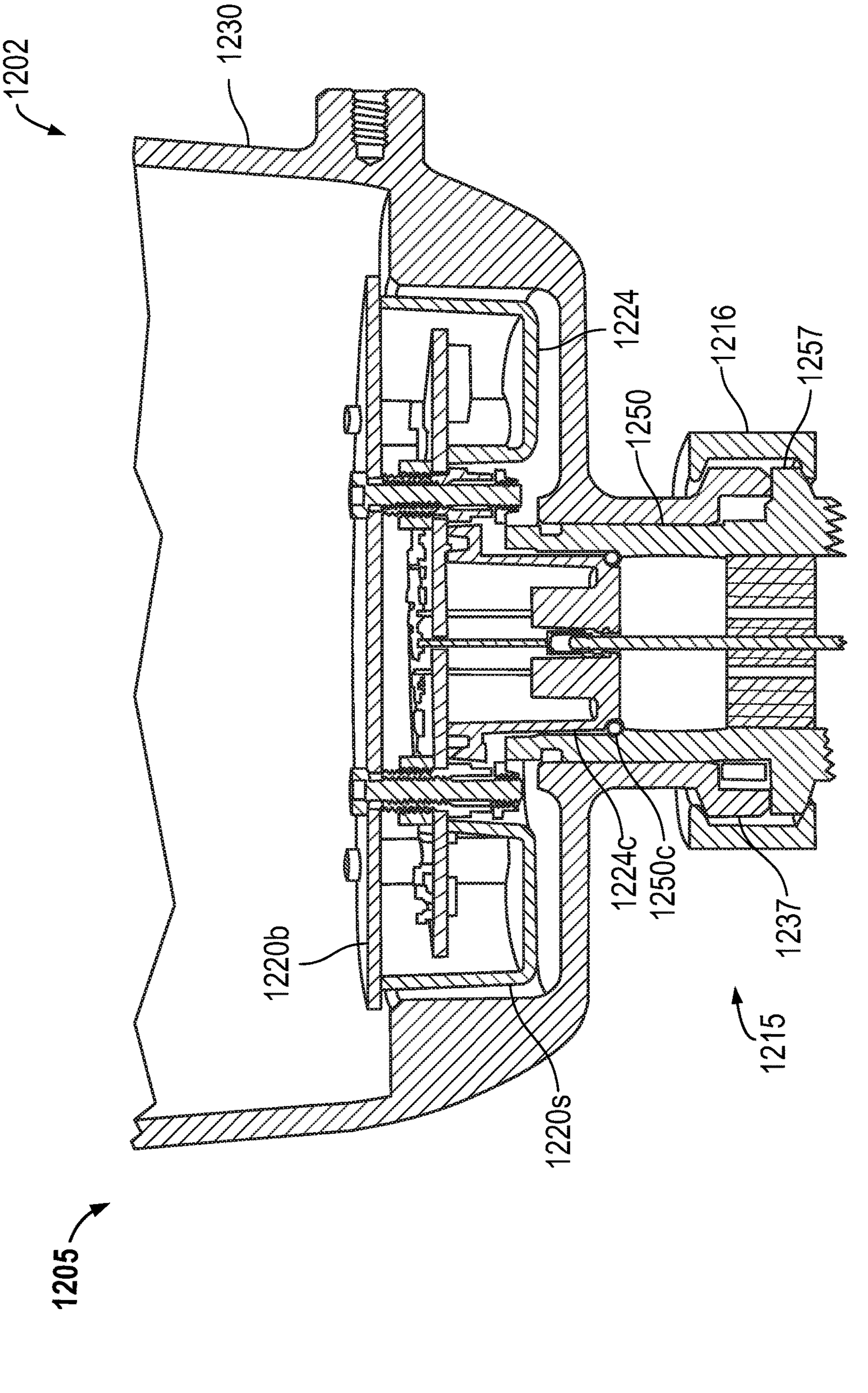

FIGS. 12-15 show a vibratory meter 1205 including an interface 1202 with improved accessibility. FIGS. 12 and 13 are perspective views of the vibratory meter 1205 including the interface 1202. A junction box 1203 that communicatively couples a sensor assembly (not shown for clarity) to the interface 1202 is shown. FIG. 13 shows a meter electronics 1220 that is in the interface 1202. FIG. 14 is an exploded perspective view of the meter electronics 1220 and FIG. 15 is a sectional view of the interface 1202. As shown in FIG. 14, the meter electronics 1220 includes an upper meter electronics 1222 and a lower meter electronics 1224. The upper meter electronics 1222 is communicatively coupled with the lower meter electronics 1224 via an interposed cable 1223. The interposed cable 1223 may carry a conditioned signal that does not cause electromagnetic compatibility issues. As is explained below, the interposed cable 1223 allows the upper meter electronics 1222 to rotate relative to the lower meter electronics 1224.

Referring to FIG. 15, the lower meter electronics 1224 is mechanically coupled to a connector 1250 of the feedthrough 1215 via a lower meter electronics connector **1224*c*. More specifically, the lower meter electronics 1224 is comprised of an electronics board 1220*b* affixed to a shell 1220*s* and the shell 1220*s* is affixed to the connector 1250. The shell 1220*s*, the connector 1250, and/or a ground plane of the electronics board 1220*b* may form a ground path to prevent electromagnetic noise from interfering with electronics external to the shell 1220*s*, such as those in the upper meter electronics 1222. As shown, the lower meter electronics connector 1224*c* is disposed within the connector 1250 of the feedthrough 1215. A connector o-ring 1250*c* is disposed between the lower meter electronics connector 1224*c*. As can be appreciated, the lower meter electronics 1224 is not affixed or directly coupled to the housing 1230**.

A coupler 1216 is disposed about and compressed to a housing flange 1237 and a connector flange 1257. Due to bevels on the housing flange 1237 and the connector flange 1257, the coupler 1216 can compress the housing flange 1237 and the connector flange 1257 together, thereby securing and preventing a relative rotation, as well as other movements, of the housing 1230 and the connector 1250. When the coupler 1216 is loosened, the housing 1230 may rotate relative to the connector 1250. Accordingly, the housing 1230 may be rotated relative to the connector 1250, and therefore the sensor assembly or junction box, by loosening the coupler 1216 and applying a torque to the housing 1230. How the lower meter electronics 1224 may be mechanically coupled or affixed to the connector 1250 is described in more detail in the following.

Figure 16:
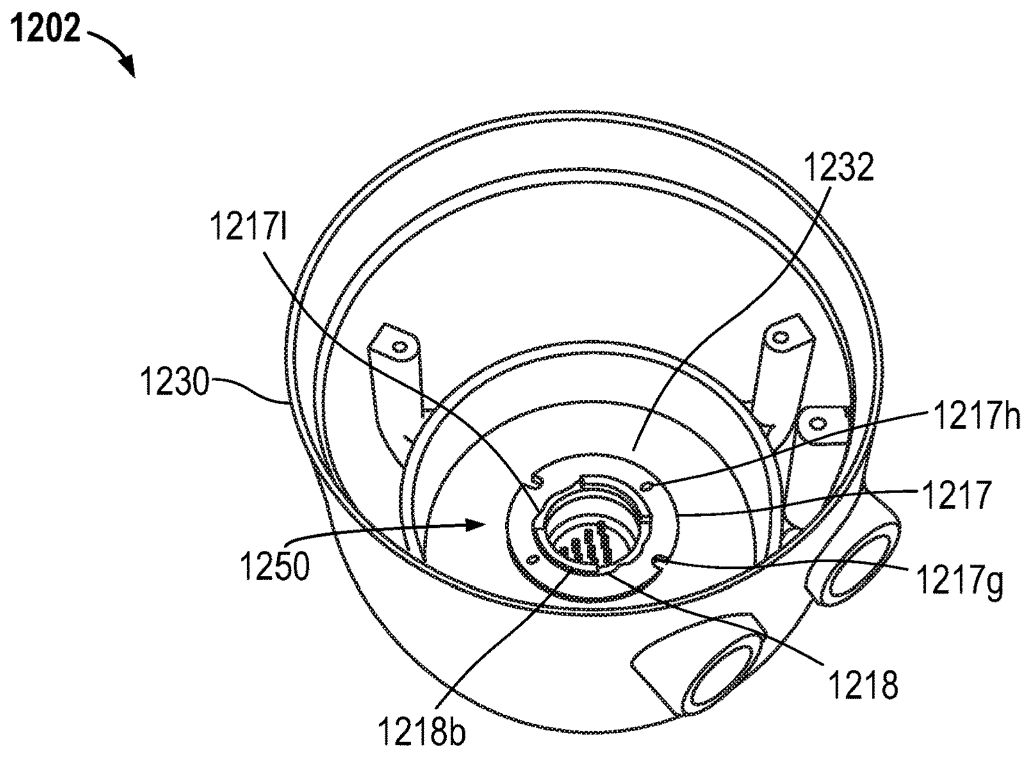
FIGS. 16-20B show an installation of the lower meter electronics 1224 onto the connector 1250 of the sensor assembly.
Figure 17:
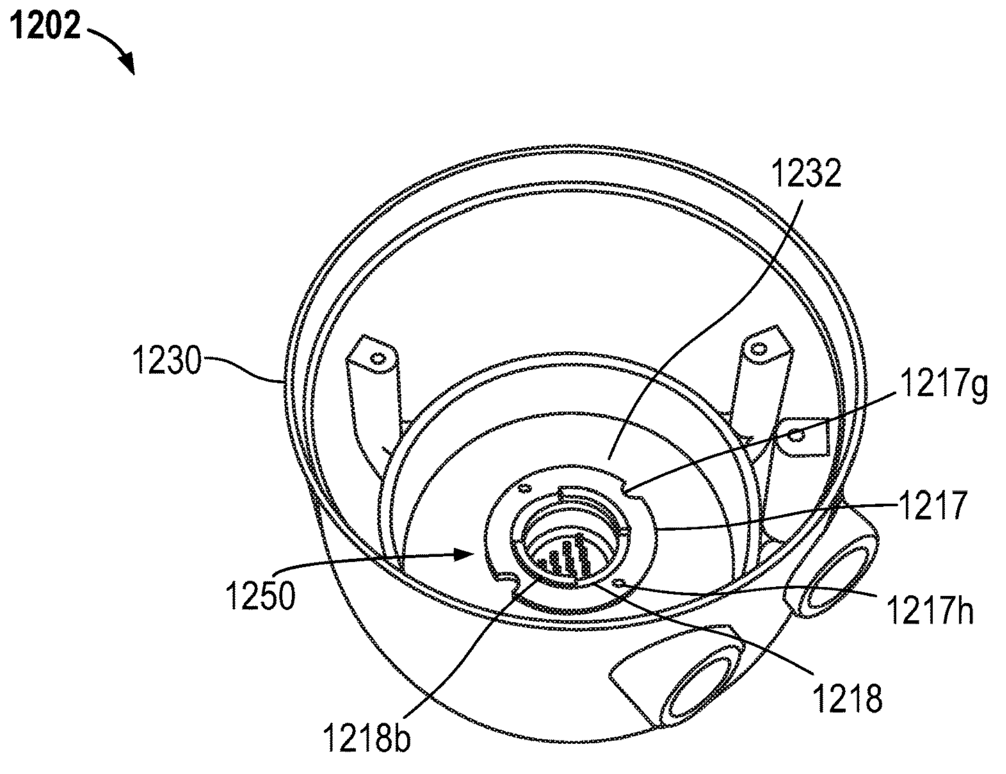
Figure 18:
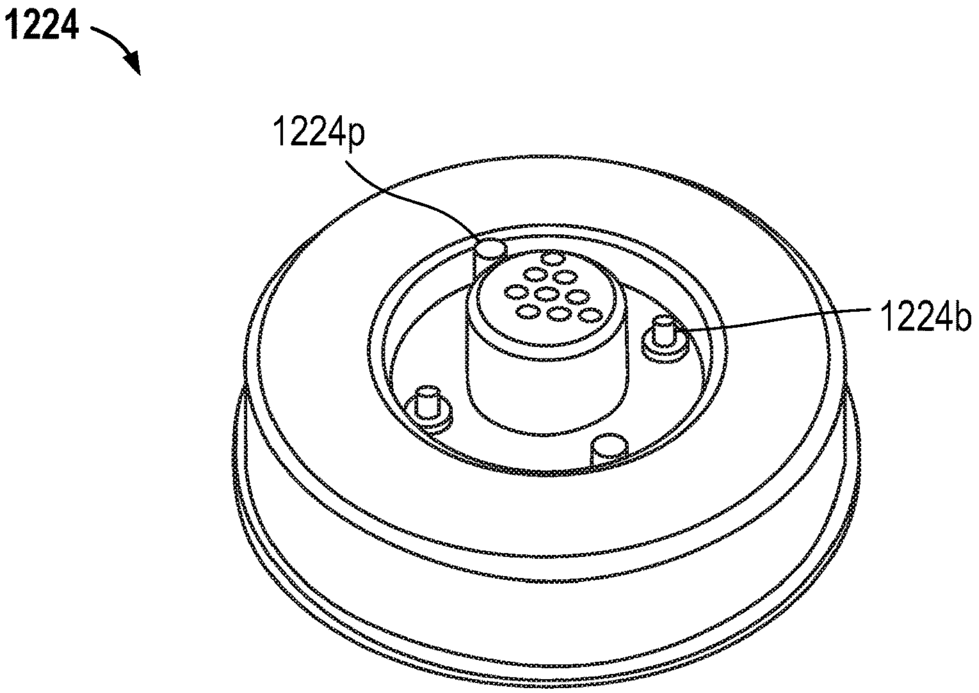
Figure 19:
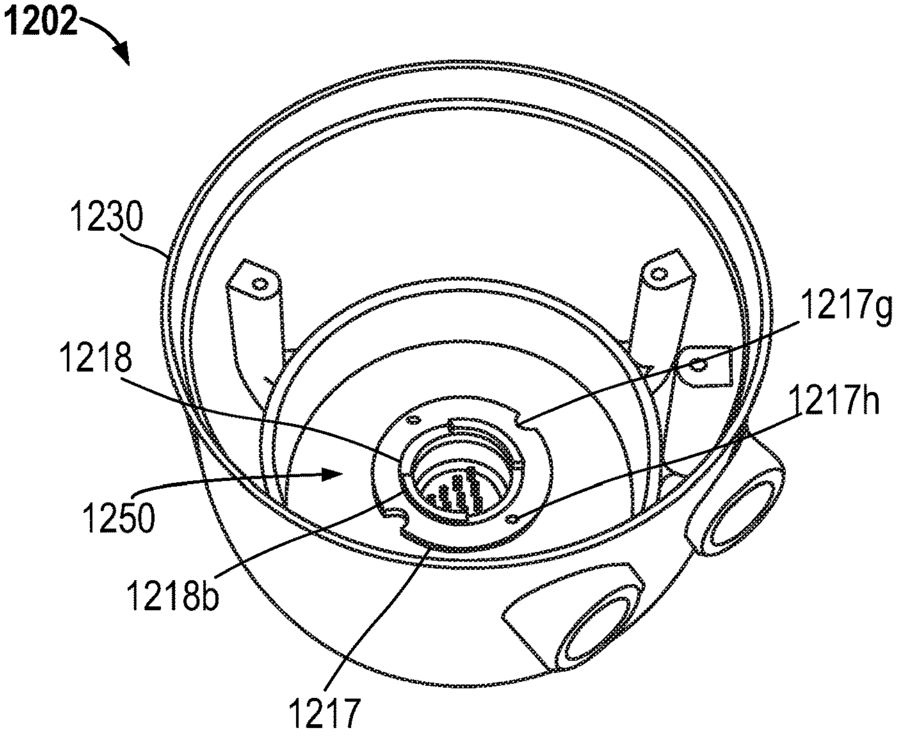

FIGS. 16-20B show an installation of the lower meter electronics 1224 onto the connector 1250 of the sensor assembly. The upper meter electronics 1222 and junction box 1203 of FIGS. 12 and 13 are not shown for clarity. As shown in FIGS. 16, 17, and 19, the housing 1230 includes a receiving disk 1217. The receiving disk 1217 is rotatably disposed about the connector 1250 between a retention ring 1218 and a wall 1232 of the housing 1230. The receiving disk 1217 includes threaded holes **1217*h* and grooves 1217*g* that are configured to respectively receive and mate with bolts 1224*b* and posts 1224*p* of the lower meter electronics 1224. As shown in FIG. 16, the receiving disk 1217 also includes lobes 1217*l* extending radially inward or internal to the receiving disk 1217. The lobes 1217*l* are proximate the grooves 1217*g*. The retention ring 1218, which is part of the connector 1250, includes lips 1218*b* that are configured to interface with the lobes 1217*l* of the receiving disk 1217. An exemplary process of installing the lower meter electronics 1224 onto the connector 1250** is described in the following.

As can be seen by comparing FIGS. 16 and 17, the receiving disk 1217 is rotated 90 degrees. As shown in FIG. 16, the grooves **1217*g* and lobes 1217*l* are disposed between the lips 1218*b*. That is, a line formed by connecting the grooves 1217*g* is orthogonal to a line formed by connecting centers of the lips 1218*b*. As shown in FIG. 17, the grooves 1217*g* are disposed proximate the lips 1218*b*. That is, a line formed by connecting the grooves 1217*g* is collinear or parallel to a line formed by connecting centers of the lips 1218*b*. This rotation is performed prior to the lower meter electronics 1224 being attached to the receiving disk 1217**.

After the receiving disk 1217 is rotated to the position shown in FIG. 17, the lower meter electronics 1224 is attached to the receiving disk 1217. With more particularity and referring to FIGS. 18 and 19, the posts **1224*p* of the lower meter electronics 1224 are aligned with the grooves 1217*g* of the receiving disk 1217. That is, the lower meter electronics 1224 is flipped from the position shown in FIG. 18 and dropped into the housing 1230 where the posts 1224*p* are aligned with the grooves 1217*g*. The grooves 1217*g* and the post 1224*p*** mate with each other. Similarly, the bolts

1224*b* of the lower meter electronics 1224 are aligned with and mate with the threaded holes 1217*h* of the receiving disk 1217.

Figure 19A:
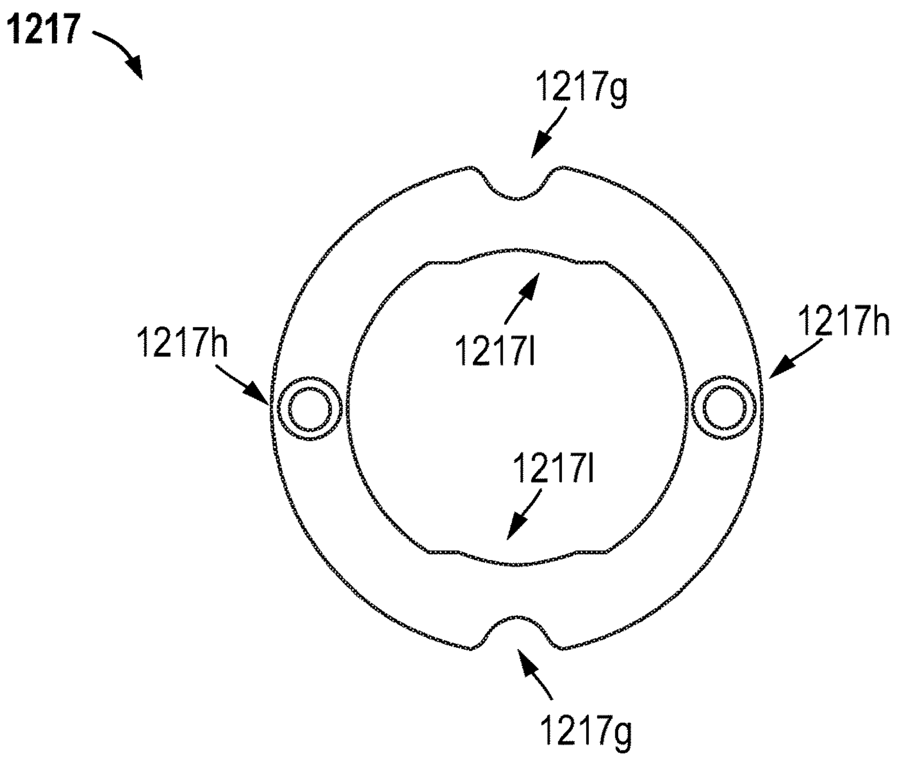
Figure 19B:
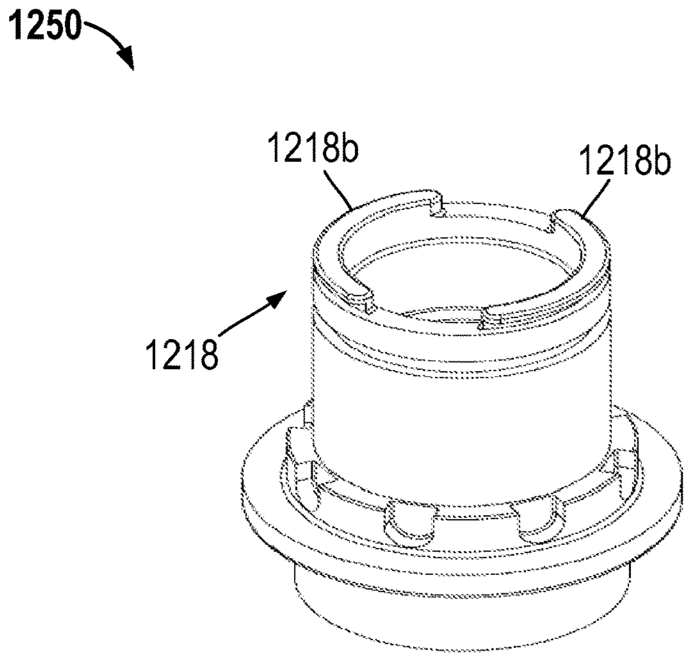
Figure 20A:
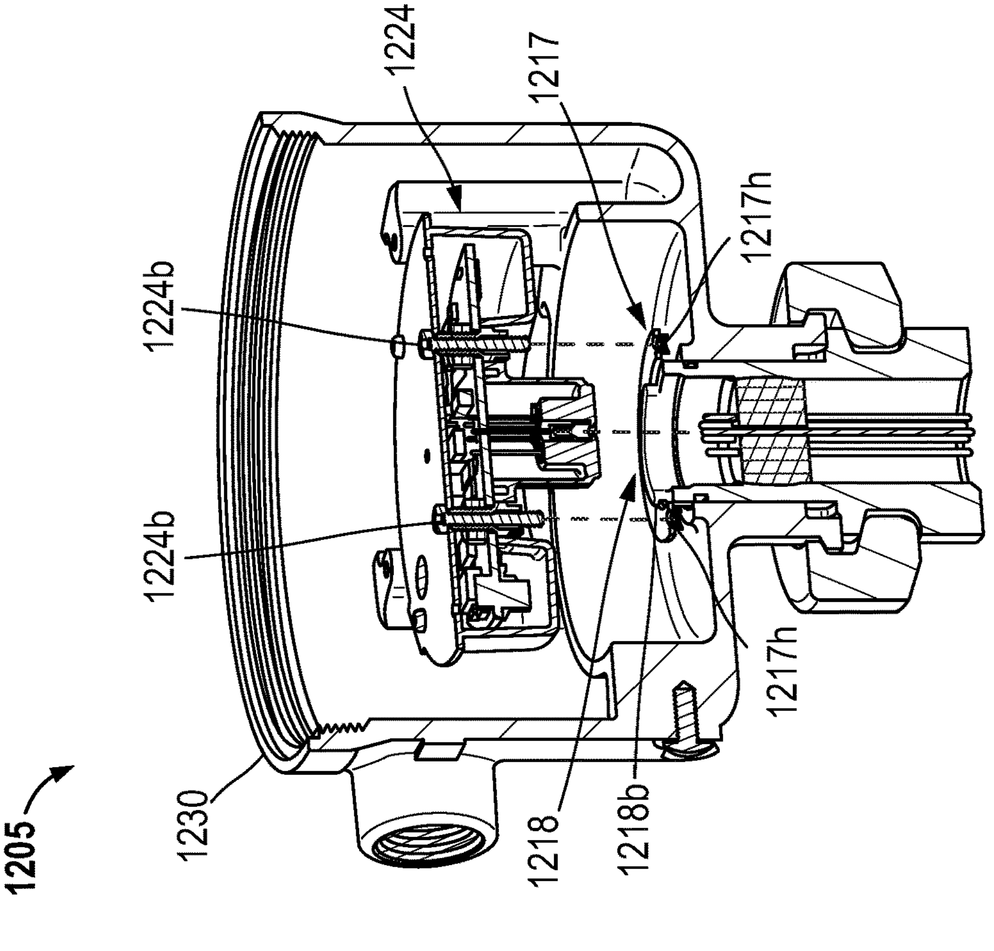
Figure 20B:
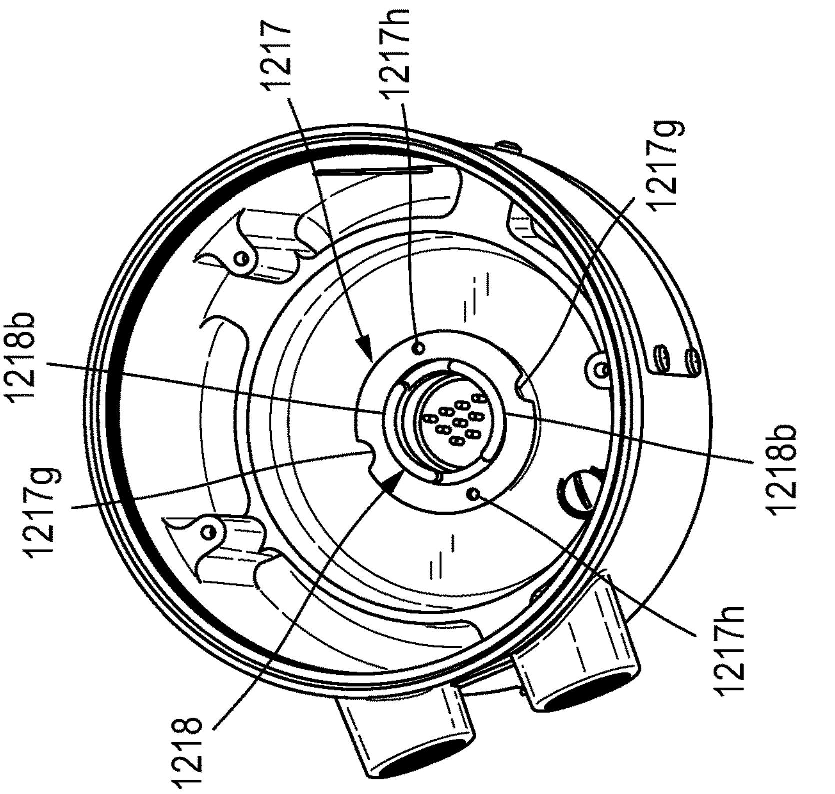

Referring now to FIGS. 19A, 19B, 20A and 20B, details of the lower meter electronics 1224 coupling to the receiving disk 1217 and the connector 1250 are shown. In particular, details of the receiving disk 1217 and the connector 1250 are respectively shown in FIG. 19A and FIG. 19B and FIG. 20A shows how the lower meter electronics 1224 is coupled to the receiving disk 1217. In FIG. 20A, the lower meter electronics 1224 is exploded away from the receiving disk 1217. In particular, the bolts 1224*b* are shown as being exploded from the threaded holes 1217*h* of the receiving disk 1217. FIG. 20B illustrates a relative position of the threaded holes 1217*h* of the receiving disk 1217 and the lips 1218*b* of the retention ring 1218 once the lower meter electronics 1224 is rigidly affixed to the connector 1250.

As described above with reference to FIGS. 18 and 19, when the bolts 1224*b* are mated to the threaded holes 1217*h*, the threaded holes 1217*h* are proximate the lips 1218*b*. After the bolts 1224*b* are mated to the threaded holes 1217*h* from the exploded position shown in FIG. 20A, they are tightened to snug the lobes 1217*l* of the receiving disk 1217 to the lips 1218*b* so as to retain the lower meter electronics 1224 to the connector 1250. This affixes the lower meter electronics 1224 to the connector 1250. The bolts 1224*b*, the receiving disk 1217, and the connector 1250 are part of the ground path described above to reduce electromagnetic noise.

Figure 21:
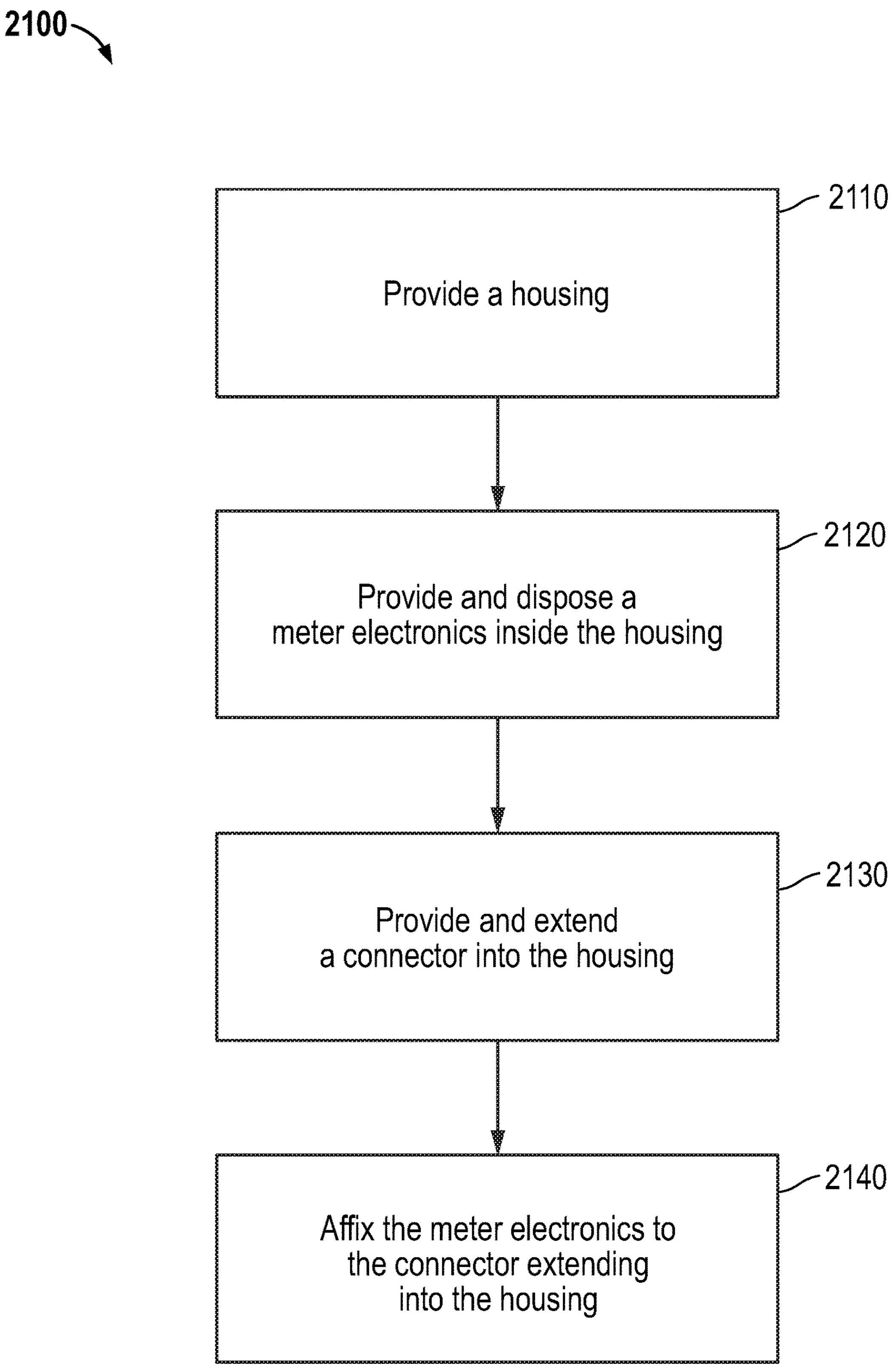
FIG. 21 shows a method 2100 of assembling an interface having improved accessibility.

FIG. 21 shows a method 2100 of assembling an interface having improved accessibility. As shown in FIG. 21, the method 2100 comprises providing a housing in step 2110. The housing may be any suitable housing, such as, for example the housings 630, 1230 described above. In step 2120, the method 2100 provides and disposes a meter electronics inside the housing. The meter electronics may be the meter electronics 620, 1220 described above, although any suitable meter electronics may be employed. The method 2100, in step 2130, provides and extends a connector into the housing. The connector may be extended into the housing by, for example, assembling a sensor assembly that includes an extended connector and lowering the housing onto the sensor assembly, although any suitable method may be employed. In step 2140, the method 2100 affixes the meter electronics to the connector extending into the housing. The steps 2110-2140 may be performed in any suitable order. For example, the connector may be extended into the housing before the meter electronics is disposed inside the housing. The meter electronics may be affixed to the connector by using any suitable means, such as, for example, screws, bolts, rotating cams or lips, clamps, retention rings, snap rings, cotter pins, etc. The meter electronics may be rigidly affixed, rotatably affixed, pivotably affixed, etc.

The method 2100 may comprise additional steps such as rotatably coupling the housing to the connector extending into the housing. For example, with reference to FIG. 15 above, the housing 1230 may rotate relative to the connector 1250 extending into the housing 1230. The coupler 1216 can be tightened onto the housing flange 1237 of the housing 1230 and the connector flange 1257 of the connector 1250, thereby preventing the housing 1230 from rotating.

In step 2120, providing the meter electronics may include providing an upper meter electronics and a lower meter electronics. The upper meter electronics and the lower meter electronics may respectively be the upper meter electronics 1222 and the lower meter electronics 1224 described above, although any suitable upper and lower meter electronics may be employed. The upper meter electronics and the lower meter electronics may or may not be affixed to each other. For example, the upper meter electronics and the lower meter electronics may be affixed to each other using a barrier board, which is described below. The upper meter electronics and the lower meter electronics may be affixed to each other by, for example, using potting material combined with standoffs, although any suitable means may be employed. Additionally or alternatively, the upper meter electronics and the lower meter electronics may not be mechanically coupled to each other in the sense that their relative movements are limited. For example, the upper meter electronics and lower meter electronics may be communicatively coupled to each other using, for example, a cable, such as a communications cable. Accordingly, providing the meter electronics may comprise providing a lower meter electronics configured to affix to the connector extending into the housing and providing an upper meter electronics configured to affix to the housing and configured to communicatively couple to the lower meter electronics. Providing the meter electronics may also include providing a shielded meter electronics, such as the lower meter electronics 1224 described above, that prevents a propagation of electromagnetic noise from the meter electronics.

As discussed above, in step 2130 the connector may be provided and extended into the housing by lowering the housing onto, for example, a sensor assembly, junction box, or other device from which the connector extends. However, alternative means may be employed. For example, the housing may be coupled to the sensor assembly, junction box, or other device and the connector may be subsequently coupled to the sensor assembly, junction box, or other device through the housing. Additionally, or alternatively, the connector may be extended through the sensor assembly, junction box, or other device into the housing. For example, the sensor assembly may have an upper portion that is affixed to the housing, and a sensor assembly is extended into the housing via the upper portion. Subsequently, a lower portion of sensor assembly may be affixed to the upper portion of the sensor assembly.

The connector extending into the housing may be part of a feedthrough extending from the sensor assembly, junction box, etc. That is, the connector may be part of a more complex assembly between the sensor assembly, junction box, etc., and the housing. For example, the feedthrough extending into the housing may be the feedthrough 1215 described above with reference to FIG. 15. Accordingly, the feedthrough may be comprised of portions that allow the housing to rotate with respect to the sensor assembly, junction box, etc.

As discussed above with reference to step 2140, the meter electronics may be affixed to the connector by using any suitable means, such as, for example, screws, bolts, rotating cams or lips, clamps, retention rings, snap rings, cotter pins, etc. The meter electronics may be rigidly affixed, rotatably affixed, pivotably affixed, etc. For example, the connector may be similar to the connectors 850, 1050, 1250 described above with reference to FIGS. 8, 10, and 15.

Accordingly, providing the connector may comprise providing and rotatably disposing a receiving disk about a connector. At least a portion of the receiving disk may be disposed between a retention ring of the connector and a wall of the housing. Additionally or alternatively, providing the meter electronics may further comprise providing posts, wherein providing the receiving disk comprises providing grooves and threaded holes in the receiving disk. The step 2140 may further comprise providing bolts. The posts may be configured to mate with the grooves and the bolts may be configured to mate with the threaded holes of the receiving disk. Lobes on the receiving disk may interface with a groove and/or lips of the retention ring to retain the meter electronics to the connector extending into the housing.

The meter electronics 420, 520, 620, 1220 and feedthroughs 415, 515, 615, 1215 provide the interfaces 402, 502, 602, 1202 with improved accessibility. The meter electronics 420, 520, 620, 1220 may be connected directly to the feedthroughs 415, 515, 615, 1215 without necessarily being connected to the housing 430, 530, 630, 1230. Where the meter electronics 520, 1220 is not connected to the housing 530, 1230, the housing 530, 1230 may be allowed to rotate relative to the sensor assembly, junction box, or the like, thereby allowing for easier access to the interface 402, 502, 602, 1202. In addition, connecting the meter electronics 420, 520, 620, 1220 to the feedthroughs 415, 515, 615, 1215 can form a grounded enclosure that prevents a propagation of electromagnetic noise. Where the meter electronics 420, 620 may be connected to the housing 430, 630, the meter electronics 420, 620 being connected directed to the feedthrough 415, 615 may allow easier assembly of the interface 402, 602. For example, the cable between the meter electronics 420, 620 and the feedthrough 415, 615 may not be used.

Removable Meter Electronics Having a Water Barrier

An interface may have a single or dual compartment housing for a meter electronics. In a single compartment housing, the meter electronics, terminals, and wiring are located inside of the same compartment. Traditionally this requires the meter electronics to be protected from water by encasing the entire meter electronics in a potting compound to prevent damage to the meter electronics in the event of water ingress into the housing. This potting of the electronics to protect them from water may add significant cost to the interface due to the potting material, electronics shell, and additional manufacturing steps required for filling and curing the potting material.

An alternative to a single compartment housing, which mitigates the risk of water on the meter electronics is to utilize a dual compartment housing. In a dual compartment housing, the terminals and wiring are located inside one compartment, while the meter electronics and circuits are in a separate compartment sealed by a potted housing wall or septum. This type of design allows the meter electronics to be sealed from the ingress of water in the terminal compartment. However, a dual compartment housing is traditionally heavier and more expensive to produce than a single compartment housing. The meter electronics is also not accessible due to the potted housing wall.

Figure 22:
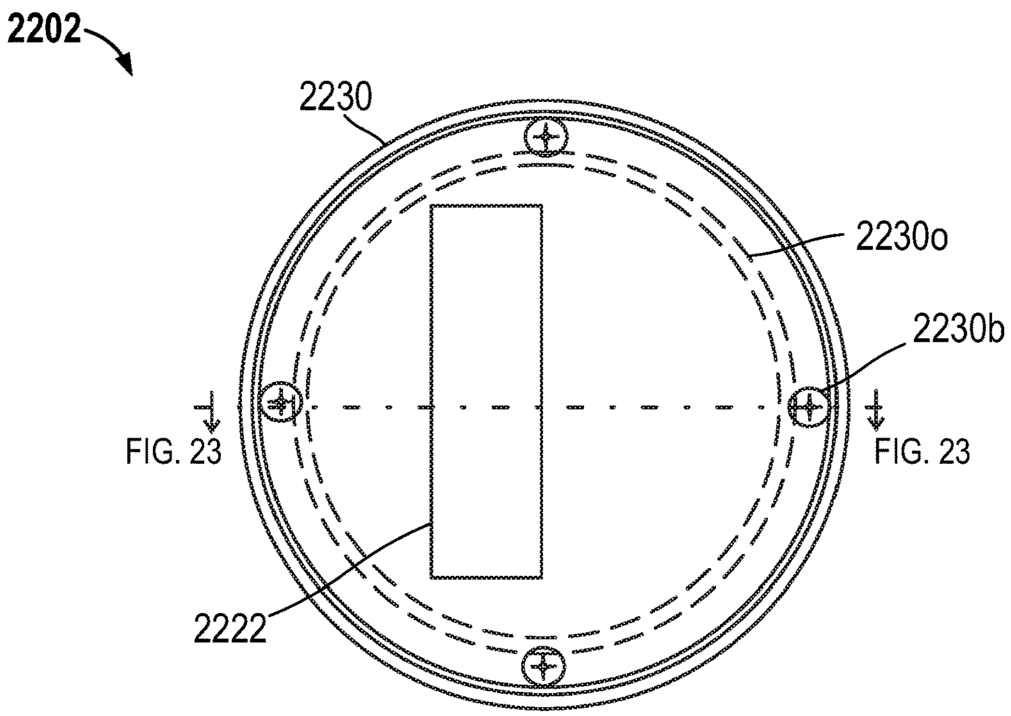
FIGS. 22 and 23 show an interface 2202 with improved accessibility.
Figure 23:
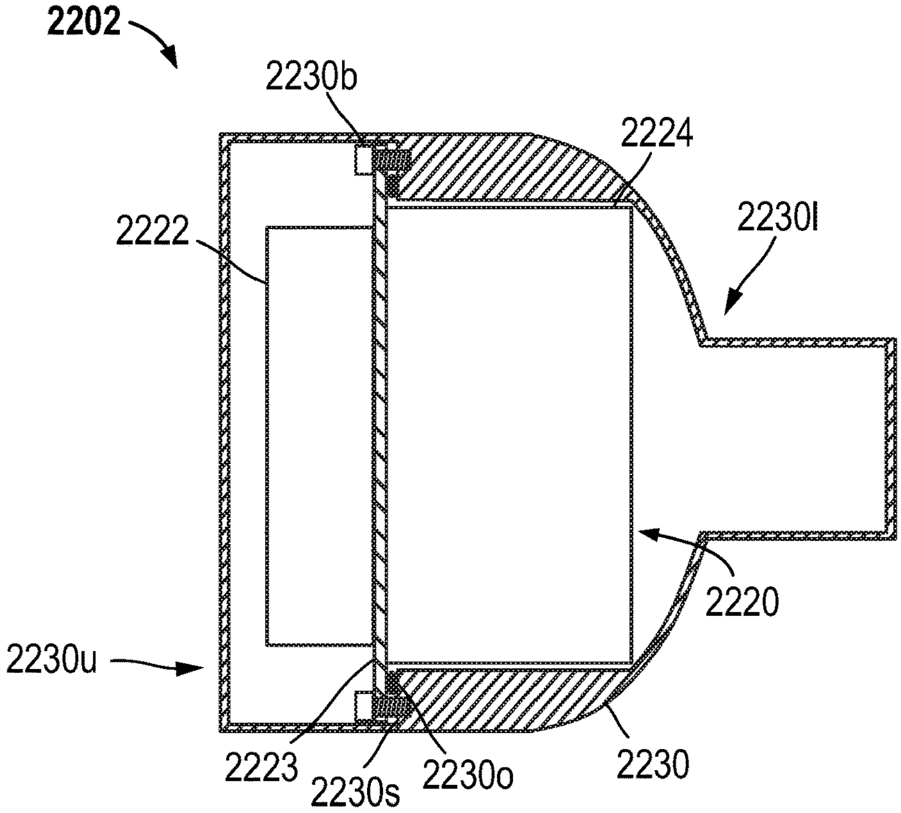

FIGS. 22 and 23 show an interface 2202 with improved accessibility. As shown in FIGS. 22 and 23, the interface 2202 includes a meter electronics 2220 having a gasket **2230*o* that is disposed between a barrier board 2223 and a housing 2230. With more particularity, the gasket 2230*o* is disposed between the barrier board 2223 and a boss 2230*s* of the housing 2230. As shown in FIGS. 22 and 23, the gasket 2230*o* is an o-ring although any suitable gasket may be employed. The barrier board 2223 is disposed between and coupled to an upper meter electronics 2222 and a lower meter electronics 2224. The upper meter electronics 2222 is disposed in the upper meter electronics portion 2230*u* of the housing 2230 and the lower meter electronics 2224 is disposed in the lower meter electronics portion 22301 of the housing 2230. The barrier board 2223 is affixed to the housing 2230 using a plurality of fasteners 2230*b*. As shown, the plurality of fasteners 2230*b*** are screws, although any suitable fasteners may be employed.

The housing 2230 may comprise any suitable material such as aluminum, stainless steel, polymers, etc. The housing 2230 may be comprised of a single integrated formed structure, such as a cast, forged, milled, etc., structure. The housing 2230 has an opening into which the meter electronics 2220 may be inserted into and removed from the housing 2230.

The barrier board 2223 may not include vias or holes through which water can flow. This may be accomplished by using blind and buried vias and by providing a seal about holes that traverse the barrier board 2223. The barrier board 2223 may therefore not include holes that traverse the barrier board 2223 internal to the gasket **2230*o*. Because the barrier board 2223 does not include holes traversing the barrier board 2223 internal to the gasket 2230*o*, water may not pass the barrier board 2223. This can prevent ingress of the water into the lower meter electronics portion 22301**.

The barrier board 2223 may have a perimeter that corresponds and overlaps the boss **2230*s* on the housing 2230 where the gasket 2230*o* is disposed. The boss 2230*s* may extend circumferentially about an internal surface of the housing 2230. The boss 2230*s* may delineate a boundary between the upper meter electronics portion 2230*u* and the lower meter electronics portion 22301 of the housing 2230. Upon inserting the meter electronics 2220, the plurality of fasteners 2230*b* can compress the barrier board 2223 against the housing 2230, or more particularly the boss 2230*s* and gasket 2230*o*, thereby creating a water-tight compartment beneath the upper meter electronics 2222**.

The upper meter electronics 2222 may be comprised of wiring components, such as cables, terminals, or the like, and may not comprise electronic components, although any suitable arrangement may be employed where water exposure may not be an issue. For example, environmentally sealed electronics may be employed. The lower meter electronics 2224 may similarly be comprised of electronics components as well as cables, terminals, or the like. The lower meter electronics 2224 may be communicatively and/or mechanically coupled to a sensor assembly, junction box, etc.

As shown in FIGS. 22 and 23, wiring terminals of the upper meter electronics 2222 could be located on top of this barrier board 2223, and additional electronic circuit boards of an electronics board stack could be suspended below the barrier board 2223 to allow for additional circuit board space, without requiring potting on portions of the meter electronics 2220. For example, the lower meter electronics 2224 may not need to be potted. As can be appreciated, the meter electronics 2220 may be removed by removing the plurality of fasteners **2230*b***.

As shown in FIGS. 22 and 23, the plurality of fasteners **2230*b* are disposed exterior to the gasket 2230*o* or in the upper meter electronics portion 2230*u* of the housing 2230. However, the plurality of fasteners 2230*b* may be disposed in any suitable location. For example, the plurality of fasteners 2230*b* may be disposed internal to the gasket 2230*o* or in the lower meter electronics portion 22301 of the housing 2230. Additionally, or alternatively, the plurality of fasteners 2230*b* may include fasteners located both internal and external to the gasket 2230*o*. For example, fasteners located internal to the gasket 2230*o*** may include gaskets coupled to the fasteners to provide a water tight seal.

The plurality of fasteners **2230*b* are shown as being disposed through the barrier board 2223, although any suitable arrangement may be employed. For example, a claim, such as a ring clamp disposed about the circumference of the barrier board 2223, may be employed where the clamp compresses the barrier board 2223 to the boss 2230*s* of the housing 2230. The plurality of fasteners 2230*b* may be disposed in or against the ring clamp. Additionally or alternatively, the plurality of fasteners 2230*b* may be disposed about the edge of the barrier board 2223. For example, the plurality of fasteners 2230*b* may abut the edge of the barrier board 2223 and heads of the plurality of the fasteners 2230*b* may compress the edge of the barrier board 2223 to the boss 2230*s***.

The gasket **2230*o* may comprise a compressible material, such as rubber, polymer, soft metals, etc. The gasket 2230*o* is shown as having a circular cross section, although any suitable cross section may be employed, such as rectangular, and may vary, such as increasing or decreasing diameters. The gasket 2230*o* may form a water-tight seal that prevents water from flowing into the lower meter electronics portion 22301 of the housing 2230. Accordingly, the gasket 2230*o* may delineate a boundary between the upper meter electronics portion 2230*u* and the lower meter electronics portion 22301 of the housing 2230**.

Figure 24:
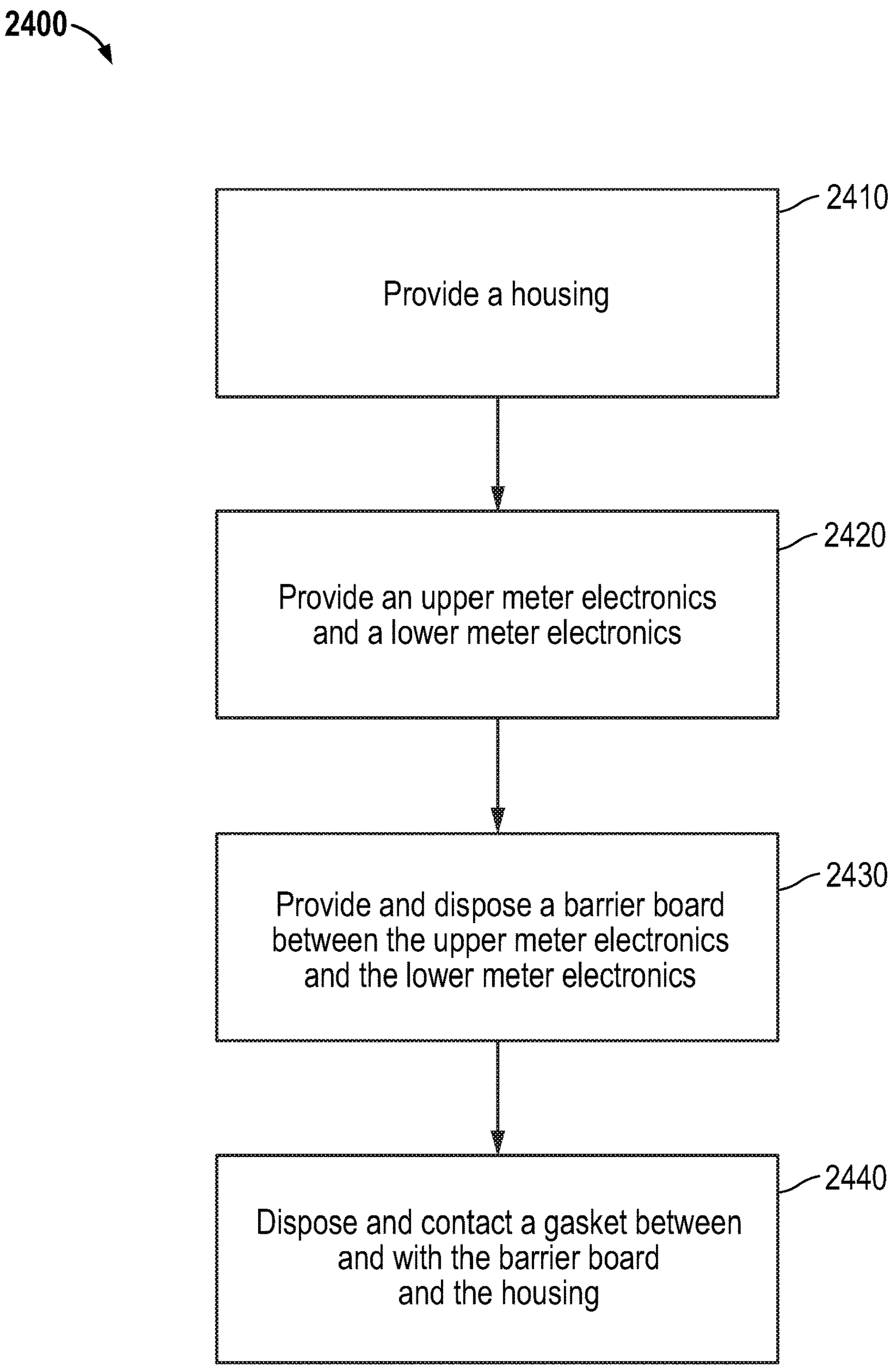
FIG. 24 shows a method 2400 of assembling an interface with improved accessibility.

FIG. 24 shows a method 2400 of assembling an interface with improved accessibility. As shown in FIG. 24, the method 2400, in step 2410 provides a housing. The housing may be the housing 2230 described above, although any suitable housing may be employed. The method 2400, in step 2420, provides a meter electronics. For example, the method 2400 may provide an upper meter electronics and provide a lower meter electronics. In step 2430, the method 2400 may provide and dispose a barrier board between the upper meter electronics and the lower meter electronics. The method 2400 may also couple the barrier board to the upper meter electronics and the lower meter electronics. In step 2440, the method 2400 may dispose and contact a gasket between and with the barrier board and the housing so as to form a water-tight seal separating an upper meter electronics portion of the housing and a lower meter electronics portion of the housing.

The step of forming the barrier board may comprise forming the barrier board without holes that traverse the barrier board. For example, blind vias may be employed in the barrier board. Providing the gasket may comprise providing an o-ring and the method 2400 may compress the o-ring between the housing and the barrier board. The step of disposing and contacting the gasket between and with the barrier board and the housing may comprise disposing and contacting the gasket between and with the barrier board and a shelf of the housing.

The method 2400 may also dispose a plurality of fasteners proximate the gasket and affix the barrier board to the shelf of the housing using the plurality of fasteners. The method may also dispose the plurality of fasteners in at least one of the upper meter electronics portion of the housing and the lower meter electronics portion of the housing. The method 2400 may also dispose the plurality of fasteners through the barrier board into the shelf of the housing.

The meter electronics 2220 and method 2400 may provide the interface 2202 with improved accessibility. For example, the meter electronics 2220 may include portions that are not potted thereby allowing for greater access to components on the meter electronics 2220. In addition, the meter electronics 2220 may be installed in the housing 2230 without necessarily using potting material to seal the meter electronics 2220 to the housing 2230. That is, the gasket **2230*o* may provide the water seal between the meter electronics 2220 and the housing 2230. The meter electronics 2220 may accordingly be removable from the housing 2230**.

Wireless Communication with an Interface

Accessibility of an interface may be improved by improving the ability of the interface to communicate with other devices, such as by using a wireless communication protocol. However, the interface is typically not designed to include wireless capabilities. For example, a housing of the interface may be designed to meet safety standards that require a thick metal housing formed of a single integral piece. Wireless signals can be adversely affected by metal surfaces. In addition, components internal to the housing may be similarly disposed to meet safety and user interface requirements. For example, a display board may necessarily be coplanar with a plane formed by an opening in the housing to ensure that the display may be readable by the user. Such a board can interfere with wireless signals between the interface and other devices.

Figure 25:
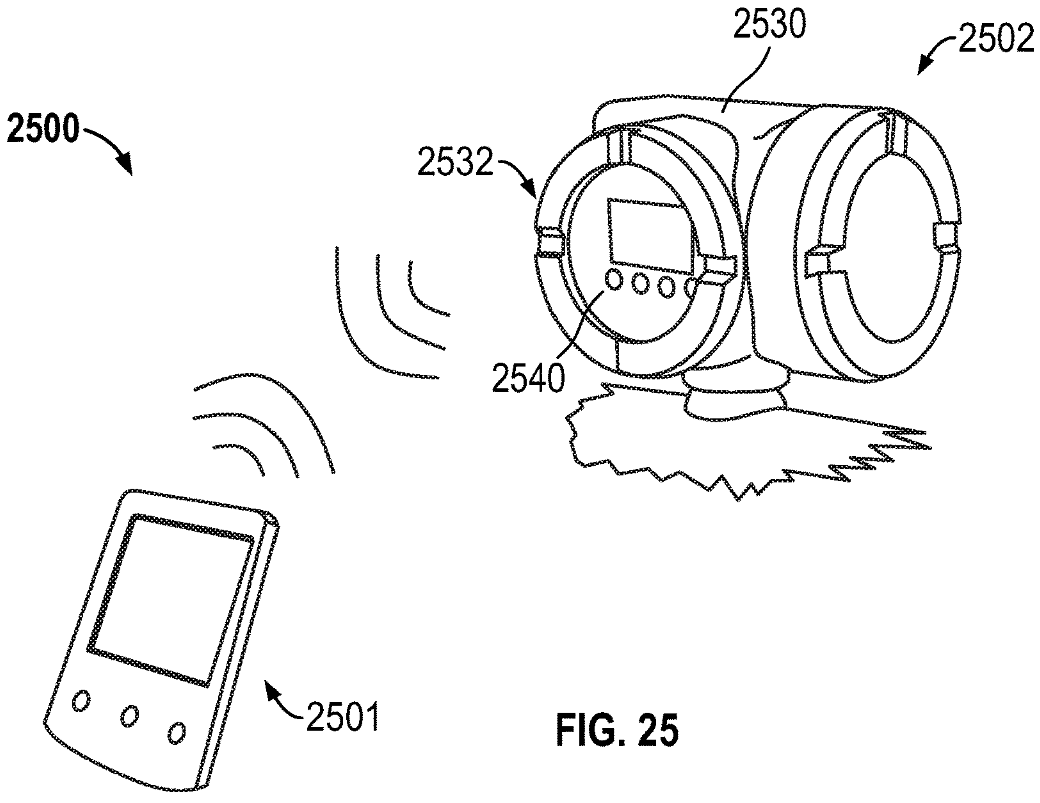
FIG. 25 shows a communications system 2500 including an interface 2502 for improved accessibility of the interface 2502.

FIG. 25 shows a communications system 2500 including an interface 2502 having improved accessibility. In particular, the communications system 2500 includes a wireless device 2501 that is configured to wirelessly communicate with the interface 2502 via a fascia 2540. The fascia 2540 may be considered part of a meter electronics in the interface 2502. The fascia 2540 is disposed proximate to a display opening 2532 in a housing 2530.

An interface other than the interface 2502 shown in FIG. 25 may have very limited or almost no openings for line of sight (LOS) needed for integrating any wireless fidelity (Wi-Fi), or other communications standard. Metal housings, such as aluminum or stainless steel, for example, may be problematic for a radio frequency (RF) signal. The other interface typically includes a limited number of plastic parts, such as sub bezels, display cover, terminal covers, display glass covers that in combination significantly and negatively impacts the RF signal range from the interface. This coupled with the interface having an external RF transparent opening can render WiFi communication difficult. To address these issues, the fascia 2540 provides for an opening in a circuit board and a slot in a fascia that are positioned to reduce adverse effects of the other components in the interface 2502.

Figure 26:
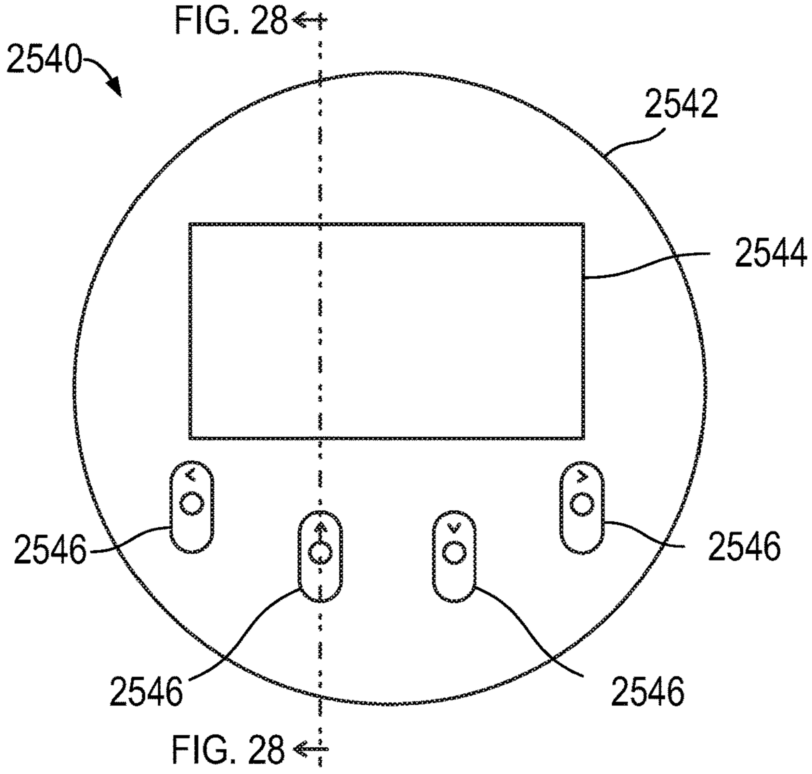
FIGS. 26-28 show various views of the fascia 2540 for the interface 2502 with improved accessibility.
Figure 27:
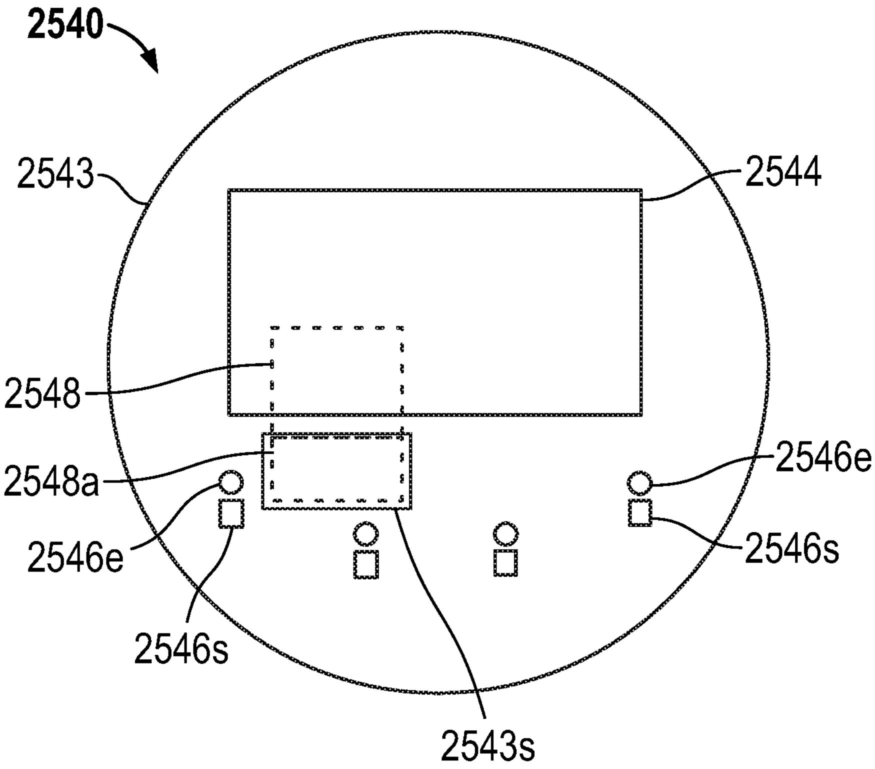
Figure 28:
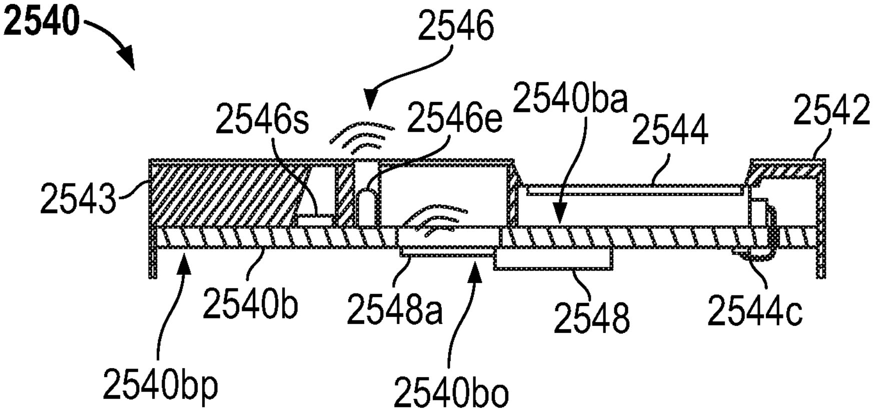

FIGS. 26-28 show various views of the fascia 2540 for the interface 2502 with improved accessibility. As shown in FIG. 26, the fascia 2540 includes a face plate 2542 through which a display 2544 is visible. The fascia 2540 also includes buttons 2546 that are disposed below the display 2544. The buttons 2546 are configured to detect a finger press against the fascia 2540. As shown in FIG. 27, the face plate 2542 is removed to expose a fascia chassis 2543 and emitters **2546*e* and sensors 2546*s* of the buttons 2546 shown in FIG. 27. Also shown is a wireless transceiver 2548 having an antenna 2548*a*. The antenna 2548*a* is disposed proximate a slot 2543*s* in the fascia chassis 2543. FIG. 28 is a sectional view of the fascia 2540 taken from FIG. 26. As shown in FIG. 26, the fascia 2540 includes the face plate 2542, fascia chassis 2543, display 2544, button 2546, including the emitter 2546*e* and sensor 2546*s*, wireless transceiver 2548 and antenna 2548*a* of the wireless transceiver 2548. Also shown is a board 2540*b* and a display cable 2544*c* that communicatively couples the display 2544 and the board 2540*b***.

As described above, the interface 2502 may include the housing 2530 having the display opening 2532. The housing 2530 may be comprised of a metal, such as steel, aluminum, etc., that is formed of a single integral piece to meet safety or other standards, so as to be explosion proof, water or other ingress resistant, etc. Due to the housing 2530 being comprised of conductive material, a wireless signal propagating near the housing 2530 may be adversely affected.

The display opening 2532 is shown as being circular in shape, although any suitable shape may be employed. For example, rectangular, oval, hexagonal, shapes may be employed. In addition, the display opening 2532 is shown as being planar, although non-planar openings may be employed. The display opening 2532 may include a bezel that contains as transparent material that is a dielectric that may not adversely affect a wireless signal propagating through the display opening 2532.

The fascia 2540 is disposed internal to the housing 2530 and may be proximate the display opening 2532. As discussed above, the fascia 2540 may include the board 2540*b* and the wireless transceiver 2548. The board 2540*b* may comprise an anterior side 2540*ba* facing the display opening 2532 and a posterior side 2540*bp* facing an internal portion of the housing 2530. The wireless transceiver 2548 may be disposed on the posterior side 2540*bp*, as shown, of the board 2540*b*. The wireless transceiver 2548 may be configured to communicatively couple to the wireless device 2501 via an opening 2540*bo* in the board 2540*b*.

Also as discussed above, the fascia 2540 may include the fascia chassis 2543 mechanically coupled to the board 2540*b*. The fascia chassis 2543 includes the slot 2543*s*, which may be proximate the wireless transceiver 2548. The fascia chassis 2543 may be comprised of a conductive material, such as aluminum, steel, or the like, although any suitable material may be employed. The fascia chassis 2543 may provide a rigid support structure for the board 2540*b*. The board 2540*b* may be mechanically and/or electrically coupled via ground to the fascia chassis 2543. For example, the board 2540*b* may have a substantially continuous ground plane on the posterior side 2540*bp* of the board 2540*b*. Accordingly, the opening 2540*bo* may allow the wireless signal to propagate through the board 2540*b*.

The opening 2540*bo* is shown as a through-hole that traverses the board 2540*b*. That is, the opening 2540*bo* traverses both a dielectric material and, for example, the substantially continuous ground plane on the posterior side 2540*p* of the board 2540*b*. Alternative boards may not include a through-hole. For example, an opening in an alternative board may only be made in a ground plane, and/or other conductive layers of the board. For example, the opening in the alterative board may be defined by an absence of ground plane on the posterior side of the alternative board. Accordingly, the opening of the alternative board may be an electrical opening in that the board may be mechanically solid at the opening but electrically transparent to electro-magnetic propagation or wireless signals.

The display 2544 may be coupled to the anterior side 2540*ba* of the board 2540*b*. In particular, the display 2544 is mechanically and electrically coupled to the anterior side 2540*ba* of the board 2540*b* on the opposite side of the board 2540*b* from the wireless transceiver 2548. As can also be seen in FIG. 28, the display 2544 is recessed in the fascia chassis 2543. That is, an anterior surface of the display 2544 is recessed from an anterior surface of the fascia chassis 2543.

The wireless transceiver 2548 may be any suitable wireless transceiver capable of receiving and transmitting a wireless signal. The wireless transceiver 2548 may be a WiFi wireless transceiver, although any suitable protocol may be employed, such as Bluetooth, Zigbee, etc. The wireless transceiver 2548 may be configured to communicate with one or more devices 2501. Although a single wireless transceiver 2548 is shown, more than one wireless transceiver may be employed. For example, a WiFi wireless transceiver and a Bluetooth transceiver may be employed. In such a configuration, the wireless transceivers may or may not be disposed on the posterior side of the board 2540*b*.

The antenna 2548*a* may be an onboard chip ceramic antenna which may have suitable performance in environments that are constrained as described above, although any suitable antenna may be employed. For example, an antenna that is built into the board 2540*b* may be employed. The antenna 2548*a* may be configured for one or more communication protocols, such as the WiFi, Bluetooth, and/or Zigbee protocols discussed above. The antenna 2548*a* may be part of the wireless transceiver 2548 or be coupled to the wireless transceiver 2548 using, for example, a coaxial cable. For example, the wireless transceiver 2548 could be displaced further away from the opening 2540*bo* of the board 2540*b* and a coaxial cable may be routed along the posterior side of the board 2540*b* between the wireless transceiver 2548 to the antenna 2548*a*.

As shown in FIG. 28, when the fascia 2540 is disposed and positioned in the housing 2530, the anterior side 2540*ba* of the board 2540*b* may be proximate the display opening 2532 in the housing 2530. Also as shown in FIGS. 26-28, the display 2544 is disposed proximate the opening 2540*bo* of the board 2540*b*. The display 2544 is also disposed opposite the wireless transceiver 2548 on the board 2540*b*. Also as shown in FIGS. 26-28, the wireless transceiver 2548 includes the antenna 2548*a*, which is disposed proximate the opening 2548*a* in the board 2540*b* and the slot 2543*s* in the fascia chassis 2543.

Accordingly, the display 2544 may not be in a transmission path of the wireless signal indicated by curved lines in FIG. 28. Therefore, although some displays may be disturbed by wireless signals, the display 2544 shown in FIGS. 26-28 may not be disturbed due to the display 2544 not being in the path of the wireless signals. With more specificity, the opening 2540*bo* in the board 2548*b* and the slot 2543*s* in the fascia chassis 2543 may form the signal path for the wireless signal.

Also, due to the antenna 2548*a* being placed proximate the slot 2543*s*, the wireless signal may propagate LOS between the wireless device 2501 and the wireless transceiver 2548. More specifically, the wireless signal may be transmitted to or from the antenna 2548*a* via the opening 2540*bo* in the board 2540*b* and the slot 2543*s* in the fascia chassis 2543 and through the display opening 2532 in the housing 2530. Due to the substantially central location of the antenna 2548*a* relative to an internal surface formed by the housing 2530 and the circular plane formed by the display opening 2532 of the housing 2530, adverse effects of the housing 2530 on the wireless signal may be minimized.

As can be appreciated, due to the antenna 2548*a* placement on the wireless transceiver 2548 is posterior to the display 2544, the wireless signal may be hampered without the slot 2543*s*. Additionally, the antenna 2548*a* is disposed proximate an opening for the emitter 2546*e*. The opening allows for infrared (IR) light to be emitted from the emitter 2546*e* to be reflected by a user's finger to the sensor 2546*s*, thereby detecting a finger press. The opening for the emitter 2546*e* may also allow for the wireless signal to propagate through the fascia chassis 2543. However, should be emitter 2546*e* be sensitive to the wireless signal the opening for the emitter 2546*e* may not be employed by the wireless signal emitted by the antenna 2548*a*. For example, the alternative opening may be particular to the antenna 2548*a*, as is shown in FIGS. 26-28, or another repurposed opening, such as a switch opening, or the like.

Figure 29:
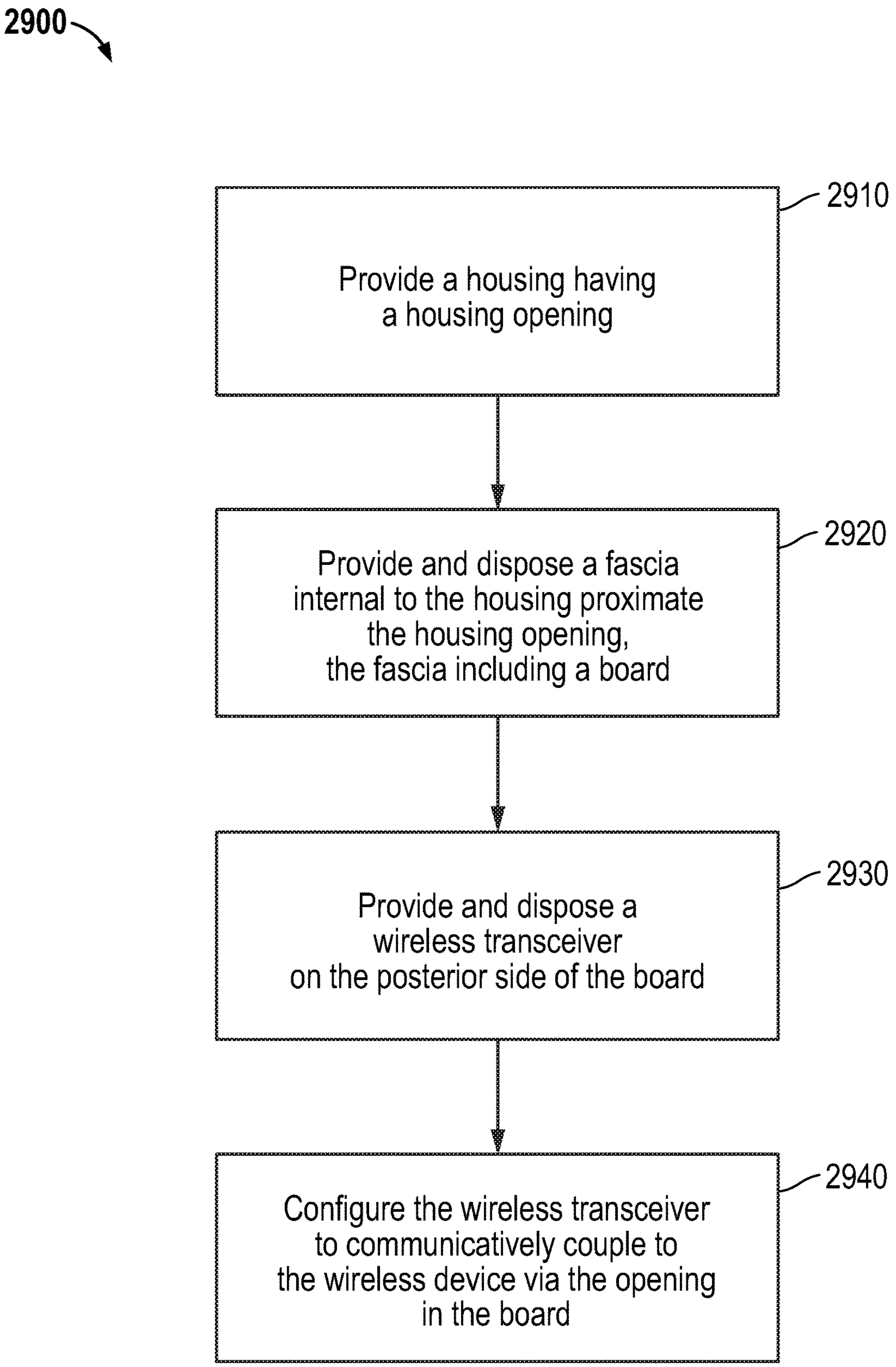
FIG. 29 shows a method 2900 of forming an interface with improved accessibility.

FIG. 29 shows a method 2900 of forming an interface with improved accessibility. As shown in FIG. 29, the method 2900, in step 2910, provides a housing having a display opening. The housing may be the housing 2530 described above, although any suitable housing may be employed. In step 2920, the method 2900 may provide and dispose a fascia internal to the housing proximate the display opening. Providing the fascia may comprise providing a board and a wireless transceiver, wherein the board comprises an anterior side facing the display opening and a posterior side facing an internal portion of the housing. This method 2900 may also, in step 2930, provide and dispose the wireless transceiver on the posterior side of the board. Disposing the wireless transceiver on the posterior side of the board may include affixing the wireless transceiver to the board. In step 2940, the method 2900 may configure the wireless transceiver to communicatively couple to the wireless device via an opening in the board.

Providing the fascia may further comprise providing a fascia chassis and mechanically coupling the fascia chassis to the board such that a slot in the fascia chassis is proximate the wireless transceiver. The method 2900 may also provide and couple a display to the anterior side of the board. Coupling the display to the anterior side of the board may comprise affixing the display to the anterior side of the board. The method may also dispose the display proximate the opening of the board. For example, the display may not extend or otherwise obstruct a wireless signal propagating through the opening of the board. The wireless signal may propagate through the opening in the board due to the display opposite the wireless transceiver on the board. For example, the method 2900 providing the wireless transceiver may include providing an antenna and disposing the antenna to the opening in the board and the slot in the fascia chassis.

The communications system 2500, the interface 2502, and the method 2900 may provide the interface 2502 with improved accessibility. The fascia 2540 may be disposed proximate the display opening 2532 in the housing 2530 and may also include the slot **2543*s* that allows for wireless signals between the devices and the interface 2502. The board 2540*b* in the fascia 2540 may include the opening 2540*bo* to allow the wireless signals to be transmitted and received by the antenna 2548*a* of the wireless transceiver 2548. Accordingly, the interface 2502 and the device 2501** may communicate wirelessly.

Automatically Detecting a Display

The interfaces described above may include a display. Some interfaces do not have displays. These interfaces are sometimes referred to as blind interfaces, which may require configuration of an interface during assembly. For example, the display may be part of a board that is contained within a fascia, similar to the fascia 2540 described above, that may not be included in the blind interface. Accordingly, the blind interface may necessarily include some components that are included in the fascia. For example, the fascia may include light emitting diodes (LEDs), switches, or the like, that a user interacts with. The meter electronics in the blind interface may therefore include a similar set of components. This can cause configuration issues such as, for example, the blind interface activating LEDs in both the meter electronics and the fascia, or the like.

Figure 30:
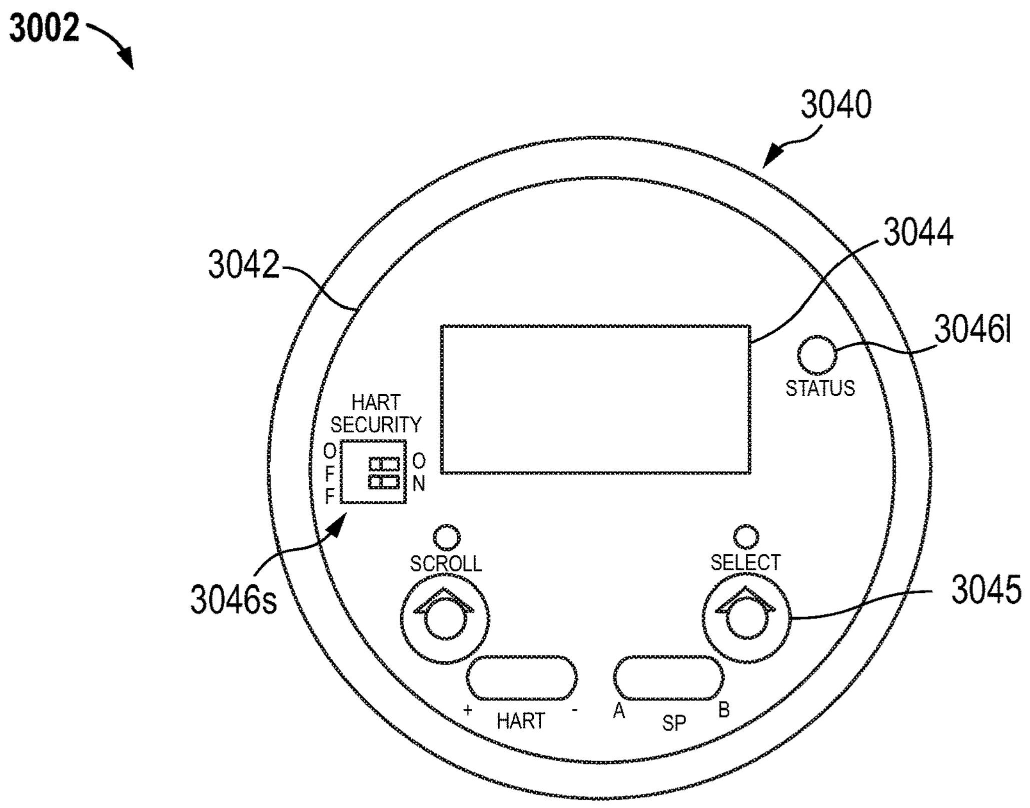
FIGS. 30 and 31 shows a display interface 3002 and a blind interface 3102 which are configured to improve accessibility thereof.
Figure 31:
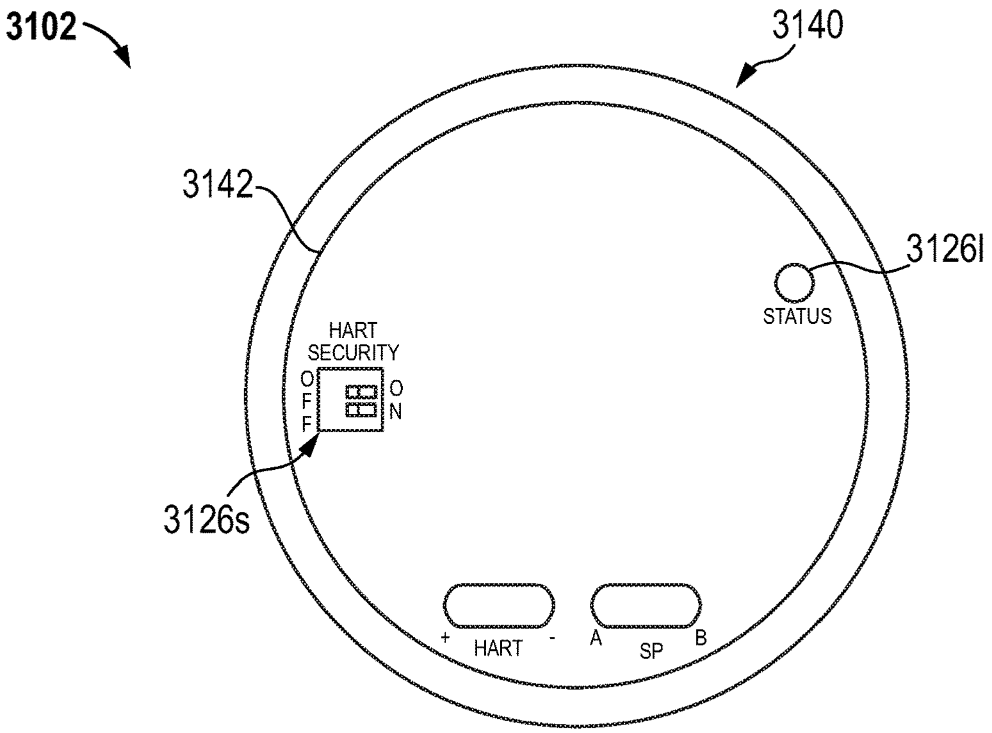

FIGS. 30 and 31 shows a display interface 3002 and a blind interface 3102 which are configured to improve accessibility thereof. As shown in FIG. 30, the display interface 3002 includes a display fascia 3040. As shown in FIG. 31, the blind interface 3102 includes a blind fascia 3140. Both the display fascia 3040 and the blind fascia 3140 include a face plate 3042, 3142. Both the display interface 3002 and the blind interface 3102 may include status light emitting diodes (LEDs) 30461, 31261 and a set of switches **3046*s*, 3126*s*. However, the display fascia 3040 also includes a display 3044 and switches 3045 for controlling the display 3044, whereas the blind fascia 3140** does not.

The display fascia 3040 may include a display board similar to the board **2540*b* described above with reference to FIG. 31. However, the blind fascia 3140 may not include a display board. As a result, an electronics board in a meter electronics in both the display fascia 3040 and the blind fascia 3140 may include components and features that are redundant to the display board in the display fascia 3040. For example, as shown in FIGS. 30 and 31, the LED 30461 and set of switches 3046*s* in the display fascia 3040 may be in the display board whereas the LED 31261 and set of switches 3126*s* in the blind fascia 3140** may be in the electronics board of the meter electronics.

Accordingly, the electronics board and the display board may include duplicative circuitry to support the redundant components. For example, there may be a set of general-purpose input/output (GPIO) pins in the board stack to support the LED 30461 and switches **3046*s* of the display board and a separate set of GPIO pins to support the LED 31261 and set of switches 3126*s* of the electronics board. To avoid this, there may be two different versions of the electronics board, where one version intended to support the display board does not include the LED 31261 and set of switches 3126*s***, but this is cost prohibitive.

Figure 32:
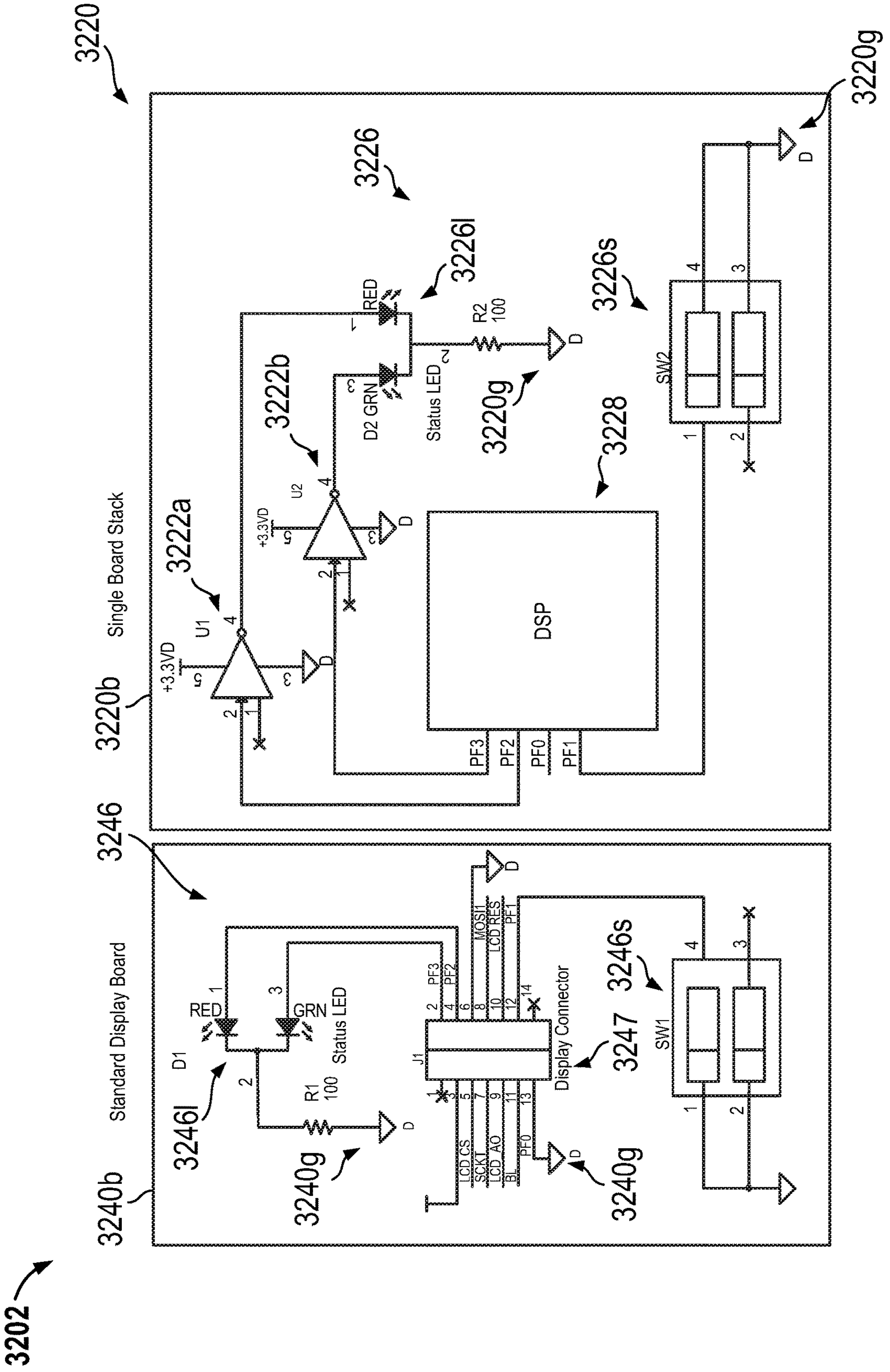
FIG. 32 shows circuit diagrams of an interface 3202 including a display board 3240*b* and a meter electronics 3220 configured to improve accessibility to an interface by supporting the interface 3202 or the blind fascia 3140 by detecting the display board 3240*b*.

FIG. 32 shows circuit diagrams of an interface 3202 including a display board **3240*b* and a meter electronics 3220 configured to improve accessibility to an interface by supporting the interface 3202 or the blind fascia 3140 by detecting the display board 3240*b*. As shown in FIG. 32, the circuit diagram is of an electronics board 3220*b* where a portion of circuits in the electronics board 3220*b* is illustrated for clarity. The display board 3240*b* and the electronics board 3220*b* include components 3246, 3226. The components 3226, 3246 are comprised of a set of LEDs 32261, 32461 and a set of switches 3226*s*, 3246*s***.

The components 3246 of the display board **3240*b* are coupled to a display connector 3247. More specifically, the LEDs 32461 are coupled to pins 2 and 4 of the display connector 3247, which are respectively designated as PF3 and PF2 pins. The switch 3246*s* is coupled to pin 12 of the display connector 3247, which is designated as a PF1 pin. As can be seen, the display connector 3247 also includes a PF0 pin, which is coupled to a ground 3240*g* of the display board 3240*b*. The LEDs 32461 are also connected to the ground 3240*g* of the display board 3240*b***.

The display connector 3247 is electrically coupled to a processor 3228 of the electronics board **3220*b*. Accordingly, the pins on the display connector 3247 correspond to pins of the processor 3228. More specifically, the PF0, PF1, PF2, PF3 pins of the display connector 3247 respectively correspond to PF0, PF1, PF2, PF3 pins of the processor 3228. As a result, when the display board 3240*b* is coupled to the electronics board 3220*b*, the PF0, PF1, PF2, PF3 pins of the display connector 3247 are respectively coupled to the PF0, PF1, PF2, PF3 pins of the processor 3228**.

The electronics board **3220*b* has components 3226 that are also coupled to the processor 3228. More specifically, the switch 3226*s* is coupled to the pin labeled PF1 of the processor 3228 and the LEDs 32261 are respectively coupled to the pins labeled PF1 and PF2 of the processor 3228. As shown in FIG. 32, the processor 3228 is coupled to the LEDs 32261 via a first amplifier 3222*a* and a second amplifier 3222*b*. The electronics board 3220*b* is configured to detect and support the display board 3240_b_ while using the same pins to support the set of LEDs 32461, 32261 and a set of switches 3246_s_, 3226**_s_.

More specifically, with reference to FIG. 32, there is a total of twelve pins that are assigned. Of the twelve pins, eight pins are used to control a standard display, such as a liquid crystal display (LCD). Another four pins, labeled PF0 to PF3, are compatible for use with or without the display board 3240_b_. The PF0 pin detects whether the display board 3240_b_ is present. If the display board 3240_b_ is present, then the PF0 pin will be latched to the ground 3240_g_. If the display board 3240_b_ is not present, the PF0 pin will not be latched to the ground 3240_g_. The PF1 pin is compatible to be used for either switch 3226_s_, 3246_s_. The PF2 and PF3 pins are used for control of the sets of LEDs 32461, 32261. When the display board 3240_b_ is present, the PF2 and PF3 pins are active high level and when the display board 3240_b_ is not present, the PF2 and PF3 pins are active low level.

That is, when the display board 3240_b_ is connected to the electronics board 3220_b_, the PF2 and PF3 pins are active high level and therefore apply a voltage to the LEDs 32461 on the display board 3240_b_ to turn on the LEDs 32461. The amplifiers 3222_a_, 3222_b_ are inverters and therefore a high-level voltage will be inverted to low-level voltage (i.e., zero) thereby deactivating the LEDs 32261 on the electronics board 3220_b_. Conversely, when the display board 3240_b_ is not connected to the electronics board 3220_b_, the PF2 and PF3 pins are active low level and therefore a low-level voltage on the PF2 and PF3 pins are inverted by the amplifiers 3222_a_, 3222_b_ to turn on the LEDs 32261 on the electronics board 3220_b_.

As can be appreciated, the effect of the active high-level logic and low-level logic on the LEDs 32261, 32461 depend on the cathodes of the LEDs being connected to the grounds 3220_g_, 3240_g_. Similarly, the switches 3246_s_ on the display board 3240_b_ and the switches 3226_s_ on the electronics board 3220_b_ are both connected to the grounds 3240_g_, 3220_g_. Accordingly, when the display board 3240_b_ is connected to the electronics board 3220_b_, switching the switch 3246_s_ on the display board 3240_b_ can latch pin PF1 to ground 3240_g_. If the display board 3240_b_ is not connected to the electronics board 3220_b_, then switching the switch 3226_s_ in the electronics board 3220_b_ can latch the PF1 pin to ground 3220_g_. Accordingly, the PF1 pin may be latched to ground by either the switch 3226_s_ in the electronics board 3220_b_ or the switch 3246_s_ in the display board 3240_b_.

Figure 33:
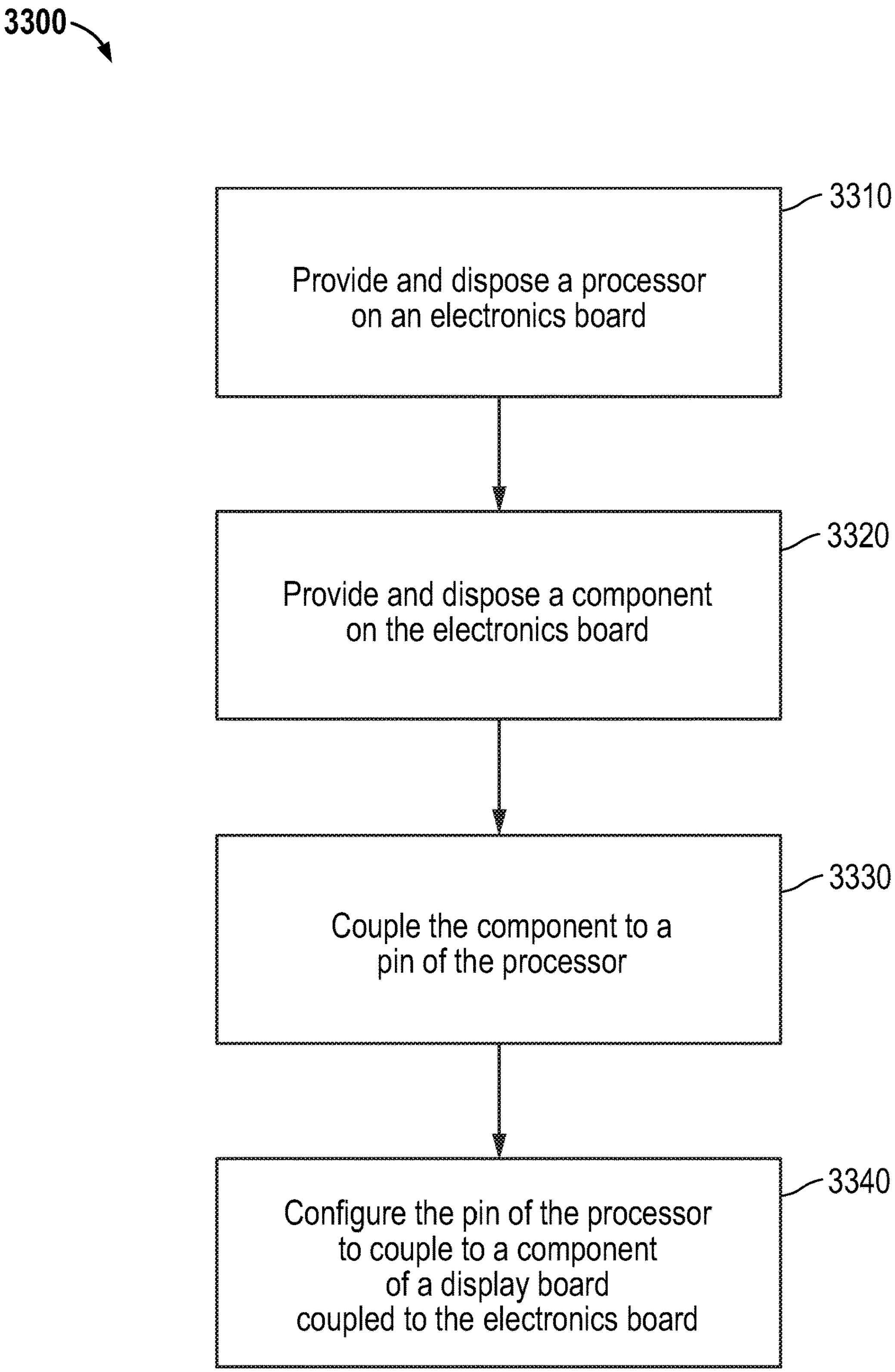
FIG. 33 shows a method 3300 of improving an accessibility of an interface.

FIG. 33 shows a method 3300 of improving an accessibility of an interface. As shown in FIG. 33, the method 3300 provides and disposes a processor on an electronics board in step 3310. The processor and electronics board may be, for example, the processor 3228 and the electronics board 3220_b_ described above, although any suitable electronics board and processor may be employed. In step 3320, the method 3300 provides and disposes a component on the electronics board. The component may be, for example, the LEDs 32261 or switch 3226_s_ on the electronics board 3220_b_ described above. The method 3300 in step 3330 couples the component to a pin on the processor. For example, as described above, the switch 3226_s_ is coupled to PF0 pin of the processor 3228 and LEDs 32261 are coupled to the PF2. PF3 pins of the processor 3228. In step 3340, the method 3300 configures the pin of the processor to couple to a component on a display board coupled to the electronics board. For example, as described above, the display connector 3247 connects the components 3226 on the electronics board 3220_b_ and the components 3246 on the display board 3240_b_ in parallel to the grounds 3220_g_, 3240_g_.

Accordingly, configuring the pin of the processor to couple to the component of the display board may comprise configuring the pin to couple to the component of the display board via a connector coupling the display board to the electronics board. However, any suitable means may be employed, such as active switches controlled by the processor, or the like, may be employed. Providing the component may comprise providing one of a light emitting diode and a switch. However, other components may be employed.

The method 3300 may also provide a plurality of components and respectively couple the plurality of components to a plurality of pins of the processor and configuring the plurality of pins of the processor to respectively couple to a plurality of components of the display board. For example, the method 3300 may also provide and dispose other components in addition to the LEDs 32261 shown in FIG. 32. The plurality of components of the display board may be redundant to the plurality of components of the electronics board, in a manner similar to the LEDs 32261, 32461 and switches 3226_s_, 3246_s_ described above.

Coupling the component to the pin of the processor may comprise coupling the pin of the processor to a first terminal of the component of the electronics board and coupling a second terminal of the component to a ground. For example, with reference to FIG. 32, the first terminals 1, 3 of the LEDs 32261 on the electronics board 3220_b_ are coupled to the PF2. PF3 pins of the processor 3228 and the second terminals 2 of the LEDs 32261 are coupled to the ground 3220_g_. A first pin 1 of the switch 3226_s_ is coupled to the PF1 pin of the processor 3228. Similarly, on the display board 3240_b_, respective first terminals 1, 3 of the LEDs 32461 on the electronics board 3220_b_ are coupled to the PF2, PF3 pins of the processor 3228 and the second terminals 2 of the LEDs 32461 are coupled to the ground 3240_g_. A first terminal 4 of the switch 3246_s_ is coupled to the PF1 pin of the processor 3228.

The method 3300 may also provide the display board and couple the pin of the processor to the component of the display board. Coupling the pin of the processor to the component of the display board may comprise coupling the pin of the processor to a first terminal of the component of the display board and coupling a second terminal of the component of the display board to a ground. For example, the display board 3240_b_ may be coupled to the electronics board 3220_b_ via the display connector 3247 thereby connecting the respective first terminals 1, 3 of the LEDs 32461 to the PF2, PF3 pins of the processor 3228 and the first terminal 4 of the switch 3246_s_ to the PF1 pin of the processor 3228.

The meter electronics 3220 and the method 3300 provide an interface 3202 having improved accessibility. For example, the meter electronics 3220 includes the processor 3220_p_ that can detect when the display board 3240_b_ is connected to the meter electronics 3220. By detecting the display board 3240_b_, the processor can configure its pins to have a suitable logic level. As a result, fewer GPIO pins may be used by allowing for the same pins to be used. In addition, the same meter electronics can be employed regardless of whether a display is employed or not. This can reduce the material costs of an interface. However, access to the meter electronics may be difficult when a fascia is employed where it can be misplaced or mis-inserted into the interface.

Pivotable Fascia

An interface may have a fascia, such as the fascia 2540 described above, that can limit a user's access to a meter electronics disposed behind the fascia. In addition, once the fascia is removed from the interface, the fascia and components, such as a display, on the fascia may be damaged or misplaced. In addition, the removal of the fascia may cause damage to the interface, housing, and/or meter electronics if not performed correctly.

Figure 34:
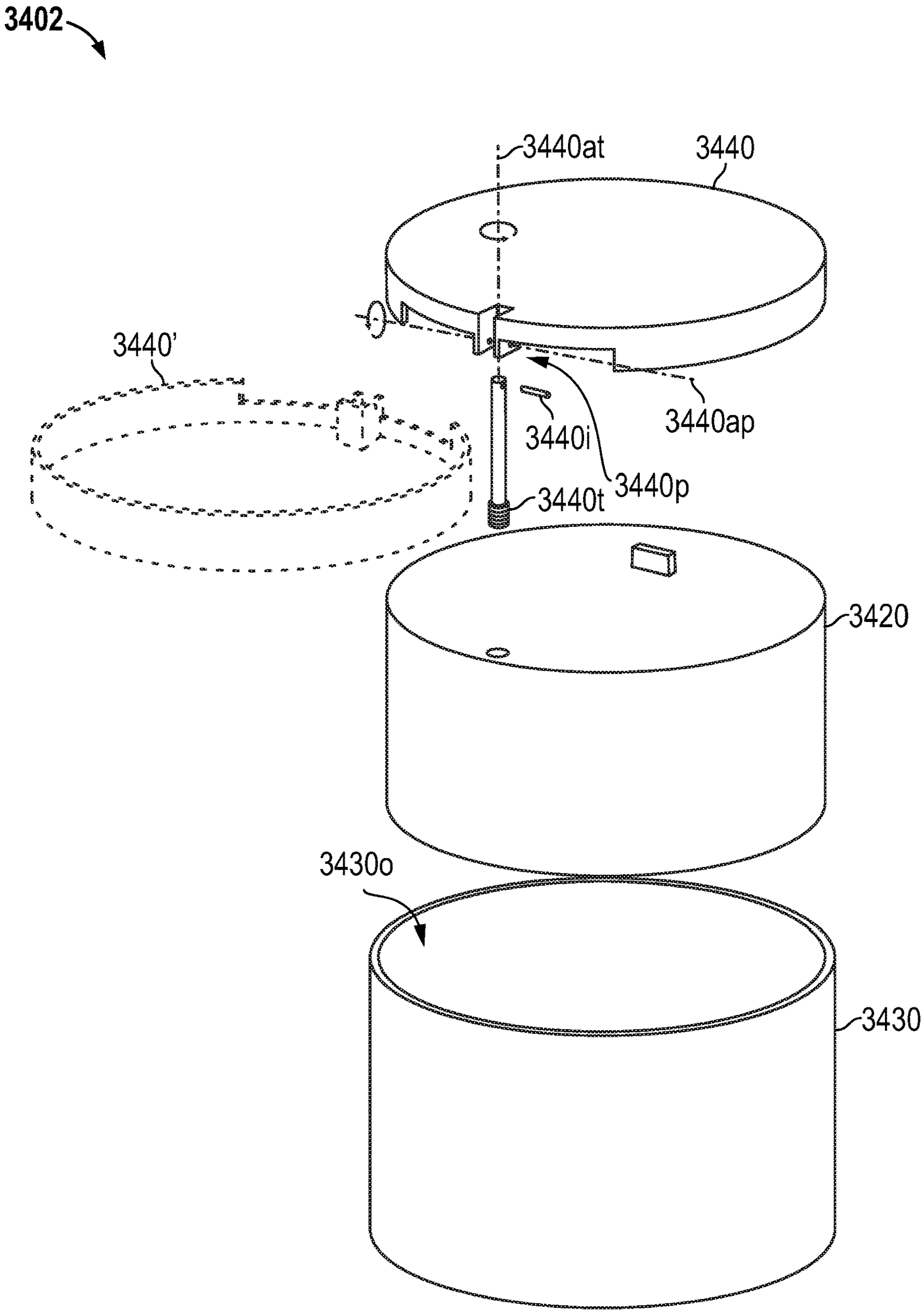
FIGS. 34-38 show an interface 3402 with improved accessibility.
Figure 35:
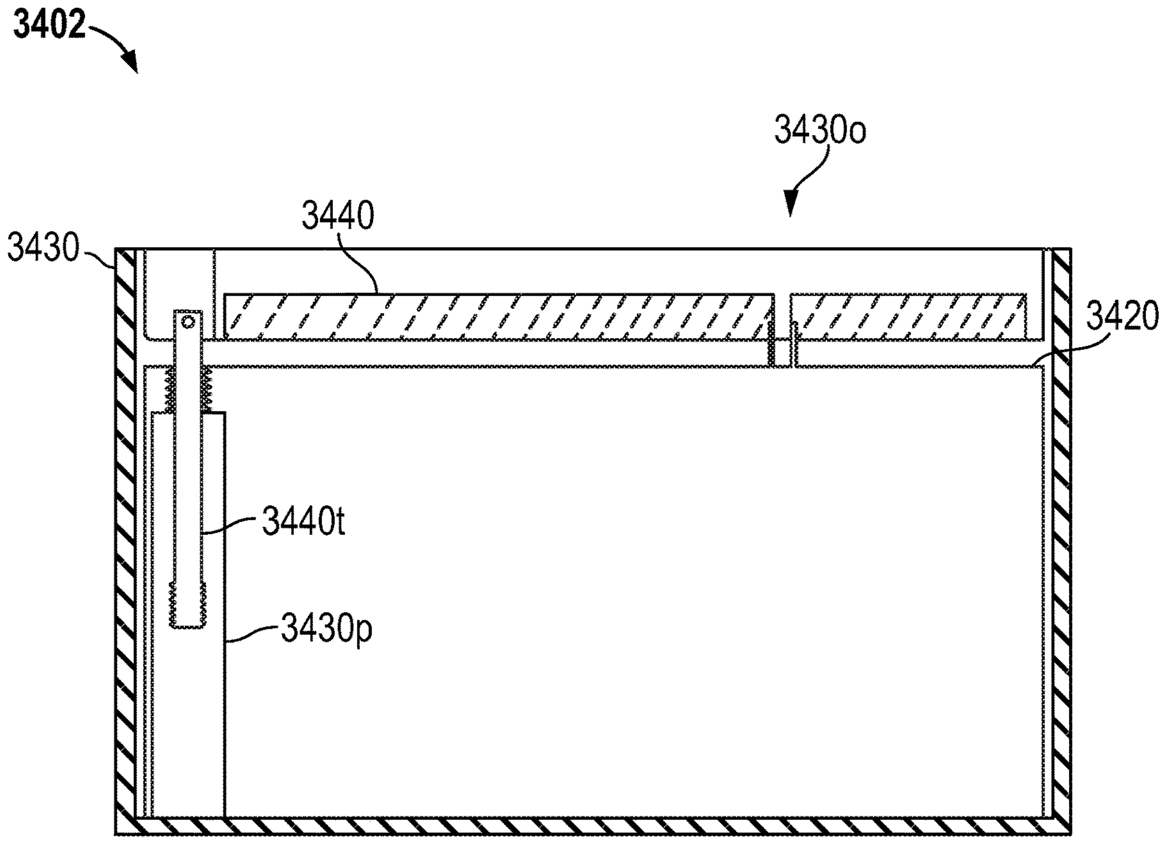
Figure 36:
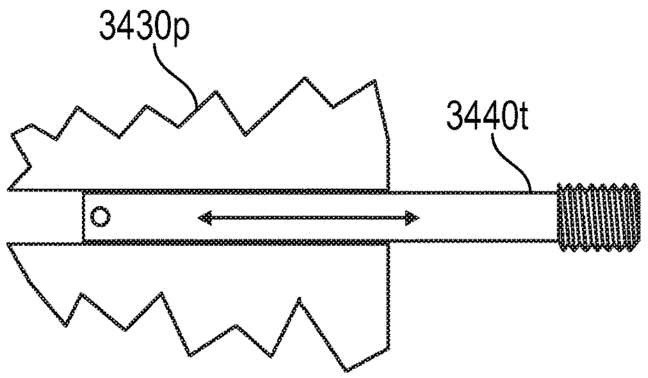

FIGS. 34-38 show an interface 3402 with improved accessibility. As shown in FIG. 34, the interface 3402 includes a fascia 3440 that is configured to rotate about a translating axis 3440*at* and rotate about a pivoting axis 3440*ap* to a pivoted fascia 3440' position. The translating axis 3440*at* and the pivoting axis 3440*ap* are orthogonal and coincident at a pivot point 3440*p*. A translating rod 3440*t* is aligned with the translating axis 3440*at*. As will be described in more detail in the following, the translating rod 3440*t* displaces along the translating axis 3440*at*. A pin 3440*i* couples the translating rod 3440*t* with the fascia 3440. The translating rod 3440*t* rotatably and pivotably couples the fascia 3440 to a meter electronics 3420. The meter electronics 3420 may be a board stack, electronics board, or the like. The meter electronics 3420 and the fascia 3440 may be disposed in a housing 3430, as is shown in FIG. 35. FIG. 35 also shows a rod post 3430*p*, which may be an integral part of or affixed to the housing 3430. The translating rod 3440*t* is disposed in and is configured to translate in the rod post 3430*p*, as is shown in FIG. 36. The fascia 3440 may therefore be configured to displace through an opening 3430*o* of the housing 3430.

The fascia 3440 may comprise any suitable material and include any suitable components. For example, the fascia 3440 may be similar to the fascia 2540 described above with reference to FIGS. 26-28. That is, the fascia 3440 may include a display, electronic components, connectors, switches, or the like. Alternatively, the fascia 3440 may be, for example, a plastic cover, such as a clear plastic cover, that can be disposed over a meter electronics.

The translating rod 3440*t*, pin 3440*i*, and rod post 3430*p* may be comprised of, for example, metal although any suitable material may be employed, such as thermoset polymers, or the like. The translating rod 3440*t* is shown as having a cylindrical shape, although any suitable shape may be employed. The translating rod 3440*t* include a bore into which the pin 3440*i* is installed. The bore of the translating rod 3440*t* may be aligned with a bore of the fascia 3440 when the pin 3440*i* is installed in the bores to couple the translating rod 3440*t* to the fascia 3440.

The translating rod 3440*t* is also shown as including a smooth portion and a threaded portion, which may be used to install the translating rod 3440*t* into the rod post 3430*p* and for retaining the translating rod 3440*t* in the rod post 3430*p*. Accordingly, as shown in FIGS. 35 and 36, the translating rod 3440*t* is captive to the rod post 3430*p*. The rod post 3430*p* allows the translating rod 3440*t* to displace or translate along and rotate about the translating axis 3440*at*. The rod post 3430*p* may allow the translating rod 3440*t* to display a predetermined distance that is sufficient to allow the fascia 3440 to displace away from and external to the housing 3430.

As described above, the translating rod 3440*t* translates along the translating axis 3440*at* to allow the fascia 3440 to displace away from the meter electronics 3420. Accordingly, where the fascia 3440 includes electronic components, cables may be used to communicatively couple the electronics components of the fascia 3440 to the meter electronics 3420. The pin 3440*i* may allow the fascia 3440 to pivot away from the meter electronics 3420 to allow for access to, for example, the cable, as well as the meter electronics 3420 without having to detach the fascia 3440 from the interface 3402.

Figure 37:
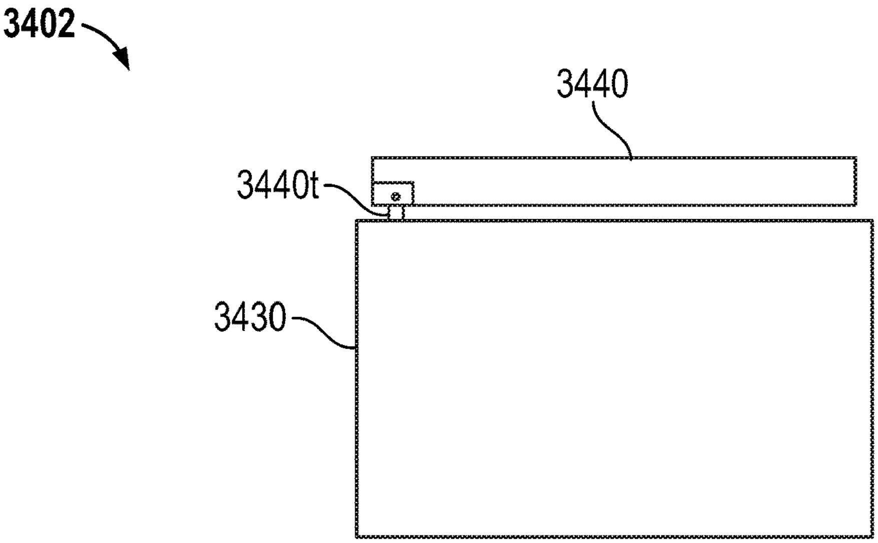
Figure 38:
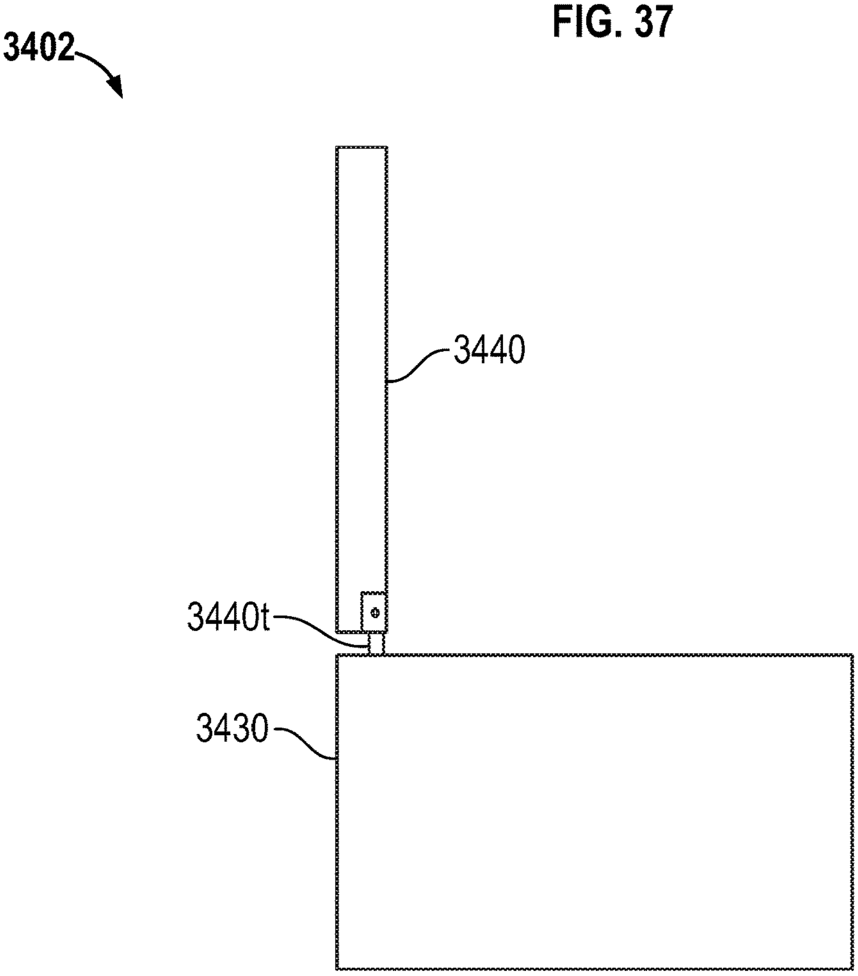

As shown in FIGS. 37 and 38, the translating rod 3440*t* is displaced so as to dispose the fascia 3440 external to the housing 3430. In FIG. 37, the fascia 3440 is not pivoted. In FIG. 38, the fascia 3440 is pivoted, but not rotated. As is explained above, the translating rod 3440*t* may also rotate to allow for relatively easy access to both sides of the fascia 3440. For example, a user may pivot the fascia 3440 from the position shown in FIG. 38 to allow the user to access a posterior side of a board in the fascia 3440. Alternatively, the user may rotate the fascia 3440 from the position shown in FIG. 37 to allow the user to access an anterior side of the fascia 3440 while also accessing the meter electronics 3420 disposed in the housing 3430. For example, the user may wish to toggle switches in the fascia 3440 and the meter electronics 3420 for, for example, troubleshooting purposes.

Figure 39:
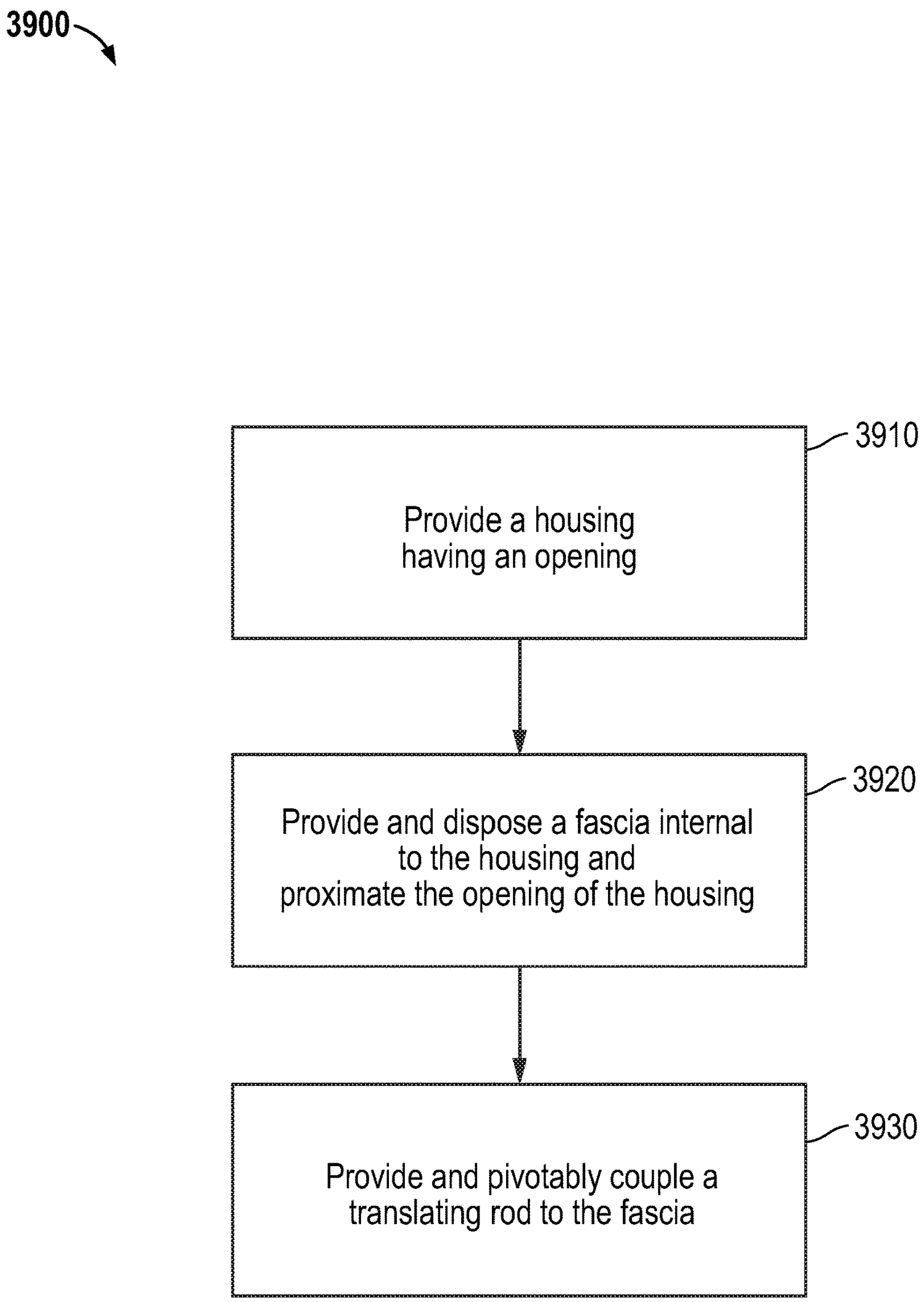
FIG. 39 shows a method 3900 of forming an interface having improved accessibility.

FIG. 39 shows a method 3900 of forming an interface having improved accessibility. In step 3910, the method 3900 provides a housing having an opening. The housing may be the housing 3430 described above, although any suitable housing may be employed. In step 3920, the method 3900 may provide and dispose a fascia internal to the housing and proximate an opening of the housing. The fascia may be the fascia 3440 described above although any suitable fascia may be employed. In step 3930, the method may provide and pivotably couple a translating rod to the fascia, the translating rod being configured to displace the fascia through the opening of the housing. The translating rod may be the translating rod 3440*t* described above, although any suitable translating rod may be employed. The translating rod may be pivotably coupled to the fascia using, for example, a pin, flexible coupler, u-joint, or the like, although any suitable means may be employed.

Pivotably coupling the translating rod to the fascia may comprise configuring the fascia to rotate about a translating axis that is collinear to a longitudinal axis of the translating rod. For example, the translating rod may have a longitudinal axis that extends orthogonal to a plane that is formed by a rotation of the fascia. The plane may also be orthogonal to a direction of a translation of the fascia along the translating axis. Pivotably coupling the translating rod to the fascia may also comprise configuring the fascia to rotate about a pivoting axis that is orthogonal to a longitudinal axis of the translating rod.

Configuring the translating rod to displace the fascia through the opening of the housing may comprise configuring the translating rod to displace the fascia in a direction collinear with a longitudinal axis of the translating rod. For example, the translating rod may extend the fascia through the opening in the housing in a direction that is orthogonal to a plane formed by the opening in the housing. Pivotably coupling the translating rod to the fascia may comprise pivotably coupling the translating rod to the fascia at a pivot point. The pivot point may be located where a pivot axis and a translation axis are coincident, where the fascia pivots about the pivot axis and rotates about the translation axis.

Figure 40:
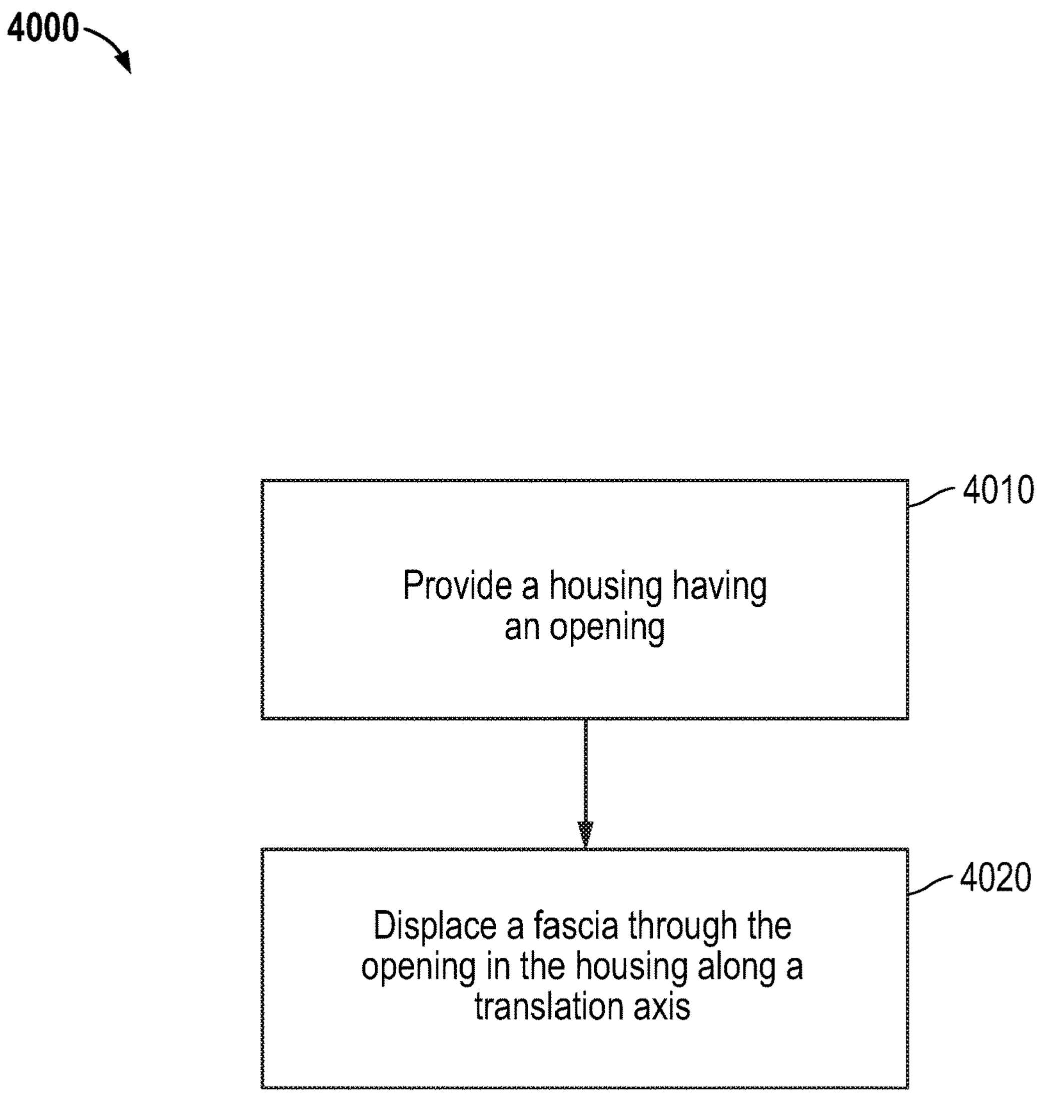
FIG. 40 shows a method 4000 for improving an accessibility of an interface.

FIG. 40 shows a method 4000 for improving an accessibility of an interface. As shown in FIG. 40, the method 4000 in step 4010 provides a housing having an opening. The housing may be the housing 3430 described above although any suitable housing may be employed. The method 4000 displaces a fascia through an opening in a housing along a translation axis in step 4020. The fascia may be configured to at least one of rotate about the translation axis and pivot about a pivot axis. The method 4000 may further comprise at least one of rotating the fascia about the translation axis and pivoting the fascia about the pivot axis. The translation axis and the pivot axis may be collocal at a pivot point, and the fascia may be configured to rotate and pivot about the pivot point.

The interface 3402 and method 3900 improves the accessibility of the interface 3402. In particular, the interface 3402 includes the fascia 3440 that is translatable to allow the fascia 3440 to displace through the opening 3430*o* in the housing 3430. The fascia 3440 may also respectively rotate and pivot about the translating axis 3440*at* and the pivoting axis 3440*ap*, which may be defined by the translating rod 3440*t* and the pin 3440*i*. Accordingly, the meter electronics 3420 may be accessible by a user and, moreover, may be accessible without the user damaging the housing 3430, the meter electronics 3420, or the fascia 3440. In addition, because the fascia 3440 remains attached to housing, the user may not misplace the fascia 3440.

Automatically Adjusted Display Contrast

As discussed above, an interface for a vibratory meter, such as the interface 2502 described above, may include a display. The display may have a contrast that allows the display to be read by a user in nominal conditions. For example, the display may have a contrast setting that ranges from 0 to 100 percent where 50 percent contrast is suitable for reading the display at room temperature in ordinary light. However, the interface may not be at nominal conditions for various reasons, such as when the interface is connected to a vibratory meter, for example the vibratory meter 5 described above, that is measuring materials at non-nominal temperatures, or the like. Although the contrast may be set at 50 percent, an actual contrast of the display may vary significantly due to, for example, temperature changes in the interface. More specifically, temperature changes of a meter electronics in the interface may cause the actual contrast of the display to vary, thereby causing a perception of a defective vibratory meter, an unreadable display, etc.

Figure 41:
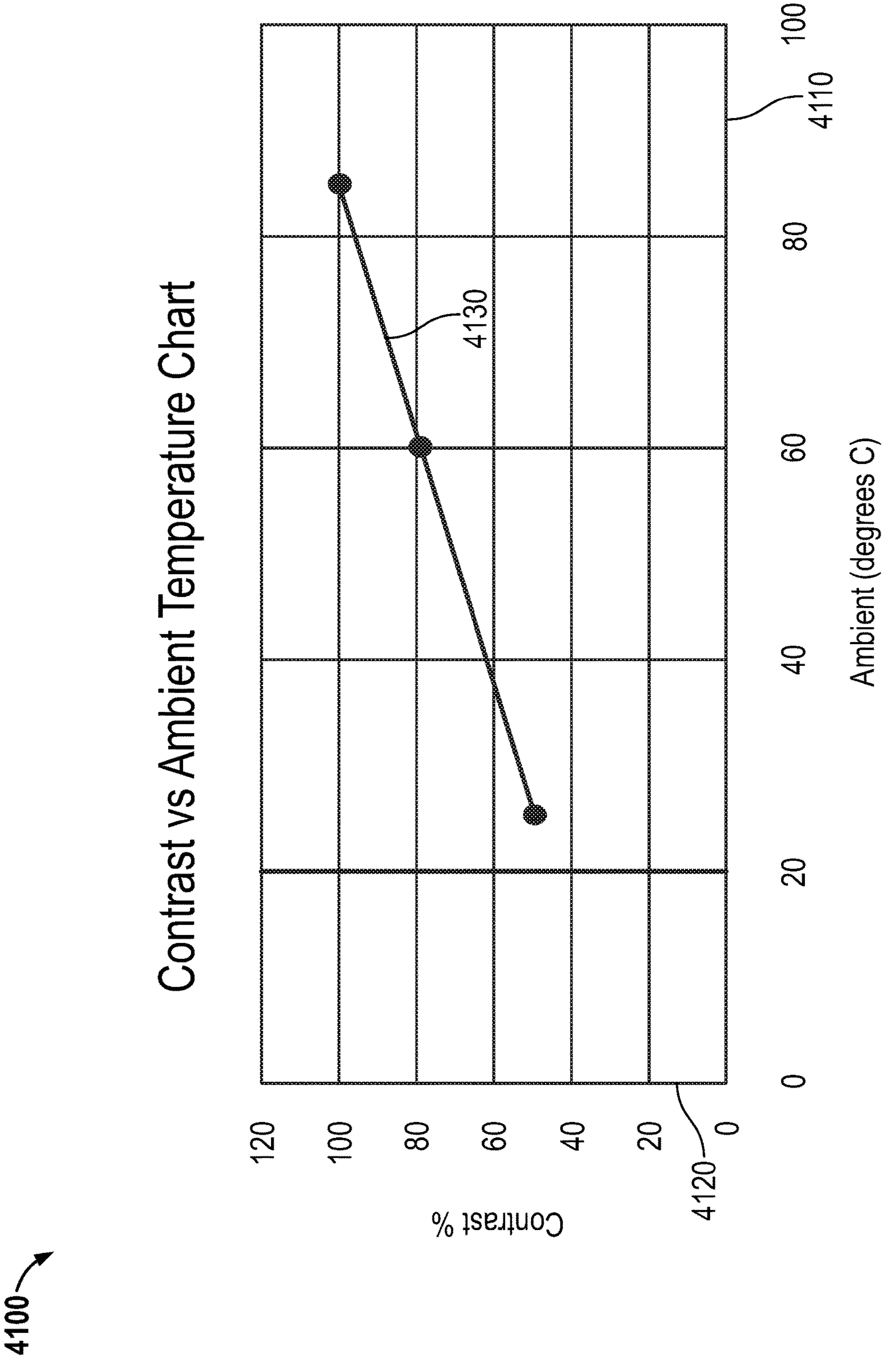
FIG. 41 shows a graph 4100 illustrating the relationship between the temperature and the contrast of the display.
Figure 42:
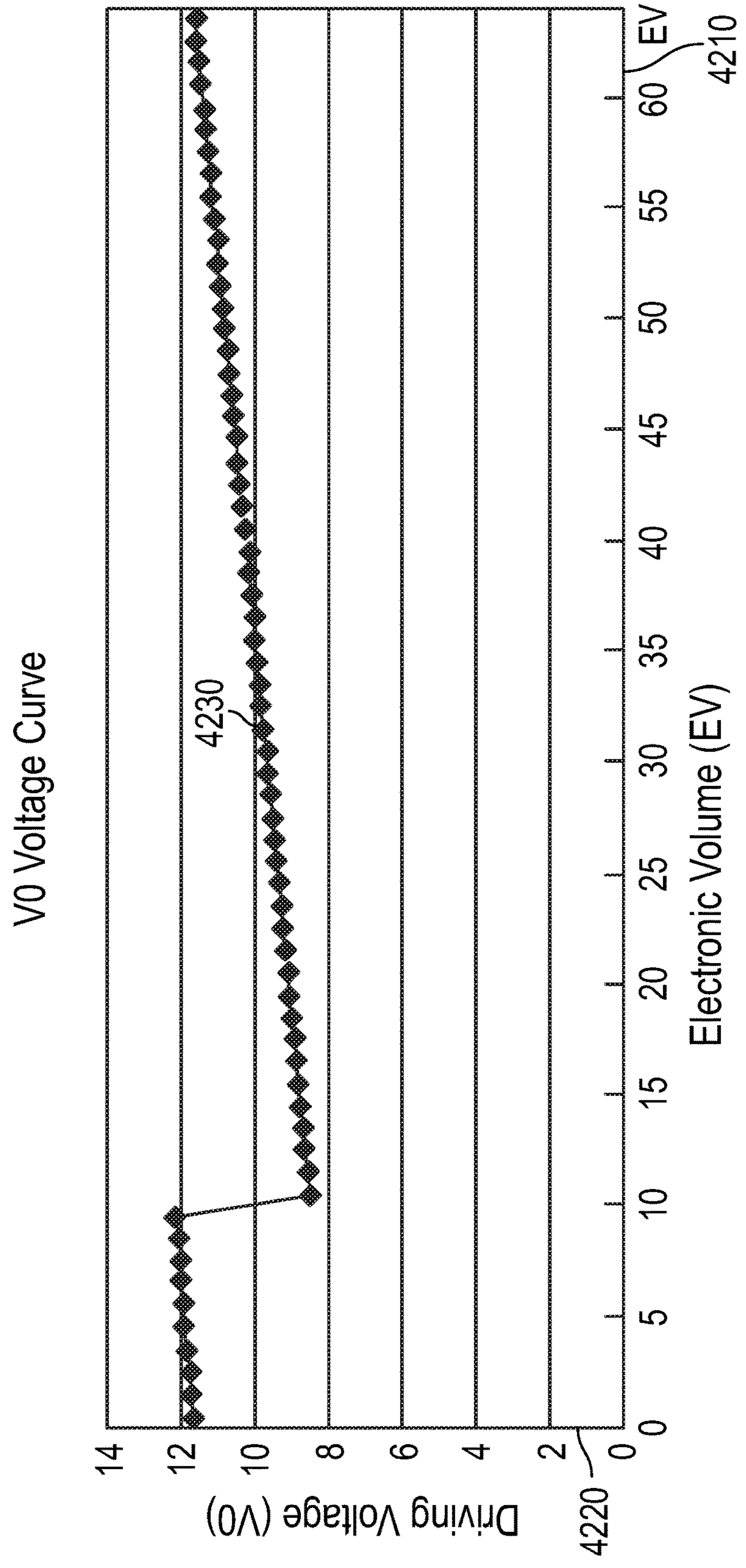
FIG. 42 shows a graph 4200 illustrating a relationship between a driving voltage and the contrast of the display.
Figure 43:
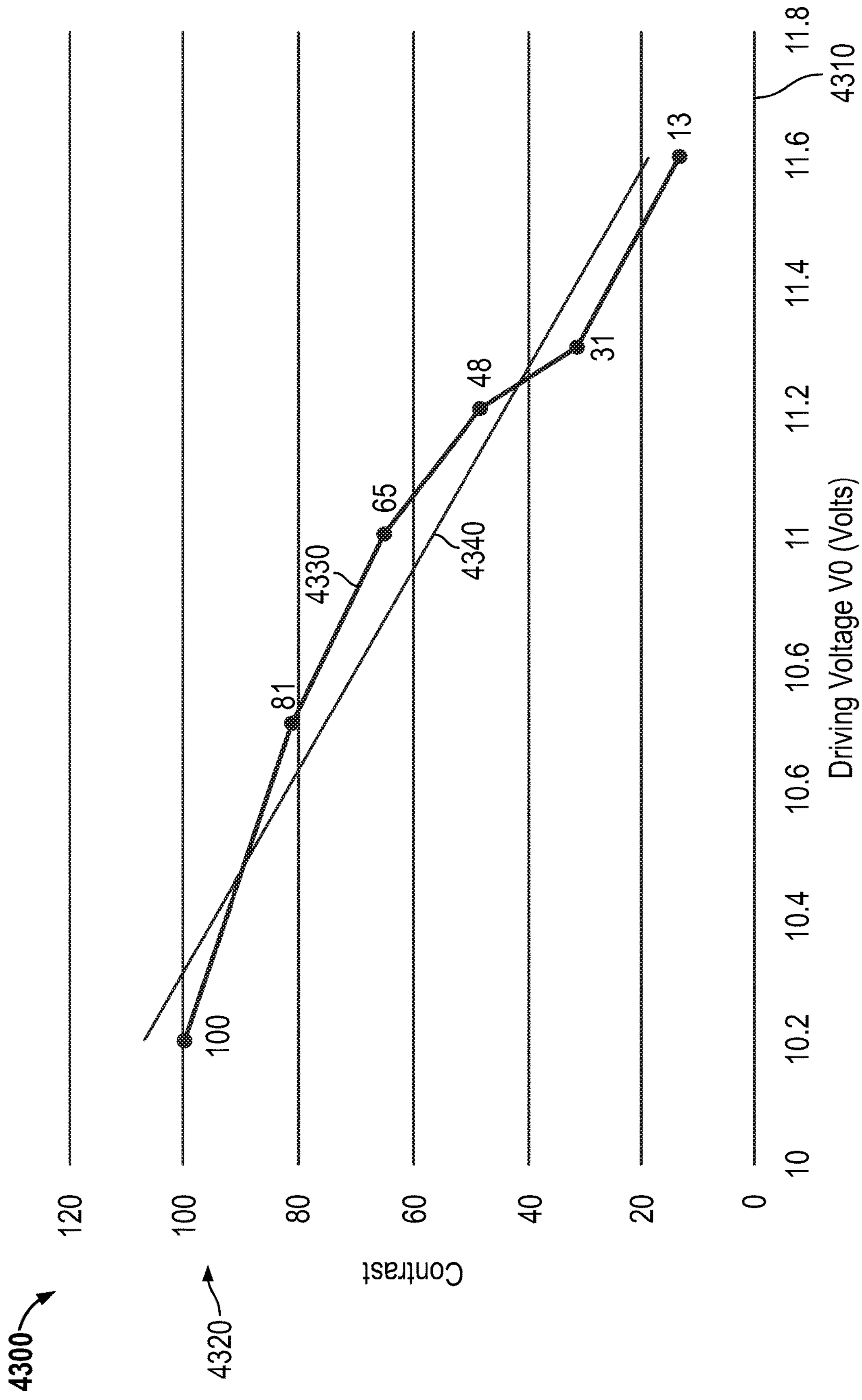
FIG. 43 shows a graph 4300 illustrating a relationship between a driving voltage and the contrast of the display.

FIGS. 41-43 show graphs illustrating how a parameter in a display of an interface with improved accessibility may be adjusted to ensure that a contrast of the display remains readable. With more particularity, FIG. 41 illustrates a relationship between a temperature and the contrast of the display showing that the contrast decreases as temperature increases and FIGS. 42 and 43 show relationships between a driving voltage and the contrast, which can be used to compensate for the relationship between the temperature and the contrast of the display, as will be described in more detail in the following.

FIG. 41 shows a graph 4100 illustrating the relationship between the temperature and the contrast of the display. As shown in FIG. 41, the graph 4100 includes a temperature axis 4110 that ranges from zero to 100 degrees Celsius, although any suitable temperature range, or other parameter, such as an environmental parameter, may be employed. The graph 4100 also includes a contrast axis 4120 that is a unitless percentage value ranging from zero to 120 percent of full contrast. The graph 4100 includes a temperature-contrast plot 4130 that correlates the temperature and the contrast of the display.

The temperature axis 4110 may be a measurement of an ambient temperature that is within an interface housing a display. For example, the temperature axis 4110 may represent measurements of a fascia, such as the fascia 2540 described above with reference to FIGS. 26-28. The temperature may be measured by any suitable means and at any suitable location. For example, a thermocouple may be in a display board that the display is mounted on. Additionally or alternatively, the temperature may be measured by indirect means, such as an infrared detector directed to a fascia chassis housing the display.

The contrast axis 4120 is a measurement of a contrast of a display, such as the display 2544 described above. The contrast of the display may be defined as a ratio of the luminance of a brightest color (e.g., white) to that of a darkest color (e.g., black). The display may be powered by an electrical signal having a voltage and/or current. The contrast may correspond to the voltage and/or current. For example, the display be driven by a driving voltage V0 that is corresponds and is correlated with a contrast value of the display. The driving voltage V0 may be positively correlated with the contrast value of the display. That is, the higher the voltage the greater the contrast value.

The temperature-contrast plot 4130 illustrates a relationship between temperature values of the temperature axis 4110 and the contrast axis 4120. The relationship is linear, although any suitable relationship may be employed. As is illustrated by the temperature-contrast plot 4130, the contrast values are also correlated with the temperature values. As can be appreciated, it may be difficult to read the display if the contrast is not suitable for reading. The following explains that the change in contrast is due to the driving voltage decreasing as the temperature increases.

FIG. 42 shows a graph 4200 illustrating a relationship between a driving voltage and the contrast of the display. The graph 4200 includes an electronic volume axis 4210 that ranges from zero to about 63 and a driving voltage axis 4220 that ranges from 0 to 14 volts, although any suitable parameter and/or values may be employed in alternative embodiments. The graph 4200 also includes an electronic volume-to-driving voltage plot 4230 correlating driving voltage values with display contrast values.

The electronic volume axis 4210 is a register value that sets a driving voltage to control a contrast of a display. That is, the electronic volume values of the electronic volume axis 4210 are settings in a board that drives a display. The settings are made by setting a register value in a register. Driving voltage values are correlated with the electronic volume values. The correlations between the driving voltage values and the electronic volume values may be determined at a nominal temperature of 25 degrees Celsius. The determined correlations are expressed as the electronic volume-to-driving voltage plot 4230. The electronic volume values of 36 to 63 correspond to contrast display values of 0 to 100, where the nominal temperature is 25 degrees Celsius.

The electronic volume-to-driving voltage plot 4230 shows that as the electronic volume increases from 10 percent, the driving voltage V0 correspondingly increases. Notably, the relationship is approximately linear from 10 percent. This linearity can be exploited by compensating the driving voltage for a temperature change. Table 1 below shows experiments performed to determine a suitable relationship between a temperature and a driving voltage to maintain a visual contrast of a display to be approximately 50%.

TABLE 1

Relationships between contrast and driving voltage at various temperatures

| Contrast setting value (%) | Driving voltage (V 0) at 25° C. | Driving voltage (V 0) at 60° C. | Driving voltage (V 0) at 85° C. |
|---|---|---|---|
| 0 | 10.3 V | 9.8 V | 9.56 V |
| 10 | 10.4 V | 10.0 V | 9.64 V |
| 20 | 10.6 V | 10.1 V | 9.80 V |
| 30 | 10.8 V | 10.3 V | 9.96 V |
| 40 | 10.8 V | 10.4 V | 10.1 V |
| 50 | **11.1 V (50)** | 10.6 V | 10.2 V |
| 60 | 11.2 V | 10.8 V | 10.4 V |
| 70 | 11.2 V | 10.8 V | 10.5 V |
| 80 | 11.4 V | **11.0 V (50)** | 10.7 V |
| 90 | 11.6 V | 11.1 V | 10.8 V |
| 100 | 11.8 V | 11.2 V | **10.9 V (50)** |

The voltage values that are in bold and are denoted by "(50)" indicate that the observed contrast on the display was approximately 50 percent, or as close as possible, even though the contrast setting value may be different. For example, at 85 degrees Celsius, the contrast setting was 100 to achieve an observed contrast of 50 or as close as possible to 50.

The driving voltage may be compensated by using the following equation that relates a board temperature BT and a contrast setting value CS.

$$CS = \begin{cases} 13, \text{ if } BT < 20° \text{ C.} \\ 0.83 * BT + 29.35, \text{ if } 20° \text{ C} < BT < 85° \text{ C.}, \\ 100, \text{ if } BT > 100° \text{ C.} \end{cases} \quad \text{Equation [2]}$$

Experimentation showed that the driving voltage of 11.6 V results in an optimal observed contrast over a range of temperatures compared to, for example, the driving voltage of 11.1 V discussed above. Accordingly, the correlation of equation [2] may result in the driving voltage being maintained at about 11.5 to 11.7 V, as the following table shows.

TABLE 2

Showing a relationship between the contrast setting and the voltage to maintain the observed contrast at about 50%

| Board temperature (BT) (° C.) | Contrast setting value (CS) (%) | V 0 (V) |
|---|---|---|
| −30 | 13 | 11.6 |
| −25 | 13 | 11.5 |
| −20 | 14 | 11.5 |
| −10 | 22 | 11.5 |
| 0 | 31 | 11.5 |
| 10 | 40 | 11.6 |
| 20 | 48 | 11.6 |
| 30 | 56 | 11.7 |
| 40 | 65 | 11.7 |
| 50 | 72 | 11.6 |
| 60 | 81 | 11.6 |
| 70 | 88 | 11.6 |
| 80 | 98 | 11.6 |
| 85 | 100 | 11.6 |

As can be seen, the contrast setting value can be varied based on the board temperature to ensure that the observed contrast setting remains at the optimal observed contrast, which may be approximately 50%. However, alternative methods may be employed to compensate a driving voltage for the temperature. For example, the driving voltage may be compensated by other means that do not necessarily require a temperature measurement, as is discussed in the following.

FIG. 43 shows a graph 4300 illustrating a relationship between a driving voltage and the contrast of the display. The graph 4300 includes a driving voltage axis 4310 that ranges from 10 to 11.8 volts and a contrast axis 4320 that ranges from 0 to 120 percent, although any suitable parameter and/or values may be employed in alternative embodiments. The graph 4300 also includes a driving voltage-contrast plot 4330 correlating driving voltage values with display contrast target value. The driving voltage-contrast plot 4330 is based on the following Table 3. Also shown is an analytical driving voltage-contrast plot 4340 that may be derived from the empirical data of the driving voltage-contrast plot 4330, as is described below.

TABLE 3

Showing a relationship between the contrast value targets and actual driving voltage V 0.

| Temperature (° C.) | Contrast actual (%) | V 0 actual (V) | V 0 target (V) | Contrast target (%) |
|---|---|---|---|---|
| −30 | 50% | 11.6 | 11.6 | 13 |
| −20 | 50% | 11.6 | 11.6 | 13 |
| 0 | 50% | 11.3 | 11.6 | 31 |
| 20 | 50% | 11.2 | 11.6 | 48 |
| 40 | 50% | 11.0 | 11.6 | 65 |
| 60 | 50% | 10.7 | 11.6 | 81 |
| 80 | 50% | 10.2 | 11.6 | 100 |

The driving voltage may be related to the actual contrast by using an electronic volume to driving voltage relationship, such as the electronic volume-to-driving voltage plot 4230 described above with reference to FIG. 42, which is shown in a relationship:

$$V0 = 5.8 * \left(1 - \frac{[73 - (EV + V_{op\_j})]}{210}\right) * 2.1. \quad \text{Equation [3]}$$

where:

V0 is the driving voltage;

EV is the electronic volume; and $V_{op\_j}$ is a driving voltage offset parameter.

The above equation [3] may be used when 10<EV<63. From this specification we can determine that a change in driving voltage ΔV0 may be related to a change in electronic volume ΔEV by the expression:

$$\Delta V0 = 0.058 * \Delta EV, \quad \text{Equation [4]}$$

where:

ΔV0 is a change in driving voltage; and

ΔEV is a change in electronic volume.

As discussed above with reference to FIG. 42, the electronic volume has a linear relationship with contrast and so the electronic volume EV may be represented using a ratio of the electronic volume EV (i.e., 63-36) and a corresponding full scale of the contrast C (i.e., 100-0) to determine a relationship between the electronic volume and the contrast C as $$EV = \frac{(63 - 36)}{(100 - 0)} C + 36.$$

From this relationship, a change in the electronic volume ΔEV can be related to a change in contrast ΔC b a relationship expressed as:

$$\Delta EV = 0.27 * \Delta C., \quad \text{Equation [5]}$$

where:

ΔEV is the change in electronic volume; and

ΔC is a change in contrast.

From the above two equations [4] and [5], a change in driving voltage ΔV0 may be related to a change in contrast ΔC by a relationship of:

$$\Delta V0 = 0.058 * 0.27 * \Delta C. \quad \text{Equation [6]}$$

In order to maintain the driving voltage ΔV0 at a stable value, the following relationship may be employed:

$$\Delta C = -63.8 * \Delta V0. \quad \text{Equation [7]}$$

We can use the actual driving voltage V0 and contrast test data as shown above in Table 3. From the contrast to driving voltage V0 data, we can derive the relationship as below:

$$C = -63.607 * V0 + 756.01, \quad \text{Equation [8]}$$

where:

C is a contrast setting in percentage.

Accordingly, the driving voltage may be related to the contrast setting of the display to maintain an observed contrast at, for example, 50%.

As can be appreciated from Table 3, Equation [8], the analytical driving voltage-contrast plot 4340, and the driving voltage-contrast plot 4330 relate operating values, which as shown is a measured temperature, with actual contrast values. That is, Equation [8], the analytical driving voltage-contrast plot 4340, and the driving voltage-contrast plot 4330 are driving voltage-to-actual contrast value relationships.

As shown in Table 3, the actual contrast values are all 50%. Accordingly, Equation [8], the analytical driving voltage-contrast plot 4340, and the driving voltage-contrast plot 4330 are driving voltage-to-actual contrast value relationships that are normalized to actual contrast values of 50%. However, other values may be employed. For example, additional tables may be provided that respectively relate operating values to actual contrast values of, by way of example, but not limited to, 30, 40, 60, and 70 percent.

As can also be appreciated from Table 3, the driving voltage-to-actual contrast value relationship may include a contrast value-to-driving voltage relationship. With more particularly, as shown in Table. 3, the contrast values of the "contrast target" column (which may also be referred to as a contrast setting value), may be set based on the operating value so as to maintain the actual contrast value at 50%. Accordingly, the actual contrast value of 50% can be achieved by adjusting a driving voltage provided to a display based on the determined operating value and the driving voltage-to-actual contrast relationship.

The operating value shown in FIG. 3 is temperature. However, an operating value may be the driving voltage provided to a display. For example, a driving voltage provided to the display may be previously correlated to a temperature by relating contrast values of a display driving circuit with driving voltages at various temperatures, as is shown in Table. 1. Accordingly, the driving voltage provided to the display may be measured and compared to Table 1 to determine a contrast value or contrast setting value to achieve a desired actual contrast value.

More specifically, the driving voltage may be measured and the contrast value or contrast setting value of the display driver may be determined (e.g., 50%). If the measured driving voltage is 10.2 V, then a temperature of 85 degrees may be inferred but this inference may not be necessary. Instead, Table 1 may be used to determine that a contrast setting value of 100 percent may be used to obtain an actual contrast value of 50%. Alternatively. Equation [8] may be used, which is a driving voltage-to-actual contrast relationship that relates driving voltages to contrast values at an actual contrast value of 50%. A contrast value may be previously correlated to a register value as is described above with reference to FIG. 42, where a contrast setting value of 0% corresponded to an EV value of 36, a contrast setting value of 100% corresponded to an EV value of 63, and the relationship is linear:

$$EV = \frac{(63-36)}{(100-0)} C + 36.$$

Figure 44:
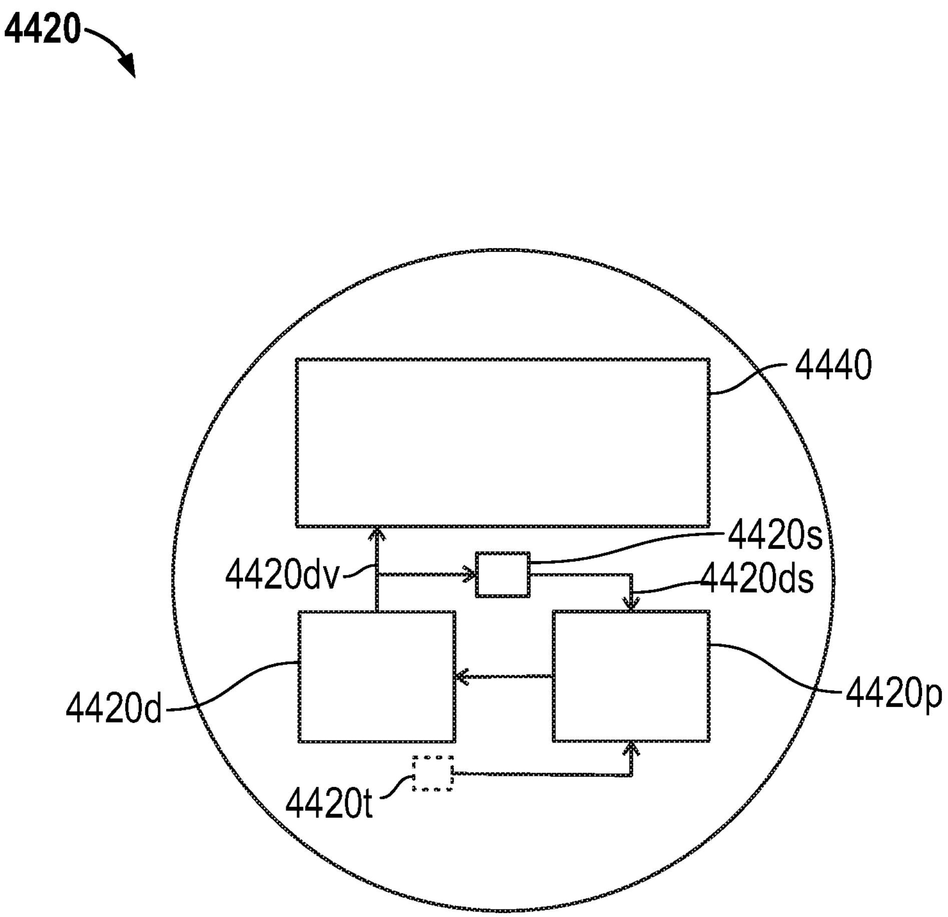
FIGS. 44-46 show a meter electronics 4420 for improving an accessibility of an interface.
Figure 45:
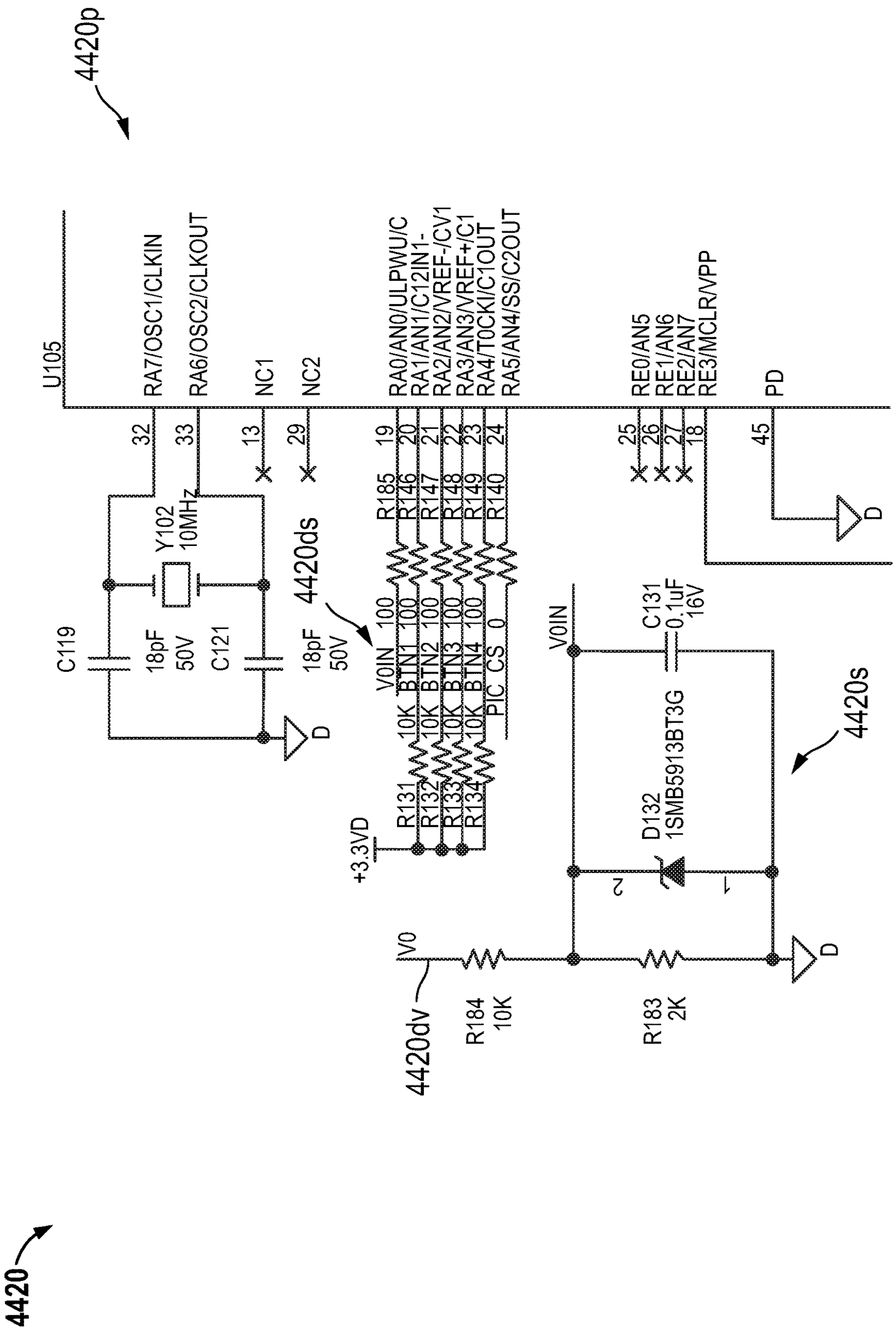
Figure 46:
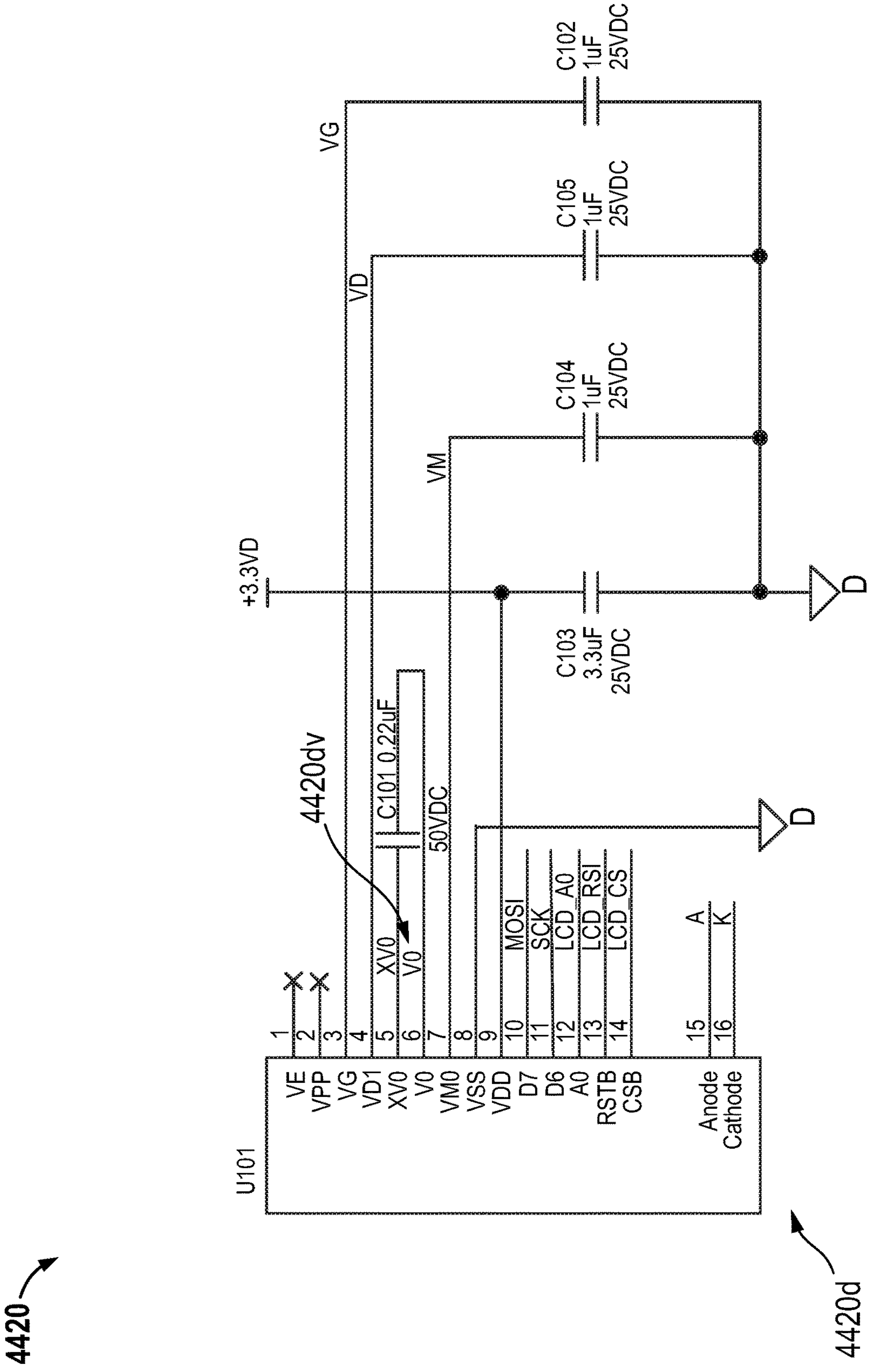

FIGS. 44-46 show a meter electronics 4420 for improving an accessibility of an interface. As show in FIG. 44, the meter electronics 4420 includes a display 4440, a processor 4420*p*, and a display driving circuit 4420*d* coupled to the processor 4420*p*. The display driving circuit 4420*d* is configured to provide a driving voltage 4420*dv* to the display 4440. A sampling circuit 4420*s* communicatively coupled to the display driving circuit 4420*d* is configured to sample the driving voltage 4420*dv* and provide the driving voltage value 4420*ds* to the processor 4420*p*. The display driving circuit 4420*d* may be configured to determine the driving voltage 4420*dv* from a register value, such as an electronic volume value described above. The electronic volume value may be set by the processor 4420*p*. A temperature sensor 4420*t* is optionally coupled to the processor 4420*p*.

The meter electronics 4420 may be the same as or similar to meter electronics 20 described above, although any suitable meter electronics may be employed. For example, the meter electronics 4420 may be the meter electronics 20 described above with an additional temperature sensor 4420*t* that is disposed proximate the display driving circuit 4420*d*.

The temperature sensor 4420*t* may be a thermocouple, resistive temperature detector, infrared detector, or the like. The temperature sensor 4420*t* may be configured to sense a temperature of the meter electronics 4420. The temperature sensor 4420*t* may provide a signal, such as an analog signal, to the processor 4420*p*. The temperature sensor 4420*t* may sense any suitable portion of the meter electronics 4420 where a temperature variation can cause the driving voltage to 4420*dv* vary. For example, the temperature sensor 4420*t* may be configured to sense a temperature of the display driving circuit 4420*d*.

The display driving circuit 4420*d* may be configured to provide the driving voltage 4420*dv* to the display. An amplitude of the driving voltage 4420*dv* may be determined by the display driving circuit 4420*d* based on the register value in a register of the display driving circuit 4420*d*. The register value may be set by the processor 4420*p*. The processor 4420*p* may set the register value based on the driving voltage value 4420*ds* provided by the sampling circuit 4420*s* to the processor 4420*p*.

The sampling circuit 4420*s* may be configured to measure the driving voltage 4420*dv* and provide a signal to the processor 4420*p* representative of the driving voltage 4420*dv*. For example, as will be described in more detail with reference to FIG. 45, the sampling circuit 4420*s* may be a voltage divider circuit that conditions the driving voltage to be provided the processor 4420*p*. More specifically, the sampling circuit 4420*s* may proportionally reduce the driving voltage 4420*dv* to a scale that is suitable for the processor 4420*p*. Additionally, the sampling circuit 4420*s* may digitize the sampled and conditioned driving voltage 4420*dv* and provide the digitized signal to the processor 4420*p* as the driving voltage value 4420*ds*.

The display 4440 may be a liquid crystal display (LCD), light emitting diode (LED) display, etc. Any suitable display may be employed where a contrast may be affected by environmental conditions, such as temperature. For example, a brightness of the LED may be adversely affected by environmental conditions, which may in turn adversely affect the contrast of the LED. As shown in FIG. 44 the display 4440 may be the LCD with pixels that may be black or white, depending on the driving voltage 4420*dv*.

Figure 47:
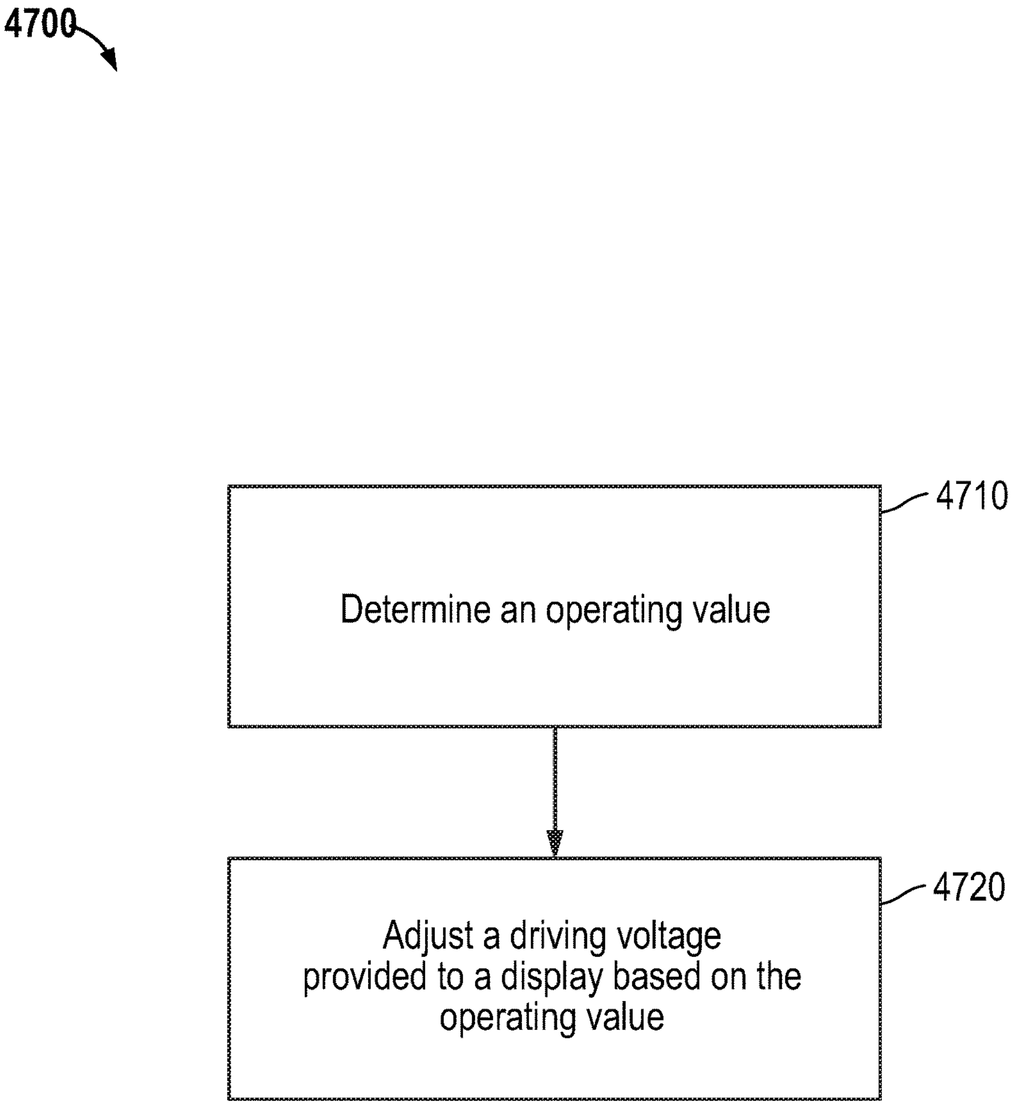
FIG. 47 shows a method 4700 of improving an accessibility of an interface.

FIG. 47 shows a method 4700 of improving an accessibility of an interface. As shown in FIG. 47, the method 4700 determines an operating value in step 4710. The operating value may correspond to a temperature of a meter electronics, such as the meter electronics 4420 discussed above, providing the driving voltage to a display. In step 4720, the method 4700 adjusts a driving voltage provided to the display based on the determined operating value.

The method 4700 may further comprise determining a contrast value based on the determined operating value. For example, a contrast value may be determined within the range of 0-100 percent that compensates the driving voltage for the temperature of the meter electronics. For example, although a nominal value of 50% contrast may be readable at 25 degrees Celsius, a contrast value of 100 percent may be required to ensure that the display is readable at 85 degrees Celsius.

The method 4700 may also comprise setting a register value in a display driving circuit based on the determined contrast value. The determined contrast value may be correlated to a register setting value. For example, the register value may be an electronic volume value that is correlated to a contrast value. Referring to the foregoing discussion by way of example, the contrast value of 100 percent may be correlated with an electronic volume value of 63. Accordingly, if the contrast value of 100 percent is determined to correspond to the operating value, then the electronic volume value of 63 may be set in the display driving circuit.

The operating value may be driving voltage provided to the display. For example, as discussed above, the driving voltage may increase or decrease in proportion to the temperature of the meter electronics, in particular the display driving circuit. Accordingly, the driving voltage corresponds to the temperature of the meter electronics. The contrast value may be determined from the driving voltage. For example, the driving voltage-contrast plot 4330 discussed above may be used to determine the contrast value. For example, if the driving voltage is 10.2 volts, then the contrast value may be 100 percent.

Additionally or alternatively, the contrast value may be determined based on a relationship between the temperature of the meter electronics and the contrast value. For example, as discussed above, if a board temperature BT is between 20 degrees Celsius and 85 degrees Celsius, then the a contrast value may be determined from CS=0.83*BT+29.35 where the contrast setting value CS is the contrast value.

The meter electronics 4420 and method 4700 described above may improve the accessibility of the interface, such as the interface 2. The accessibility of the interface may be improved by compensating the contrast of the display 4440 for the temperature of the meter electronics 4420. In particular, the meter electronics 4420 may compensate the driving voltage 4420*dv* for the display 4440. The driving voltage 4420*dv* may be compensated based on a measured temperature of the meter electronics 4420, the display driving circuit 4420*d*, or the like. Additionally or alternatively, the driving voltage 4420*dv* may be compensated based on the driving voltage 4420*dv*. This latter method may allow for the driving voltage 4420*dv* to be compensated without the use of a temperature sensor. Due to the contrast being compensated, the actual contrast of the display 4440 may be consistent thereby improving the perceived quality and accessibility of the interface.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other interfaces to improve the accessibility of the interface and not just to the embodiments described above and shown in the accompanying figures. Accordingly, the scope of the embodiments described above should be determined from the following claims.

We claim:

1. An interface (402, 502, 602, 1202) with improved accessibility, the interface (402 502, 602, 1202) comprising:

a housing (430, 530, 630, 1230);

a meter electronics (420, 520, 620, 1220) disposed inside the housing (430, 530, 630, 1230), the meter electronics (420, 520, 620, 1220) being configured to affix to a connector (450, 550, 650, 1250) extending into the housing (430, 530, 630, 1230);

a removably attachable receiving disk (617, 1217) rotatably disposed about the connector (650, 1250), wherein at least a portion of the receiving disk (617, 1217) is disposed between a retention ring (618, 1218) of the connector (650, 1250) and a wall (632, 1232) of the housing (630, 1230); and wherein the housing (530, 1230) is rotatably coupled to the connector (550, 1250) extending into the housing (530, 1230).

2. The interface (402, 502, 602, 1202) of claim 1, wherein the meter electronics (1220) further comprises posts (1224*p*) configured to mate with grooves (1217*g*) in the receiving disk (1217) and bolts (1224*b*) configured to mate with threaded holes (1217*h*) of the receiving disk (1217) and/or the receiving disk (617, 1217) includes lobes (6171, 12171) that interfaces with one of a groove (618*g*) and lips (1218*b*) of the retention ring (618, 1218) to retain the meter electronics (620, 1220) to the connector (650, 1250) extending into the housing (630, 1230).

3. A method for assembling an interface with improved accessibility, the method comprising:

providing a housing;

providing and disposing a meter electronics inside the housing;

providing and extending a connector into the housing;

affixing the meter electronics to the connector extending into the housing;

providing and rotatably disposing a removably attachable receiving disk about the connector, wherein at least a portion of the receiving disk is disposed between a retention ring of the connector and a wall of the housing; and rotatably coupling the housing to the connector extending into the housing.

4. The method of claim 3, wherein providing the meter electronics further comprises providing posts, wherein providing the receiving disk comprises providing grooves and threaded holes in the receiving disk, and the method further comprises providing bolts, wherein the posts are configured to mate with the grooves and the bolts are configured to mate with the threaded holes of the receiving disk and/or wherein providing the receiving disk comprises providing lobes that interfaces with one of a groove and lips of the retention ring to retain the meter electronics to the connector extending into the housing.

5. An interface (2202) with improved accessibility, the interface (2502) comprising:

a housing (2230); and a meter electronics (2220) disposed inside the housing, the meter electronics being configured to affix to a connector extending into the housing, the meter electronics comprising:

a removably attachable receiving disk rotatably disposed about the connector wherein at least a portion of the receiving disk is disposed between a retention ring of the connector and a wall of the housing, wherein the housing is rotatably coupled to the connector extending into the housing;

an upper meter electronics (2222);

a lower meter electronics (2224); and a barrier board (2223) disposed between and coupled to the upper meter electronics (2222) and the lower meter electronics (2224); and a gasket (22300) disposed between and in contact with the barrier board (2223) and the housing (2230) so as to form a water-tight seal that separates an upper meter electronics portion (2230*u*) of the housing (2230) and a lower meter electronics portion (22301) of the housing (2230).

6. The interface (2202) of claim 5, wherein the barrier board (2223) is without holes that traverse the barrier board (2223) interior to the gasket (22300) and/or wherein the gasket (22300) comprises an o-ring compressed between the housing (2230) and the barrier board (2223).

7. The interface (2202) of claim 5, further comprising a plurality of fasteners (2230*b*) disposed proximate the gasket (22300) and configured to affix the barrier board (2223) to the boss (2230*s*) of the housing (2230), wherein the gasket (22300) being disposed between and in contact with the barrier board (2223) and the housing (2230) comprises the gasket (22300) being disposed between and in contact with a boss (2230*s*) of the housing (2230) and the barrier board (2223).

8. A method of assembling an interface with improved accessibility, the method comprising:

providing a housing; and providing a connector extending into the housing;

providing a meter electronics affixed to the connector, wherein providing the meter electronics comprises:

providing an upper meter electronics;

providing a lower meter electronics;

providing and disposing a barrier board between the upper meter electronics and the lower meter electronics;

coupling the barrier board to the upper meter electronics and the lower meter electronics;

disposing and contacting a gasket between and with the barrier board and the housing so as to form a water-tight seal that separates an upper meter electronics portion of the housing and a lower meter electronics portion of the housing; and providing and rotatably disposing a removably attachable receiving disk about the connector, wherein at least a portion of the receiving disk is disposed between a retention ring of the connector and a wall of the housing.

9. The method of claim 8, wherein providing the barrier board comprises forming the barrier board without holes that traverse the barrier board interior to the gasket and/or wherein providing the gasket comprises providing an o-ring and compressing the o-ring between the housing and the barrier board.

10. The method of claim 8, further comprising disposing a plurality of fasteners proximate the gasket and affixing the barrier board to the boss of the housing using the plurality of fasteners, wherein disposing and contacting the gasket between and with the barrier board and the housing comprises disposing and contacting the gasket between and with the barrier board and a boss of the housing.

11. A meter electronics (3220) disposed in a housing for improving accessibility of an interface (3202), the meter electronics (3220) comprising:

a processor (3228) disposed on an electronics board (3220*b*);

a component (3226) disposed on the electronics board (3220*b*), the component (3226) being coupled to a pin of the processor (3228), the pin of the processor (3228) being configured to couple to a component (3246) of a display board (3240*b*) coupled to the electronics board (3220*b*);

wherein the component (3246) of the display board (3240*b*) is redundant to the component (3226) of the electronics board (3220*b*); and wherein the meter electronics is configured to affix to a connector extending into the housing, wherein a removably attachable receiving disk is rotatably disposed about the connector, wherein at least a portion of the receiving disk is disposed between a retention ring of the connector and a wall of the housing, and wherein the housing is rotatably coupled to the connector extending into the housing.

12. The meter electronics (3220) of claim 11, further comprising the display board (3240*b*) wherein the pin of the processor (3228) is coupled to the component (3246) of the display board (3240*b*) wherein the pin of the processor (3228) is coupled to a first terminal of the component (3246) of the display board (3240*b*) and a second terminal of the component (3246) of the display board (3240*b*) is coupled to a ground (3220*g*).

13. The meter electronics (3220) of claim 11, further comprising an amplifier (3222*a*, 3222*b*) having an output coupled to the component (3226) disposed in the electronics board (3220), the amplifier (3222*a*, 3222*b*) being an inverter configured to invert a signal from the processor (3228) to the component (3226).

14. A method for improving an accessibility of an interface, the method comprising:

providing a housing with an electronics board therein;
providing a connector extending into the housing;
providing and disposing a processor on the electronics board;
providing and disposing a component on the electronics board;
coupling the component to a pin of the processor; and
configuring the pin of the processor to couple to a component of a display board coupled to the electronics board;
wherein the component of the display board is redundant to the component of the electronics board; and
providing and rotatably disposing a removably attachable receiving disk about the connector, wherein at least a portion of the receiving disk is disposed between a retention ring of the connector and a wall of the housing.

15. The method of claim 14, wherein:

configuring the pin of the processor to couple to the component of the display board comprises configuring the pin to couple to the component of the display board via a connector coupling the display board to the electronics board; and
coupling the component to the pin of the processor comprises coupling the pin of the processor to a first terminal of the component of the electronics board and coupling a second terminal of the component to a ground.

16. The method of claim 14, further comprising providing the display board and coupling the pin of the processor to the component of the display board wherein coupling the pin of the processor to the component of the display board comprises coupling the pin of the processor to a first terminal of the component of the display board and coupling a second terminal of the component of the display board to a ground.

17. The method of claim 14, further comprising providing an amplifier having an output and coupling the output to the component disposed in the electronics board, the amplifier being an inverter configured to invert a signal from the processor to the component.

18. An interface (3402) having improved accessibility, the interface (3402) comprising:

a housing (3430);
a fascia (3440) disposed internal to the housing (3430) and proximate an opening (34300) of the housing (3430);
a translating rod (3440*t*) pivotably coupled to the fascia (3440), the translating rod (3440*t*) being configured to displace the fascia (3440) through the opening (34300) of the housing (3430); and
a connector extending into the housing, wherein a removably attachable receiving disk is rotatably disposed about the connector, wherein at least a portion of the receiving disk is disposed between a retention ring of the connector and a wall of the housing, and wherein the housing is rotatably coupled to the connector extending into the housing.

19. The interface (3402) of claim 18, wherein the translating rod (3440*t*) being pivotably coupled to the fascia (3440) comprises the fascia (3440) being configured to at least one of rotate about a translating axis (3440*at*) that is collinear to a longitudinal axis of the translating rod (3440*t*) and rotate about a pivoting axis (3440*ap*) that is orthogonal to a longitudinal axis of the translating rod (3440*t*).

20. The interface (3402) of claim 18, wherein the translating rod (3440*t*) being configured to displace the fascia (3440) through the opening (34300) of the housing (3430) comprises the translating rod (3440*t*) being configured to displace the fascia (3440) in a direction collinear with a longitudinal axis of the translating rod (3440*t*).

21. The interface (3402) of claim 18, wherein the translating rod (3440*t*) is pivotably coupled to the fascia (3440) at a pivot point (3440*p*) wherein the pivot point (3440*p*) is located where a pivot axis (3440*ap*) and a translation axis (3440*at*) are coincident and the fascia (3440) pivots about the pivot axis (3440*ap*) and rotates about the translation axis (3440*at*).

22. A method for improving an accessibility of an interface, the interface comprising:

providing a housing;
providing a connector extending into the housing;
providing a meter electronics affixed to the connector;
providing and rotatably disposing a removably attachable receiving disk about the connector, wherein at least a portion of the receiving disk is disposed between a retention ring of the connector and a wall of the housing;
providing and disposing a fascia internal to the housing and proximate an opening of the housing; and
providing and pivotably coupling a translating rod to the fascia, the translating rod being configured to displace the fascia through the opening of the housing.

23. The method of claim 22, wherein pivotably coupling the translating rod to the fascia comprises configuring the fascia to at least one of rotate about a translating axis that is collinear to a longitudinal axis of the translating rod and rotate about a pivoting axis that is orthogonal to a longitudinal axis of the translating rod.

24. The method of claim 22, wherein configuring the translating rod to displace the fascia through the opening of the housing comprises configuring the translating rod to displace the fascia in a direction collinear with a longitudinal axis of the translating rod.

25. The method of claim 22, wherein pivotably coupling the translating rod to the fascia comprises pivotably coupling the translating rod to the fascia at a pivot point wherein the pivot point is located where a pivot axis and a translation axis are coincident and the fascia pivots about the pivot axis and rotates about the translation axis.

26. A method for improving an accessibility of an interface, the method comprising:

providing a housing with a connector extending therein;
providing a meter electronics affixed to the connector;
providing and rotatably disposing a removably attachable receiving disk about the connector, wherein at least a portion of the receiving disk is disposed between a retention ring of the connector and a wall of the housing;
displacing a fascia through an opening in the housing along a translation axis, the fascia being configured to at least one of rotate about the translation axis and pivot about a pivot axis.

27. The method of claim 26, further comprising at least one of rotating the fascia about the translation axis and pivoting the fascia about the pivot axis, wherein the translation axis and the pivot axis are collocal at a pivot point and the fascia is configured to rotate and pivot about the pivot point.

28. A method for improving an accessibility of an interface, the method comprising:

determining an operating value;

adjusting a driving voltage provided to a display based on the determined operating value and a driving voltage-to-actual contrast relationship;

wherein the operating value corresponds to a temperature of a meter electronics providing the driving voltage;

providing a housing in which the meter electronics is disposed;

providing a connector extending into the housing, wherein the meter electronics is affixed to the connector; and providing and rotatably disposing a removably attachable receiving disk about the connector, wherein at least a portion of the receiving disk is disposed between a retention ring of the connector and a wall of the housing.

29. The method of claim 28, further comprising determining a contrast value based on the determined operating value and the driving voltage-to-actual contrast relationship and adjusting the driving voltage based on the contrast value.

30. The method of claim 28, wherein the operating value is the driving voltage provided to the display.

31. The method of claim 30, further comprising determining the contrast value from a relationship between the driving voltage and the contrast value and determining the contrast value based on a relationship between the temperature of the meter electronics and the contrast value.

32. A meter electronics (4420) disposed in a housing for improving an accessibility of an interface, the meter electronics (4420) comprising:

a processor (4420*p*) configured to determine an operating value; and a display driving circuit (4420*d*) configured to provide a driving voltage to a display (4440) and adjust the driving voltage based on the operating value and a driving voltage-to-actual contrast relationship;

wherein the operating value corresponds to a temperature of a meter electronics providing the driving voltage; and wherein the meter electronics is configured to affix to a connector extending into the housing, wherein a removably attachable receiving disk is rotatably disposed about the connector, wherein at least a portion of the receiving disk is disposed between a retention ring of the connector and a wall of the housing, and wherein the housing is rotatably coupled to the connector extending into the housing.

33. The meter electronics (4420) of claim 32, wherein the processor (4420*p*) is further configured to determine a contrast value based on the determined operating value and the driving voltage-to-actual contrast relationship and adjusting the driving voltage based on the contrast value.

34. The meter electronics (4420) of claim 32, wherein the operating value is at least one of the driving voltage provided to the display (4440) and the temperature of the meter electronics (4420) providing the driving voltage to the display (4440).

35. The meter electronics (4420) of claim 34, wherein the processor (4420*p*) is further configured to at least one of determine the contrast value from a relationship between the driving voltage and the contrast value and determine the contrast value based on a relationship between the temperature of the meter electronics (4420) and the contrast value.

* * * * *